US009497056B2

(12) United States Patent
Limberg et al.

(10) Patent No.: US 9,497,056 B2
(45) Date of Patent: Nov. 15, 2016

(54) CONVEYING METADATA BY MODULATION OF PILOT CARRIERS IN COFDM BROADCASTING

(71) Applicants: Allen LeRoy Limberg, Port Charlotte, FL (US); Arthur Webb Allison, III, Silver Spring, MD (US)

(72) Inventors: Allen LeRoy Limberg, Port Charlotte, FL (US); Arthur Webb Allison, III, Silver Spring, MD (US)

( * ) Notice: Subject to any disclaimer, the term of this patent is extended or adjusted under 35 U.S.C. 154(b) by 0 days.

(21) Appl. No.: 14/733,854

(22) Filed: Jun. 8, 2015

(65) Prior Publication Data

US 2015/0358106 A1    Dec. 10, 2015

Related U.S. Application Data

(60) Provisional application No. 62/009,457, filed on Jun. 9, 2014, provisional application No. 62/012,488, filed on Jun. 16, 2014, provisional application No. 62/018,699, filed on Jun. 30, 2014, provisional application No. 62/022,508, filed on Jul. 9, 2014, provisional application No. 62/036,255, filed on Aug. 12, 2014, provisional application No. 62/099,344, filed on Jan. 2, 2015, provisional application No. 62/113,824, filed on Feb. 9, 2015.

(51) Int. Cl.
*H04J 13/00* (2011.01)
*H04L 27/227* (2006.01)
*H04L 27/20* (2006.01)
*H04L 27/26* (2006.01)
*H04L 1/00* (2006.01)
*H04B 1/707* (2011.01)
*H04L 5/00* (2006.01)
*H04L 25/02* (2006.01)

(52) U.S. Cl.
CPC .......... *H04L 27/2273* (2013.01); *H04B 1/707* (2013.01); *H04L 1/0041* (2013.01); *H04L 1/0045* (2013.01); *H04L 1/0058* (2013.01); *H04L 5/0021* (2013.01); *H04L 25/0226* (2013.01); *H04L 27/2003* (2013.01); *H04L 27/2613* (2013.01); *H04L 27/2628* (2013.01); *H04L 27/2656* (2013.01)

(58) Field of Classification Search
CPC  H04L 5/0007; H04L 27/2627; H04L 5/0048
See application file for complete search history.

(56) References Cited

U.S. PATENT DOCUMENTS 9,253,428 B2    2/2016  Allison, III
2004/0101046 A1*  5/2004  Yang .................... H03M 13/15
                                                    375/240.08

(Continued)

OTHER PUBLICATIONS

ETSI EN 300 744 V1.5.1, "Digital Video Broadcasting (DVB); Framing structure, channel coding and modulation for digital terrestrial television", Jun. 2004, § 4.5.4 & § 4.6.

*Primary Examiner* — Ross Varndell

(57) ABSTRACT

Transmitter apparatus transmits metadata together with data, at least part of which metadata specifies the version of coded orthogonal frequency-division modulation (COFDM) broadcasting standard it uses for transmitting. Some of the metadata is conveyed by prescribed signature modulation of pilot carrier waves dispersed in one or another of prescribed patterns among the COFDM carrier waves that convey interleaved forward-error-correction coded digital signals. Receiver apparatus detects that metadata by searching for a prescribed signature modulation of the continual pilot carrier waves in those transmissions. Preferably, Barker modulation of the continual pilot carriers near the conclusion of each COFDM frame signals the start of the next COFDM frame to the receiver apparatus.

17 Claims, 36 Drawing Sheets

(56) References Cited

U.S. PATENT DOCUMENTS

| | | | | |
|---|---|---|---|---|
| 2007/0217490 A1* | 9/2007 | Blake | ............... | H04L 27/2626 375/222 |
| 2008/0043861 A1* | 2/2008 | Moffatt | ............... | H04L 27/2618 375/260 |
| 2009/0168909 A1* | 7/2009 | Stadelmeier | ............... | H04H 20/46 375/260 |
| 2013/0114659 A1* | 5/2013 | Murakami | ............... | H04L 27/2691 375/224 |
| 2015/0341586 A1 | 11/2015 | Allison, III | | |

* cited by examiner

PER PRIOR ART

| Φ = 1 | Φ = 2 | Φ = 3 | Φ = 4 | Φ = 5 | Φ = 6 | Φ = 7 | Φ = 8 | Φ = 9 | Φ = 10 | Φ = 11 | Φ = 12 | Φ = 13 | Φ = 14 | Φ = 15 |
|---|---|---|---|---|---|---|---|---|---|---|---|---|---|---|
| A | A | A | A | A | A | A | A | A | A | A | A | A | A | A |
|   | A |   |   |   |   | A | A | A | A | A | A | A | A |   |
|   |   |   |   |   | A |   | A | A | A | A | A | A |   |   |
|   |   |   |   | A |   |   |   | A |   |   |   |   |   |   |
|   |   |   | A |   |   |   |   |   | A |   |   | A |   |   |
|   |   |   |   |   |   |   |   |   |   | A |   |   | A |   |
|   |   | A |   |   |   |   |   |   |   |   |   |   |   | A |
|   | A |   |   |   |   |   |   |   |   |   | A |   |   |   |

CURRENT COFDM FRAME / 1 COFDM FRAME LATER / 2 COFDM FRAMES LATER / 3 COFDM FRAMES LATER / 4 COFDM FRAMES LATER / 5 COFDM FRAMES LATER / 6 COFDM FRAMES LATER / 7 COFDM FRAMES LATER

Φ = PHASING OF 15-CHIP SEQUENCE PILOT CARRIER MODULATION

Fig. 36

| | Φ=1 | Φ=2 | Φ=3 | Φ=4 | Φ=5 | Φ=6 | Φ=7 | Φ=8 | Φ=9 | Φ=10 | Φ=11 | Φ=12 | Φ=13 | Φ=14 | Φ=15 |
|---|---|---|---|---|---|---|---|---|---|---|---|---|---|---|---|
| CURRENT COFDM FRAME | A | A | A | A | A | A | A | A | A | A | A | A | A | A | A |
| 1 COFDM FRAME LATER | A | | | | | | | A | | | | | | A | A |
| 2 COFDM FRAMES LATER | | | | | | | | A | A | A | | | | A | A |
| 3 COFDM FRAMES LATER | A | | | A | A | | | A | A | | A | | | A | A |
| 4 COFDM FRAMES LATER | A | A | | | A | A | | | | | A | A | | | A |
| 5 COFDM FRAMES LATER | | A | A | | A | A | A | | | | | A | | | |
| 6 COFDM FRAMES LATER | | | A | | | | A | | | A | | A | A | | |
| 7 COFDM FRAMES LATER | | | A | | | | A | | | A | | | A | | |

Φ = PHASING OF 15-CHIP SEQUENCE
PILOT CARRIER MODULATION

Fig. 37

CONVEYING METADATA BY MODULATION OF PILOT CARRIERS IN COFDM BROADCASTING

This application claims the benefit of the filing dates of provisional U.S. Pat. App. Ser. No. 62/009,457 filed 9 Jun. 2014, of provisional U.S. Pat. App. Ser. No. 62/012,488 filed 16 Jun. 2014, of provisional U.S. Pat. App. Ser. No. 62/018, 699 filed 30 Jun. 2014, of provisional U.S. Pat. App. Ser. No. 62/022,508 filed 7 Jul. 2014, of provisional U.S. Pat. App. Ser. No. 62/036,255 filed 12 Aug. 2014, of provisional U.S. Pat. App. Ser. No. 62/099,344 filed 2 Jan. 2015, and of provisional U.S. Pat. App. Ser. No. 62/113,824 filed 9 Feb. 2015.

FIELD OF THE INVENTION

The invention relates to systems of broadcasting orthogonal frequency-division modulation (OFDM) digital television (DTV) signals and particularly to the conveying of metadata in such systems, which metadata specifies in some part the method of transmitting the DTV data.

BACKGROUND OF THE INVENTION

Techniques for COFDM DTV broadcasting are prescribed in the ETSI TS 302 755 V1.3.2 Technical Specification titled "Digital Video Broadcasting (DVB); Frame structure channel coding and modulation for a second generation digital terrestrial television broadcasting system (DVB-T2)" published in April 2012 by the European Telecommunications Standards Institute (ETSI). This DVB-T2 standard is based on time-division multiplex of T2 frames of COFDM symbols possibly having future-extension frames (FEFs) interleaved therewith, every six consecutive ones of which frames is considered to constitute a "super frame". The duration of a T2 frame can be of as long a length as 250 ms (milliseconds) and begins with a P1 portion of a preamble, which P1 portion signals which of various ways for transmitting COFDM DTV signals is currently in use. The number of ways for transmitting COFDM DTV signals that can be signaled in each P1 preamble is 24, 8 in an S1 period and 16 in an ensuing S2 period. The three-bit S1 field indicates whether the currently incoming transmissions are T2 frames using 64,800-bit LDPC codeblocks, T2-lite frames using 16,200-bit FEC codeblocks, or FEFs using some still-to-be-decided form of FEC coding. The three-bit S1 field further indicates whether the P2 portion of the preamble following the P1 portion is to be interpreted presuming single-input/single-output (SISO) reception or multiple-input/single-output (MISO) reception. The first 3 bits of the 4-bit S2 field are referred to as S2 field 1. When the preamble format is of the type T2_SISO, T2_MISO, T2-LITE_SISO or T2-LITE_MISO, S2 field 1 indicates the inverse fast Fourier transform (I-FFT) size and provides partial information about the guard interval for the remaining symbols in the T2-frame. The ensuing single-bit S2 field 2 that concludes the S2 field indicates whether the preambles of the T2 frames in a super frame are all of the same type or not.

DVB-T2 permits the time-division multiplexing of several physical layer pipes (PLPs), and information concerning the operating characteristics of those PLPs is conveyed by first-layer (L1) signals that immediately follow the P2 portion of the preamble. Each L1 signal consists of an L1-pre signaling initial portion followed by an L1-post signaling portion. All L1 signaling data, except for the dynamic L1-post signaling, shall remain unchanged for the entire duration of one super-frame. Therefore, any changes implemented to the current configuration (i.e., the contents of the L1-pre signaling or the configurable part of the L1-post signaling) shall always occur at the transition from one super-frame to the consecutive next super-frame. The L1-pre signaling is 200 bits in size. It specifies whether the L1 signal is a repeat or not, the length of guard intervals, the type of peak-to-average-power ratio (PAPR) reduction employed, the natures of FEC coding and the modulation of OFDM carriers in the ensuing L1-post signaling, the size of the ensuing L1-post signaling, pilot carrier pattern, whether L1-post signaling is scrambled or not, and other items related to super-frame structure. The L1-pre signaling concludes with 32 parity bits of cyclic redundancy check (CRC) coding. The so-called "configurable" portion of L1-post signaling is 257 bits in size and comprises information relating to FEFs and to PLPs. The "configurable" field can be followed by "dynamic" and "extension" fields. The L1-post signal concludes with 32 parity bits of CRC coding followed by bits for padding the L1-post signal to prescribed size. The complete L1 signal includes 457 bits for signaling. Nonetheless, additional signaling capability may be required, and per custom this has been afforded by so-called "in-band" signaling wherein control signals replace portions of the broadcast normally allocated to DTV signal.

DVB-T2 was designed to supplant an earlier DVB-T standard for terrestrial DTV broadcasting, as specified in the ETSI TS 300 744 V1.5.1 Technical Specification titled "Digital Video Broadcasting (DVB); Frame structure channel coding and modulation for digital terrestrial television" published in April 2004 by ETSI. In DVB-T some of the continual pilot carriers were used to convey transmission-parameters signaling (TPS), and are referred to as "TPS carriers". DVB-T2 dispensed with TPS carriers conveying transmission-parameters signaling in the time domain in favor of OFDM frame preambles conveying transmission-parameters signaling in the frequency domain. This reduced the likelihood of loss of a few TPS bits owing to short-duration drop-outs in received signal strength that might occur at any time in an OFDM frame, particularly during reception by a DTV receiver in a moving vehicle. On the other hand, a short-duration drop-out in received signal strength will occasionally occur at the beginning of an OFDM frame, resulting in the loss of all TPS information regarding the frame. This is not of too much concern if all OFDM frames share the same TPS information. Also, signaling can be provided relating the TPS information concerning each OFDM frame to similar TPS information conveyed in the preamble of at least one other OFDM frame.

The Advanced Television Systems Committee (ATSC) is an international consortium of television broadcasters, manufacturers of equipment for transmitting DTV signals, and manufacturers of equipment for receiving DTV signals. ATSC has sought to develop a "universal" standard for terrestrial over-the-air COFDM DTV broadcasting that will continue to be used for several years, which standard is referred to as ATSC 3.0. However, a concern of the broadcasting community as expressed in ATSC by Arthur Allison is that the development of future standards for terrestrial over-the-air COFDM DTV broadcasting be accommodated by transmitters specifically signaling receivers as to whether they transmit COFDM TV according to ATSC 3.0, some later version of ATSC 3.0 or some future broadcasting standard. Increasing the number of bits in the "configurable" portion of L1-post signaling to accommodate additional parameters descriptive of some later version of ATSC 3.0 or some future broadcast standard undesirably increases signaling overhead.

A better approach is to encode a digital signature sequence that is the key for specific interpretation of further bits of signaling in an L1 signal. This facilitates one of a plurality of different broadcast standards using some or all of the further bits in an L1 signal differently from another or others of that plurality of different broadcast standards. It is desirable that a number of digital signature sequences can be readily distinguished each from all others, but this undesirably tends to require quite a few bits for each digital signature sequence, which also increases signaling overhead.

Furthermore, it is desirable that COFDM transmission of a digital signature sequence be very robust, since several signaling parameters are apt to be affected in transition from one DTV broadcast standard to another. Providing this robustness for the COFDM transmission of the digital signature sequence undesirably tends to increase signaling overhead still further.

ATSC has also sought to develop a "universal" standard for terrestrial over-the-air COFDM DTV broadcasting in most countries in the world, even though these countries prescribe a variety of permissible radio-frequency channels for such broadcasting. These RF channels have different bandwidths in different countries, six megahertz (MHz) bandwidth being used in North American countries and 8 MHz bandwidth being used in European and Asian countries. Manufacturers of equipment for receiving DTV signals are apt eventually to desire development of a bandwidth-agnostic way to specify the nature of RF channels selected for reception. A bandwidth-agnostic way of specifying the nature of RF channels selected for reception will allow portable DTV receivers to continue to be able to receive DTV signals usefully when transported from a country in which 6 MHz RF bandwidths are used in over-the-air DTV broadcasting to a country in which 8 MHz RF bandwidths are used for over-the-air DTV broadcasting, or vice versa.

Accordingly, in early 2015 ATSC decided to adopt a method for transmitting certain metadata, which method ATSC members refer to as "bootstrap" signaling. This method is described in detail in ATSC Candidate Standard document "A/321 Part 1: ATSC Candidate Standard: System Discovery and Signaling" approved 6 May 2015. In this method "metadata" OFDM frames of bootstrap signaling are interspersed among the "full-bandwidth" OFDM frames conveying coded data and conveying other metadata in their respective preambles. The set of OFDM carriers in the metadata OFDM frames of bootstrap signaling is confined to a 4.5 MHz midband portion of the RF channel, facilitating its use with a variety of RF channel bandwidths and specifying use of 6 MHz, 7 MHz, 8 MHz or wider than 8 MHz RF channels. The metadata OFDM frames of bootstrap signaling use a set of OFDM carriers that are apt to have frequencies different from the set of OFDM carriers in the full-bandwidth OFDM frames used for conveying coded data. However, the spacing between OFDM carriers in the full-bandwidth OFDM frames used for conveying coded data is in a specified ratio with the spacing between OFDM carriers in the metadata OFDM frames of bootstrap signaling. This ratio is an important one of the transmission parameters specified in the bootstrap signaling.

The values used for each bootstrap symbol originate in the frequency domain with a 1449-sample Zadoff-Chu (ZC) sequence modulated by a pseudo-noise (PN) sequence. The chips of the PN sequence each have the same duration as a lobe of the ZC. This allows the ZC-root and PN-seed to signal respectively the major and minor versions of a broadcast service independently of each other. The successive complex samples of the resulting sequence are applied per respective OFDM carrier at the IFFT input. The PN sequence introduces a phase rotation to individual complex subcarriers, thus retaining the desirable Constant Amplitude Zero Auto-Correlation (CAZAC) properties of the original ZC sequence. The PN sequence further suppresses spurious peaks in the autocorrelation response, thereby providing additional signal separation between cyclic shifts of the same root sequence from one bootstrap symbol to the next. Both the ZC sequence and the PN sequence have reflective symmetry about the DC subcarrier. Consequently, the product of these two sequences also has reflective symmetry about the DC subcarrier.

Each metadata frame consists of a number of successive bootstrap symbols in the frequency domain. The initial one of these bootstrap symbols conveys the ZC-root as modulated by the PN seed. Succeeding bootstrap symbols transmit information by rotation of the circular 2K I-FFT from its previous position. The circular I-FFT of the concluding bootstrap symbol in each metadata COFDM frame is rotated one-half revolution respective to the circular I-FFT of the preceding bootstrap symbol to signal the conclusion of the metadata frame.

The metadata conveyed in a bootstrap symbol are susceptible to loss if they are transmitted at a time in which the DTV receiver experiences a momentary drop-out in received signal strength. So are the metadata conveyed in the preamble of a "full-bandwidth" OFDM frame. Occasional loss of metadata owing to momentary drop-outs in received signal strength would be less of a problem if the metadata were transmitted more than once during the course of each OFDM frame. Transmission of back-up metadata in OFDM symbol intervals to some extent undesirably reduces effective code rate for digital payload.

The inventors observe that transmission of back-up metadata by modifying the binary phase-shift keying (BPSK) of the continual pilot carriers does not reduce effective code rate for digital payload. While the DVB-T practice of transmission parameter signaling (TPS) by BPSK of continual pilot carriers was discarded in the newer DVB-T2 standard, the inventors point out that the problem with the TPS pilot carriers prescribed in the DVB-T standard was in substantial part because the TPS was transmitted in accordance with the DVB-T standard without sufficient redundancy to overcome momentary drop-outs in received signal strength.

The inventors point out that, while introducing redundancy into the digital signal for modulating the continual pilot carriers reduces the number of bits that can be transmitted in such BPSK signal, the reduced number of bits can be a signature of the DTV transmission standard in use. The inventors further point out that such signature can then be used as read addressing for a read-only memory (ROM) implementing a look-up table (LUT) for TPS signaling that has many more bits than does the signature used as read address. TPS signaling from the LUT can comprise a sufficient number of bits to describe optimal selections of many transmission parameters.

The inventors also point out that the signature can be used as partial read addressing for a ROM receiving metadata from the bootstrap signal and from the preambles of full-bandwidth OFDM frames as further partial read addressing. This ROM can be used as a LUT for TPS signaling to control structuring and operation of the DTV receiver. The signature metadata conveyed by the BPSK of the continual pilot carriers can be used to change the "dictionary" for the metadata from other sources. Such procedure can greatly extend the signaling capabilities of the first-layer (L1) bits in the preambles of OFDM frames, for example. This reduces any need for "in-band signaling" in the OFDM symbols following those preambles.

Many experts in digital communications strongly tend to favor coding being used to provide redundancy in digital transmissions, since coding is less affected by precisely when drop-outs in received signal occur than repeated transmissions of the same data tend to be. Error-correction coding (ECC) of TPS results in coded metadata having a similar problem to the uncoded metadata insofar as BPSK of continual pilot carriers is concerned. There is a tendency for peak-to-average power ratio (PAPR) of the continual pilot carriers to vary considerably at times being larger than desirable. The inventors favor the metadata being transmitted by phase shift of a repetitive sequence having reasonably constant PAPR, the length of each cycle of such repetitive sequence extending over a small enough number of OFDM symbol intervals that the sequence can be cyclically repeated a few times in an OFDM frame interval.

SUMMARY OF THE INVENTION

Transmitter apparatus for COFDM carrier waves that is constructed in accordance with an aspect of the invention is designed for transmitting first metadata concerning a COFDM frame by means of modulating the pilot carrier waves in a preceding COFDM frame in accordance with a signature sequence identifying the nature of that first metadata. Further metadata can be transmitted in first-layer signaling interspersed with data, similar to the L1 signaling used in transmissions according to the DVB-T2 broadcast standard.

Receiver apparatus for COFDM carrier waves that is constructed in accordance with an aspect of the invention is designed for identifying first metadata concerning each COFDM frame, such identification being afforded by analysis of the modulation of pilot carrier waves in a preceding COFDM frame. Accordingly, the receiver apparatus is afforded foreknowledge of the particular dictionary to be used for interpreting the various elements of the first metadata applicable to each COFDM frame. This facilitates the receiver apparatus being configured for receiving COFDM frames transmitted in accordance with different broadcast modes just before each of these COFDM frames is received. This makes it more practical for the parameters of COFDM frames transmitted in accordance with various transmission modes to change on a COFDM-frame-to-COFDM-frame basis, rather than being constrained only to change between sets of several COFDM frames.

In accordance with further aspects of the invention, plural-bit binary sequences of a prescribed sort modulate the continual pilot carrier waves to signal the outsets of COFDM frames, to provide COFDM receivers with time references for processing other binary sequences modulating the continual pilot carrier waves.

Figure 6:
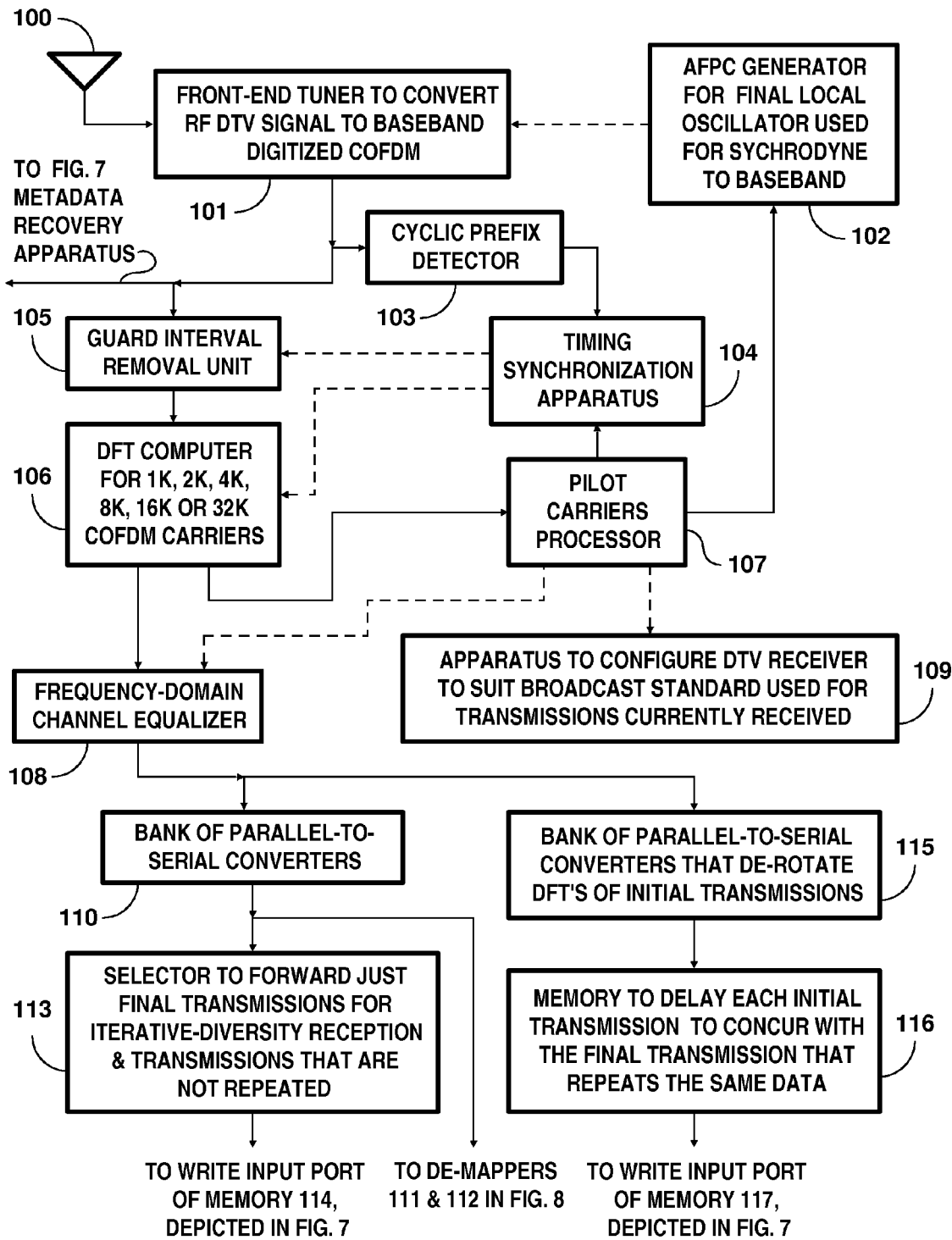
FIGS. 6, 7 and 8 together form a schematic diagram of COFDM receiver apparatus.
Figure 15:
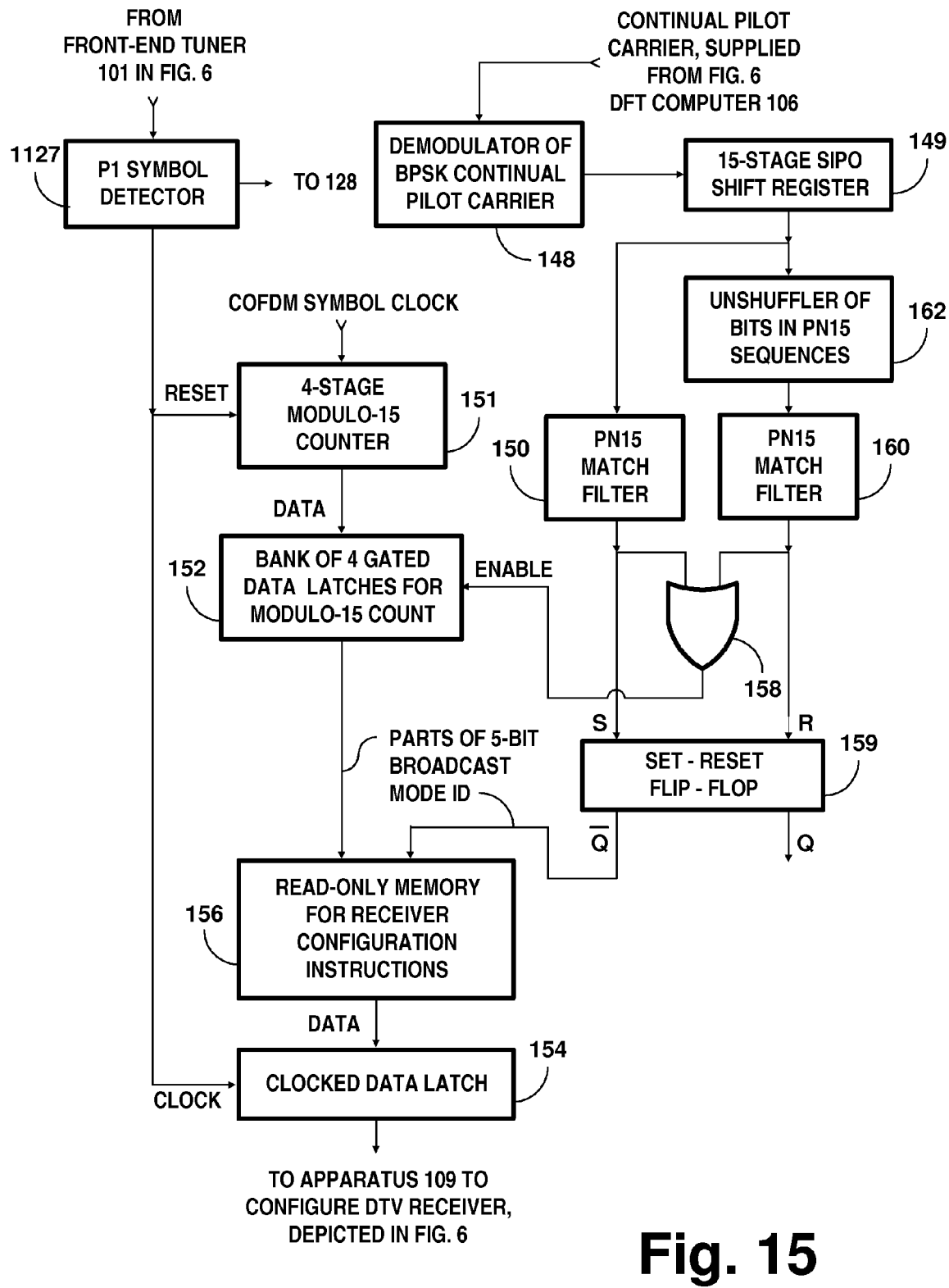
Figure 16:
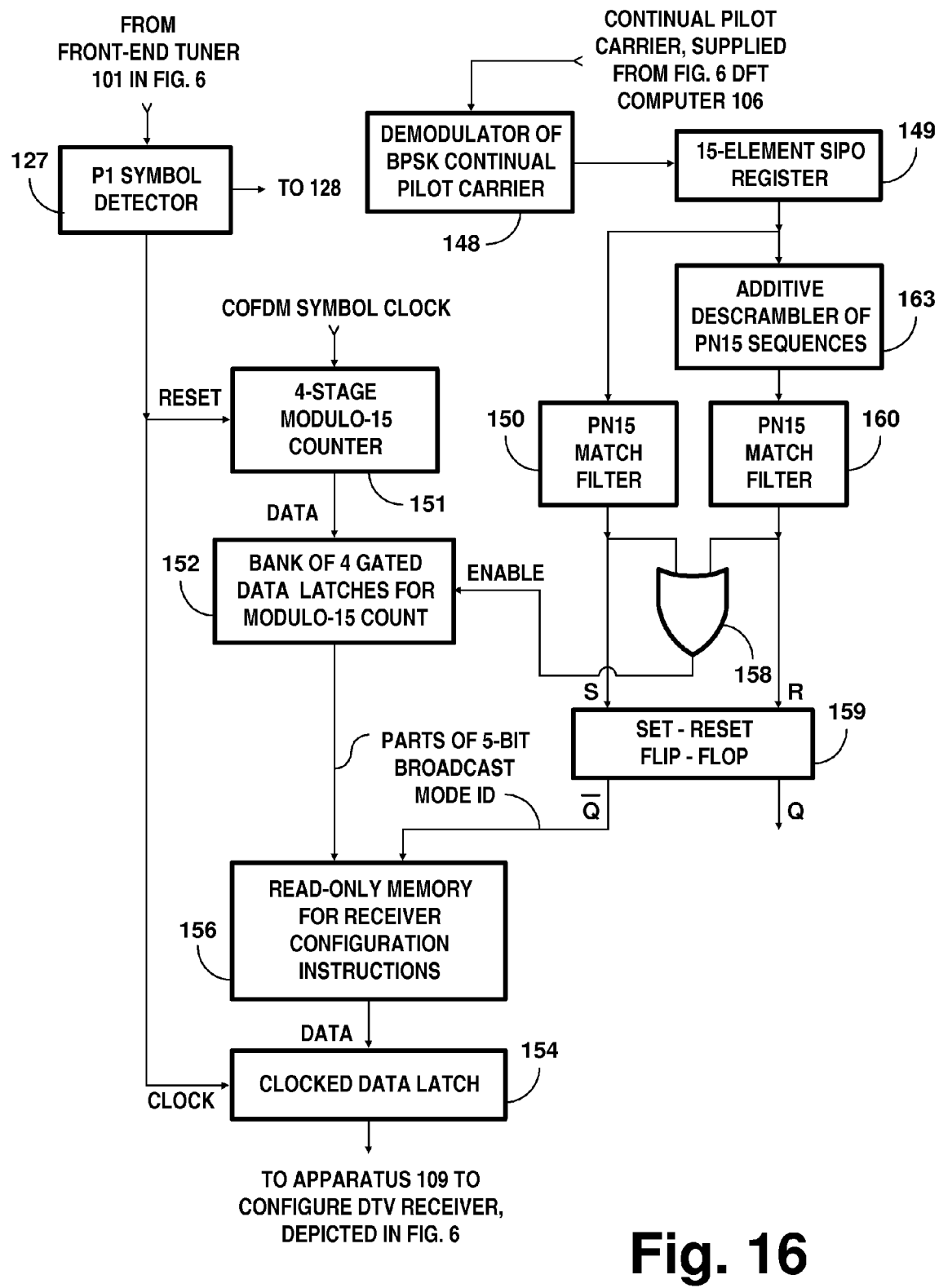

Each of FIGS. 15 and 16 is a detailed schematic diagram of another different representative portion of the pilot carriers processor depicted in FIG. 6, which other portion in accordance with aspects of the invention detects which one of a possible thirty broadcast standards is employed in COFDM frames that are next to be received.

Figure 17:
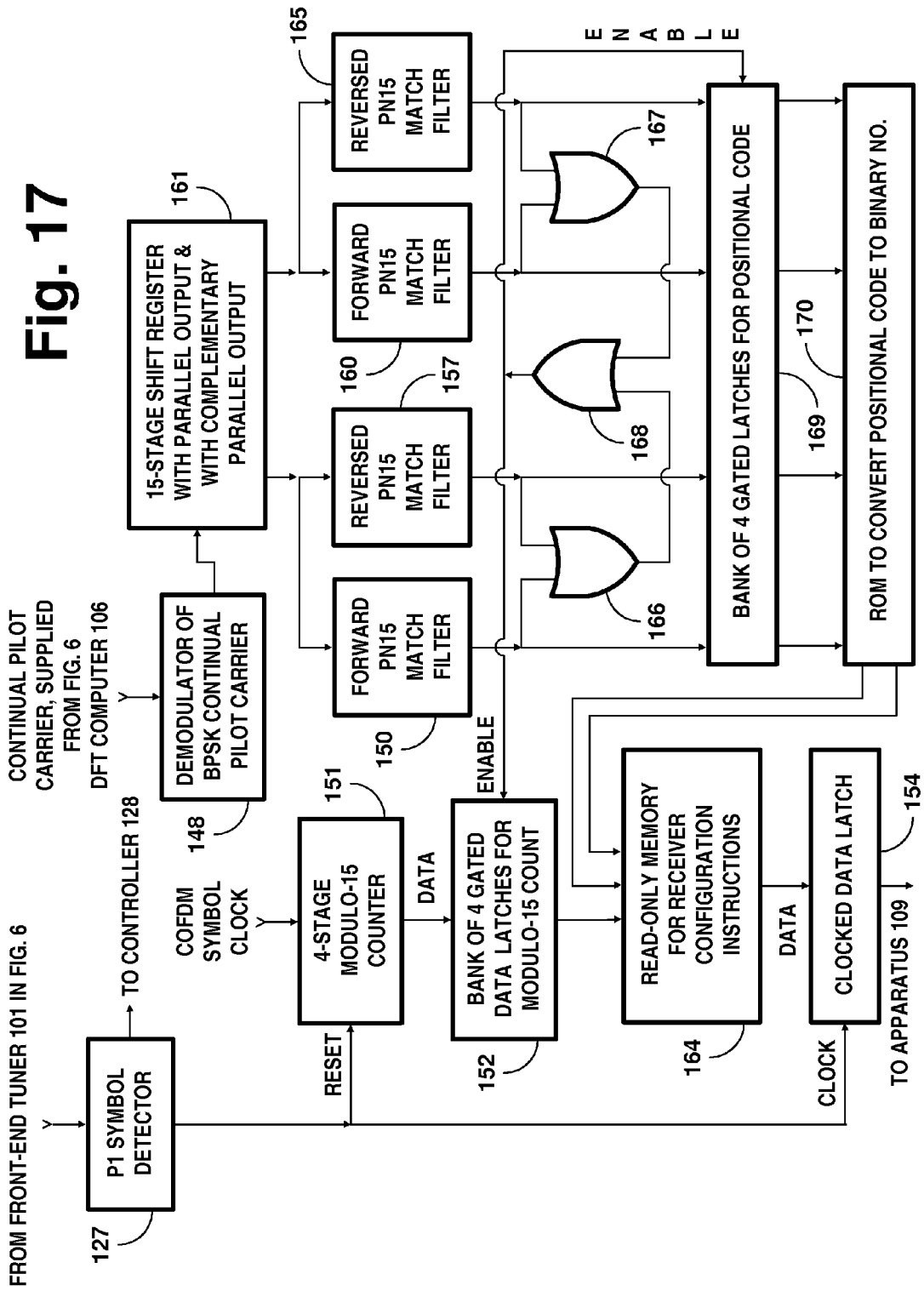
Figure 18:
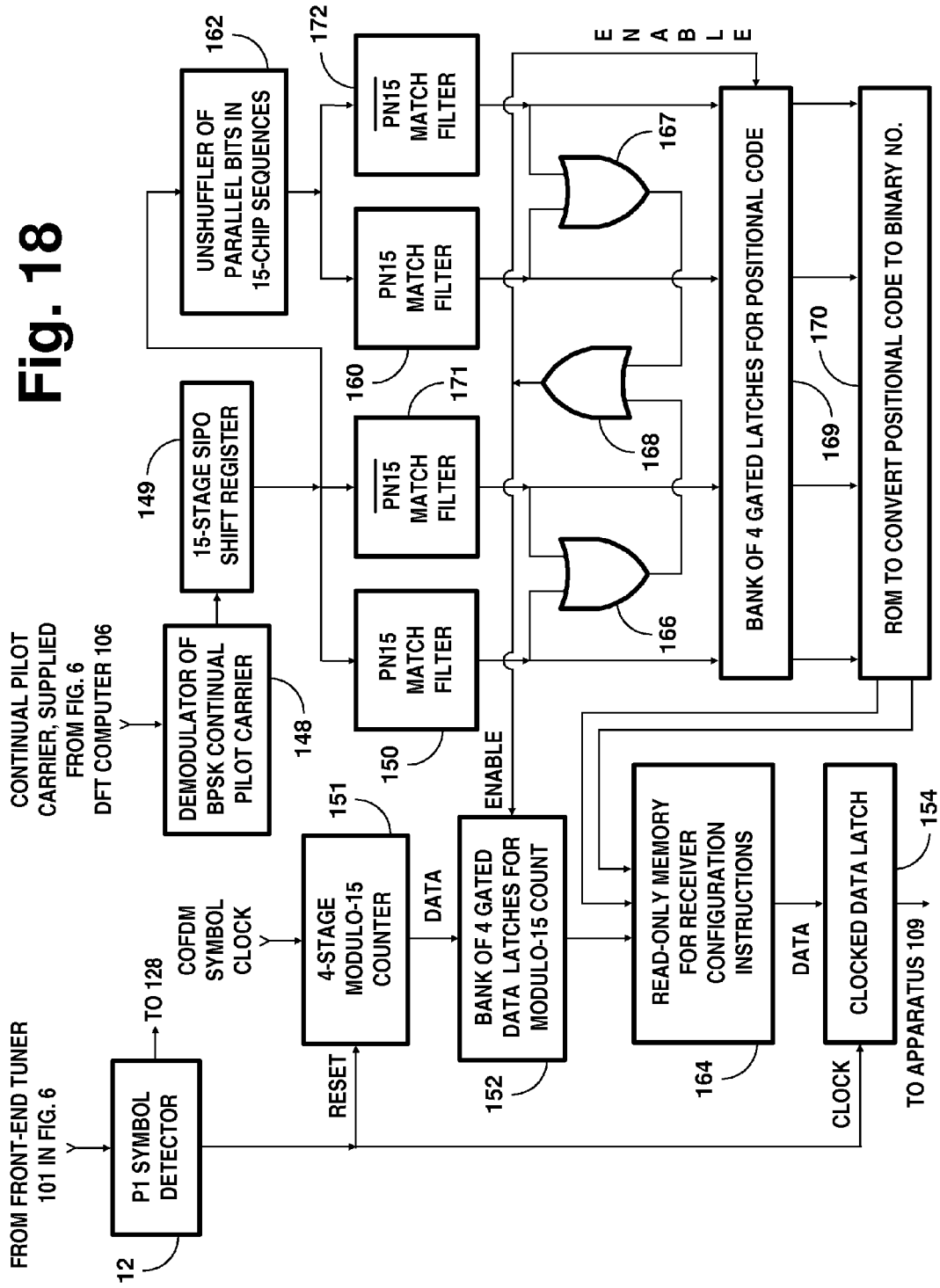
Figure 19:
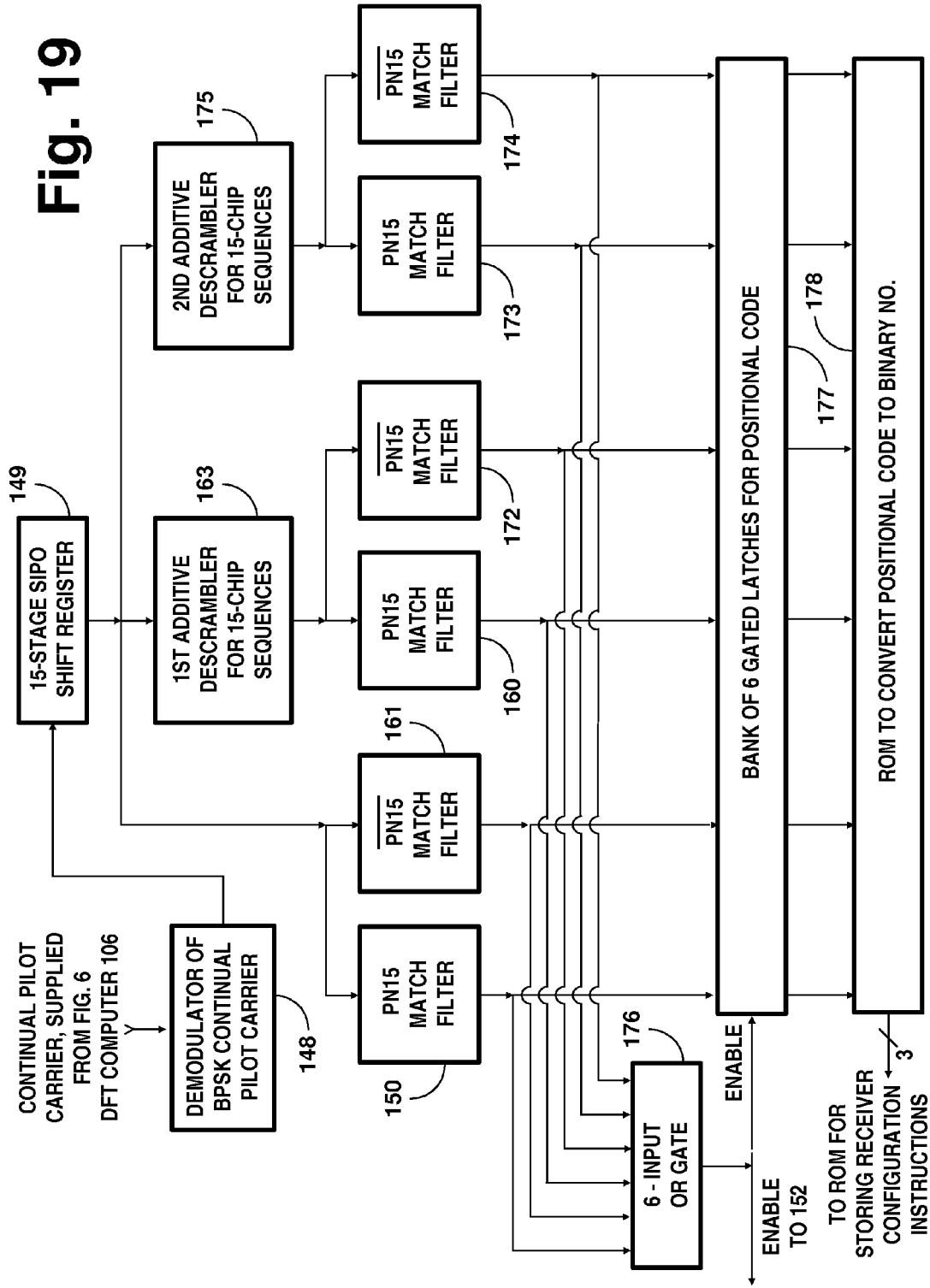

Each of FIGS. 17 and 18 is a detailed schematic diagram of a different representative portion of the pilot carriers processor depicted in FIG. 6, which portion in accordance with aspects of the invention detects which one of a possible sixty broadcast standards is employed in COFDM frames that are next to be received FIG. 19 is a detailed schematic diagram of a modification of the portion of the pilot carriers processor depicted in FIG. 6, which portion in accordance with aspects of the invention detects which one of a possible ninety broadcast standards is employed in COFDM frames that are next to be received.

Figure 20:
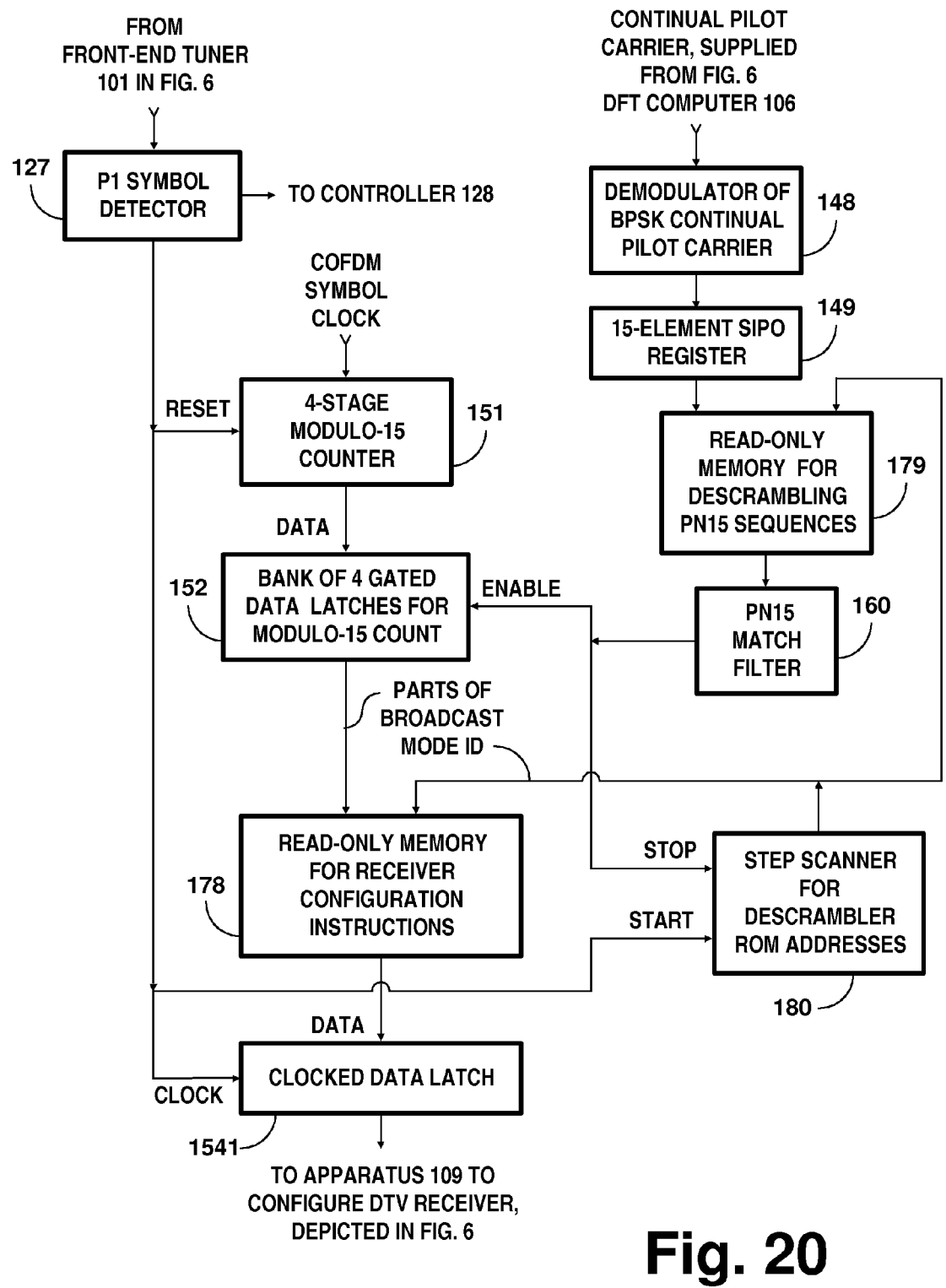
Figure 21:
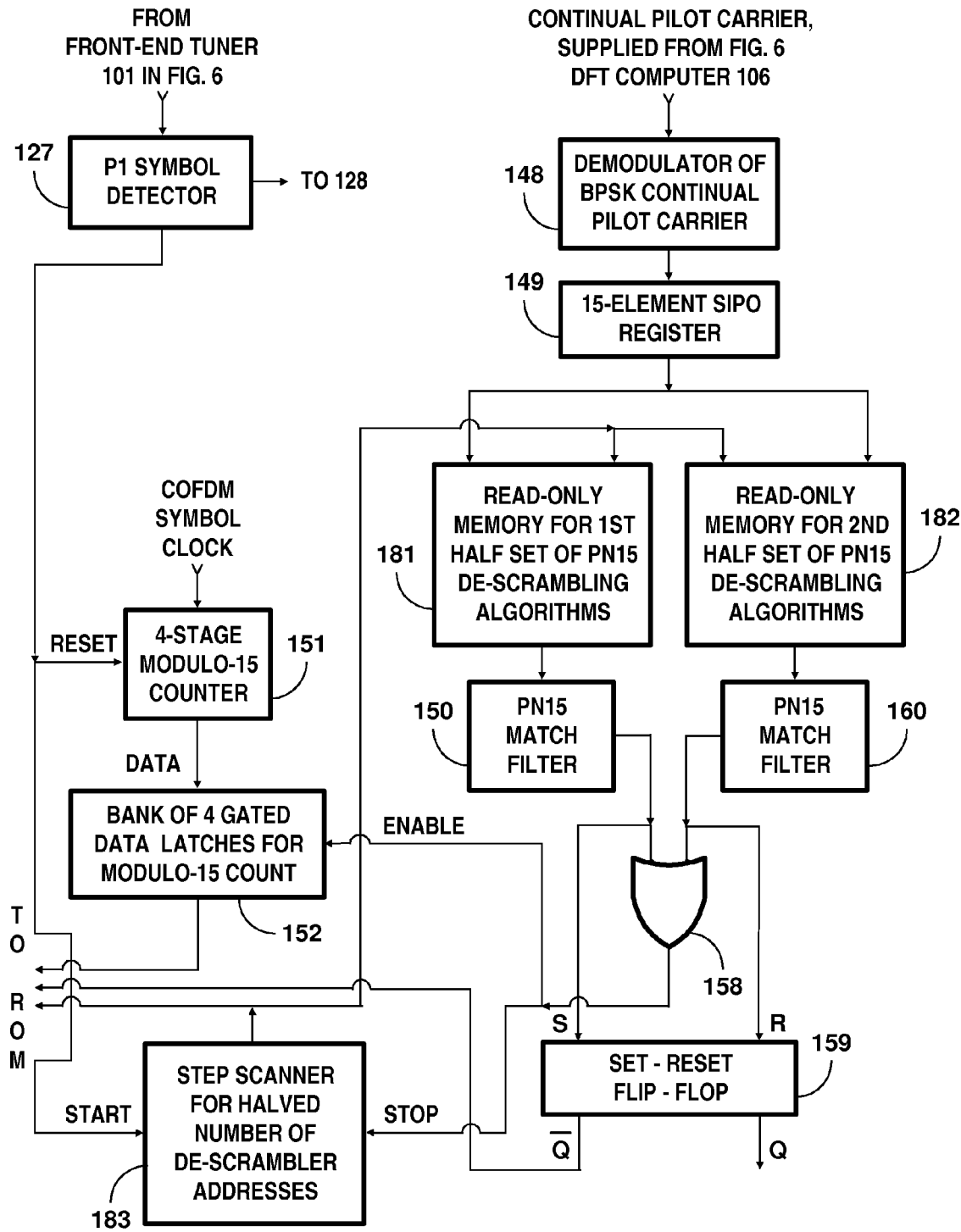
Figure 22:
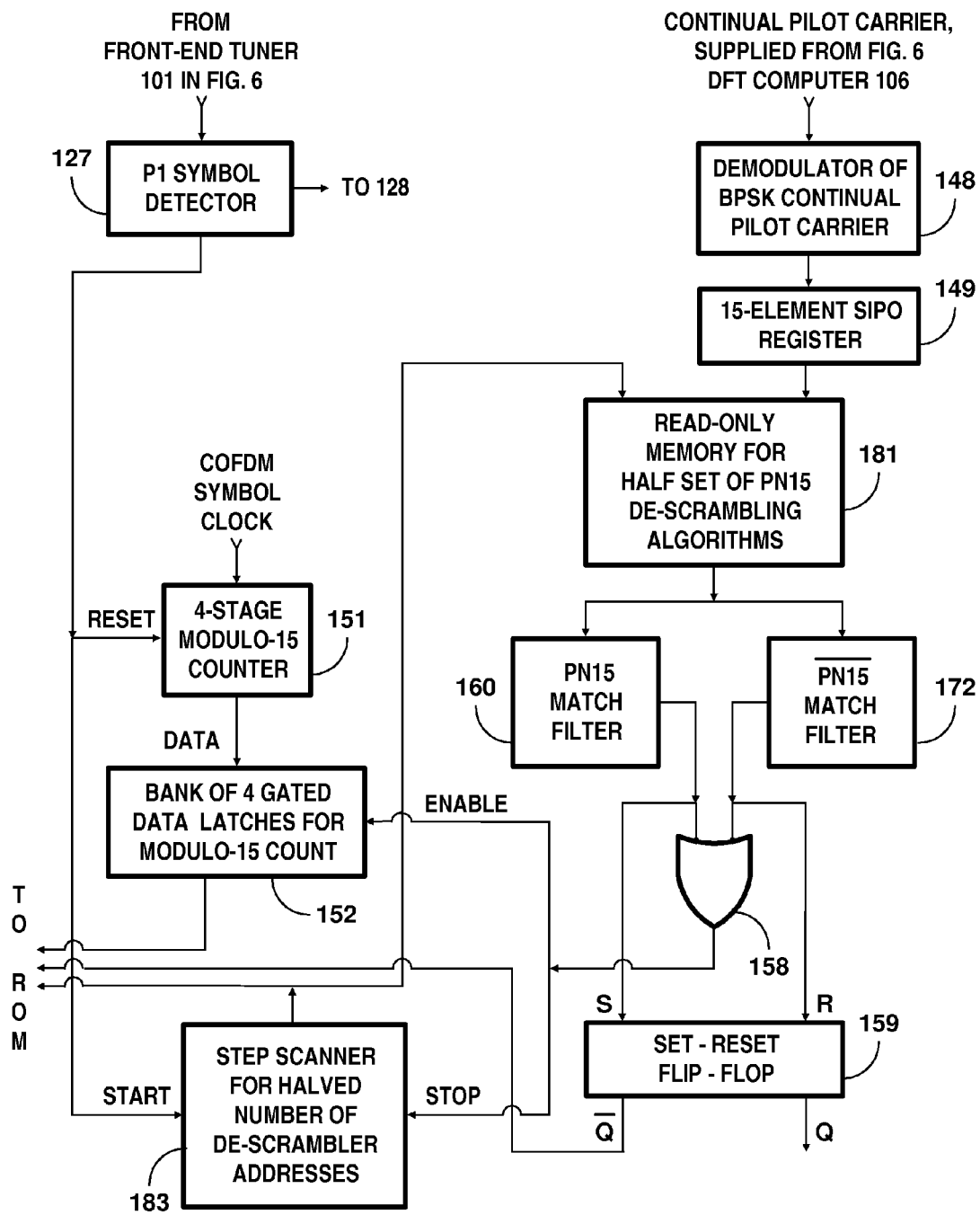

Each of FIGS. 20, 21 and 22 is a detailed schematic diagram of a modification of the portion of the pilot carriers processor depicted in FIG. 16, each of which modifications is made in accordance with a further aspect of the invention.

Figure 4:
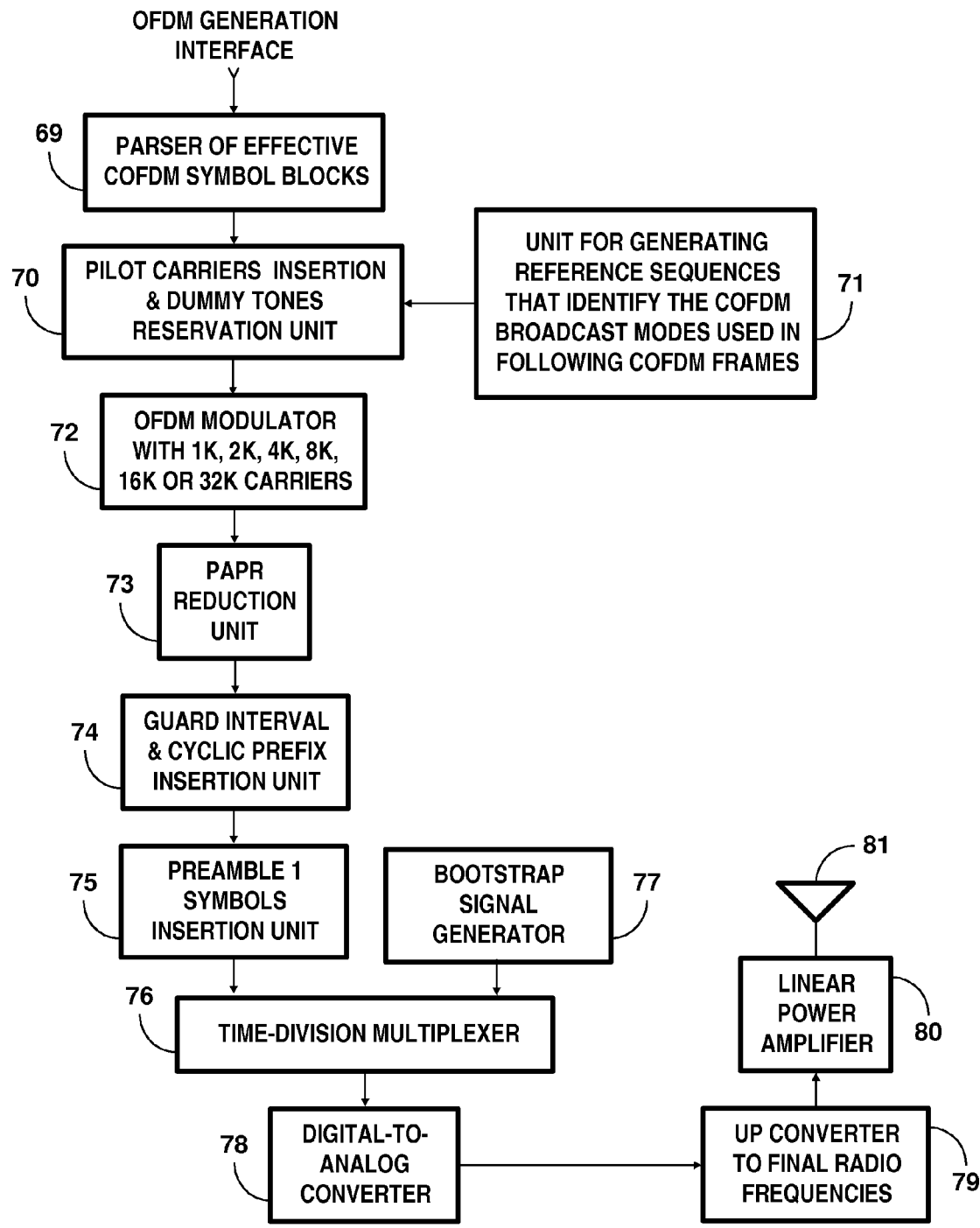
Figure 23:
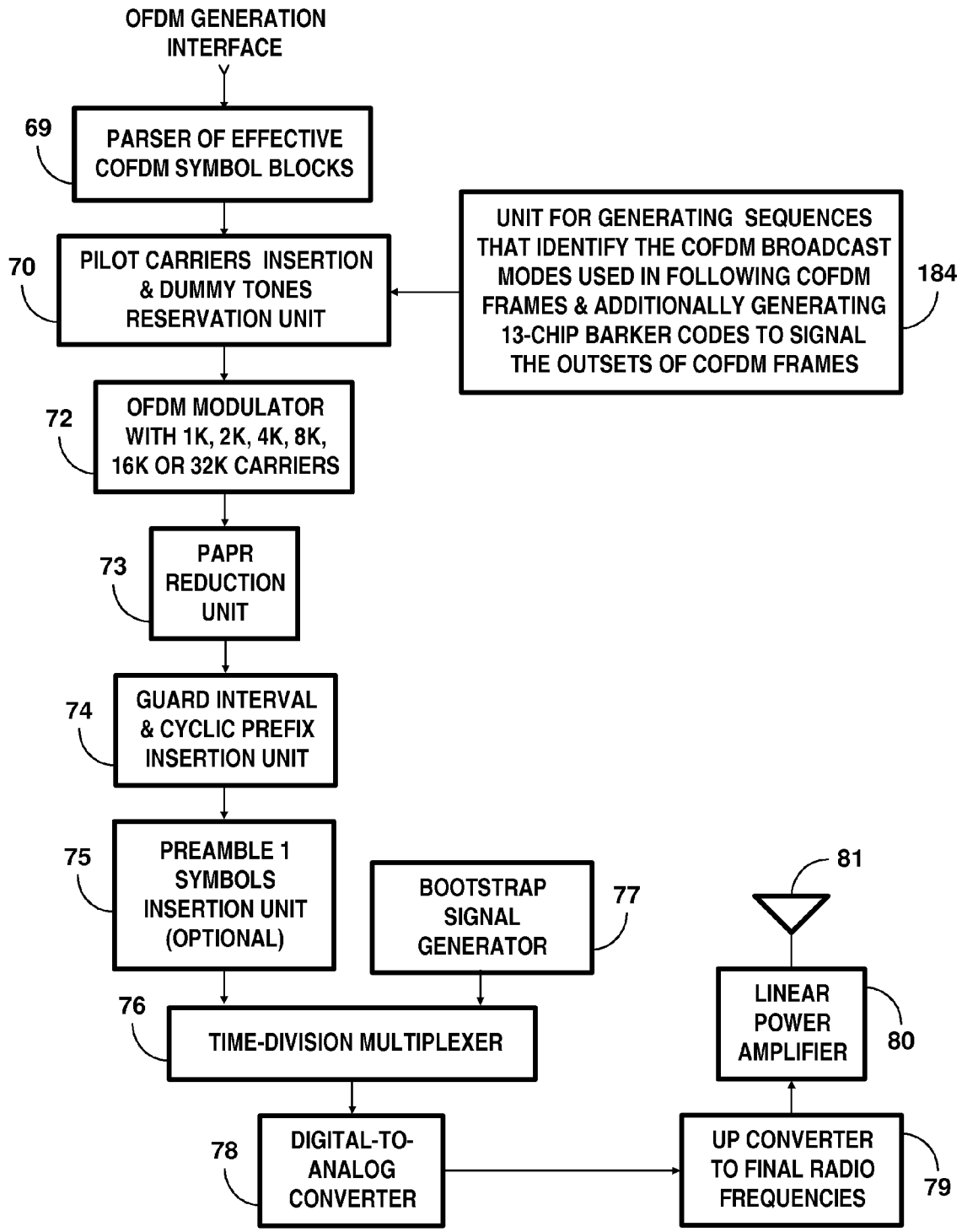

FIG. 23 is a schematic diagram of a modification of the portion of COFDM transmitter apparatus depicted in FIG. 4, which modification in accordance with a further aspect of the invention arranges periodic modulation of continual pilot carrier waves with a prescribed plural-bit binary sequence to signal the beginning of each COFDM frame.

Figure 24:
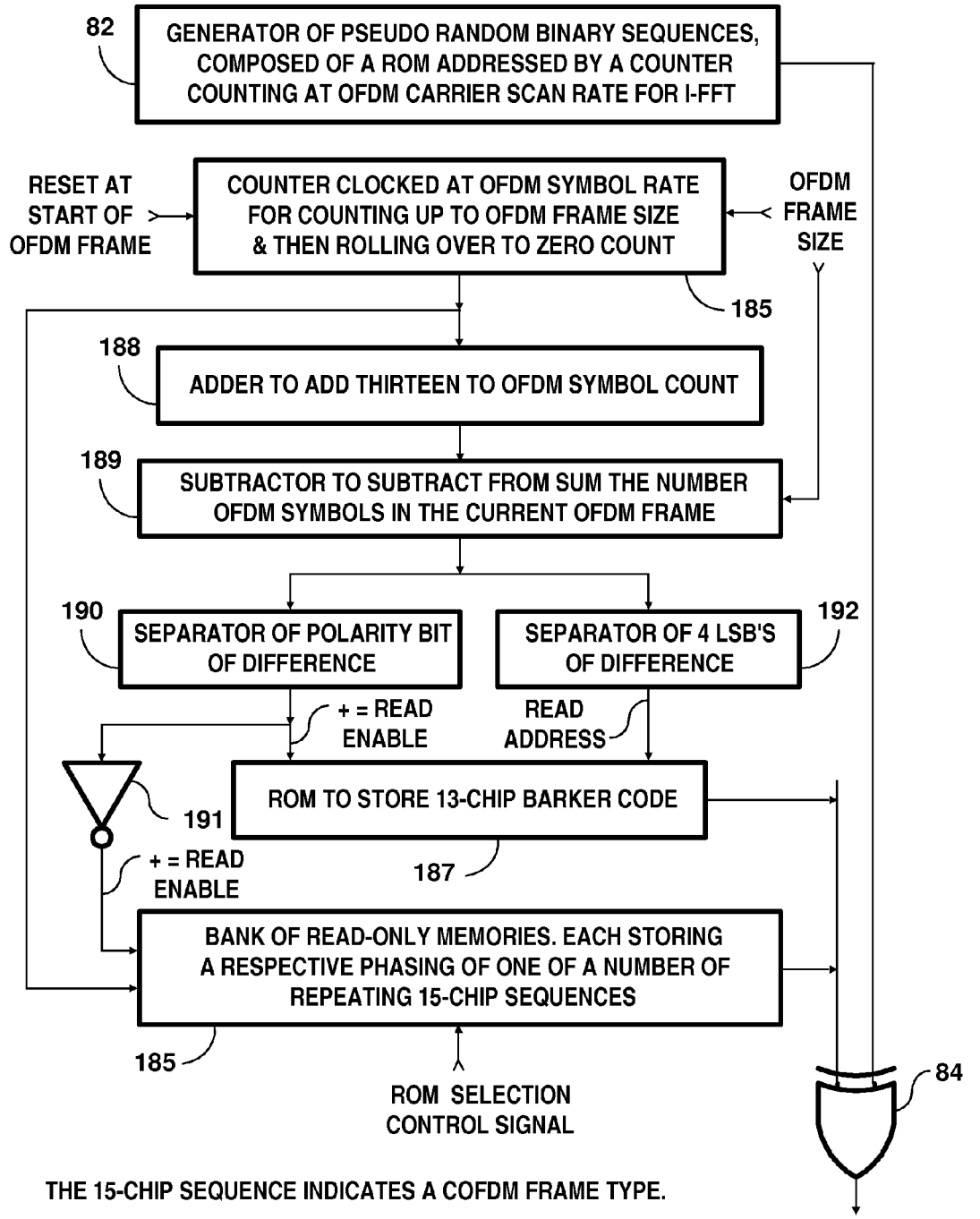
Figure 25:
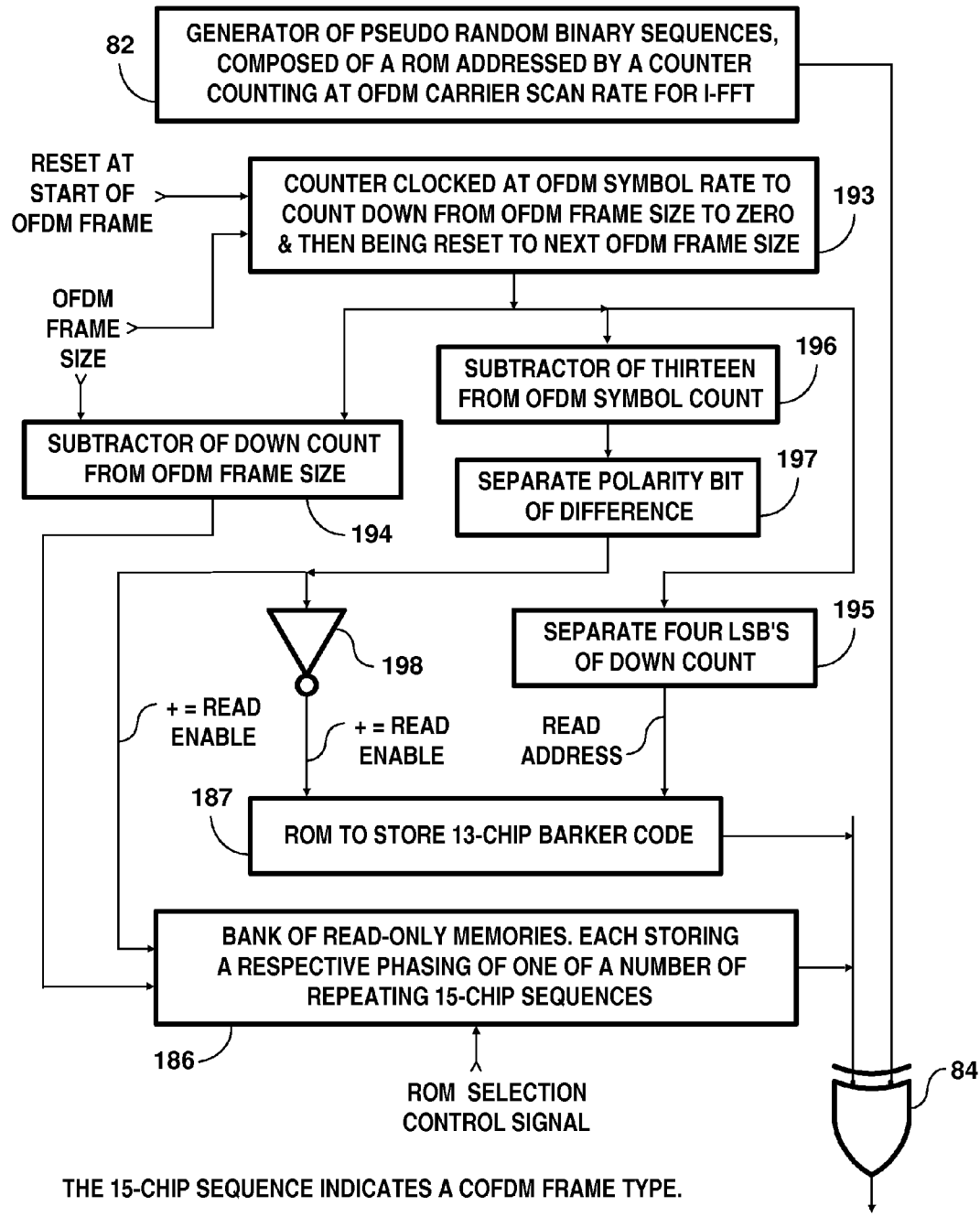

FIGS. 24 and 25 are detailed schematic diagrams of alternative specific constructions of the unit for generating periodic reference sequences to signal the beginning of COFDM frames in addition to generating repeating sequences that identify the current COFDM broadcast mode, which unit is depicted in general block form in FIG. 23.

Figure 5:
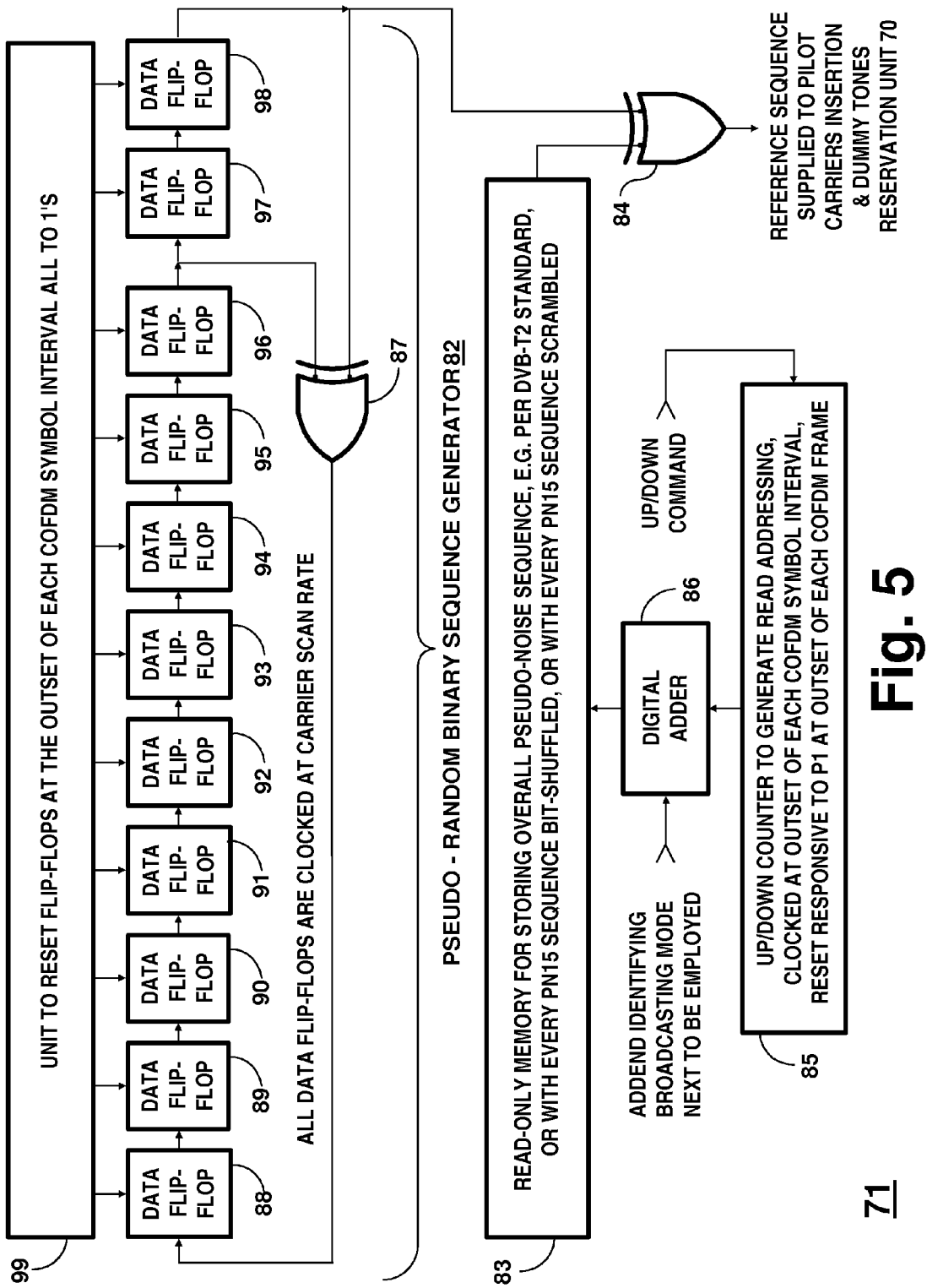
FIG. 5 is a detailed schematic diagram of a specific unit for generating a reference sequence that identifies the broadcast standard governing the nature of the current transmissions of COFDM transmitter apparatus in accordance with an aspect of the invention.
Figure 26:
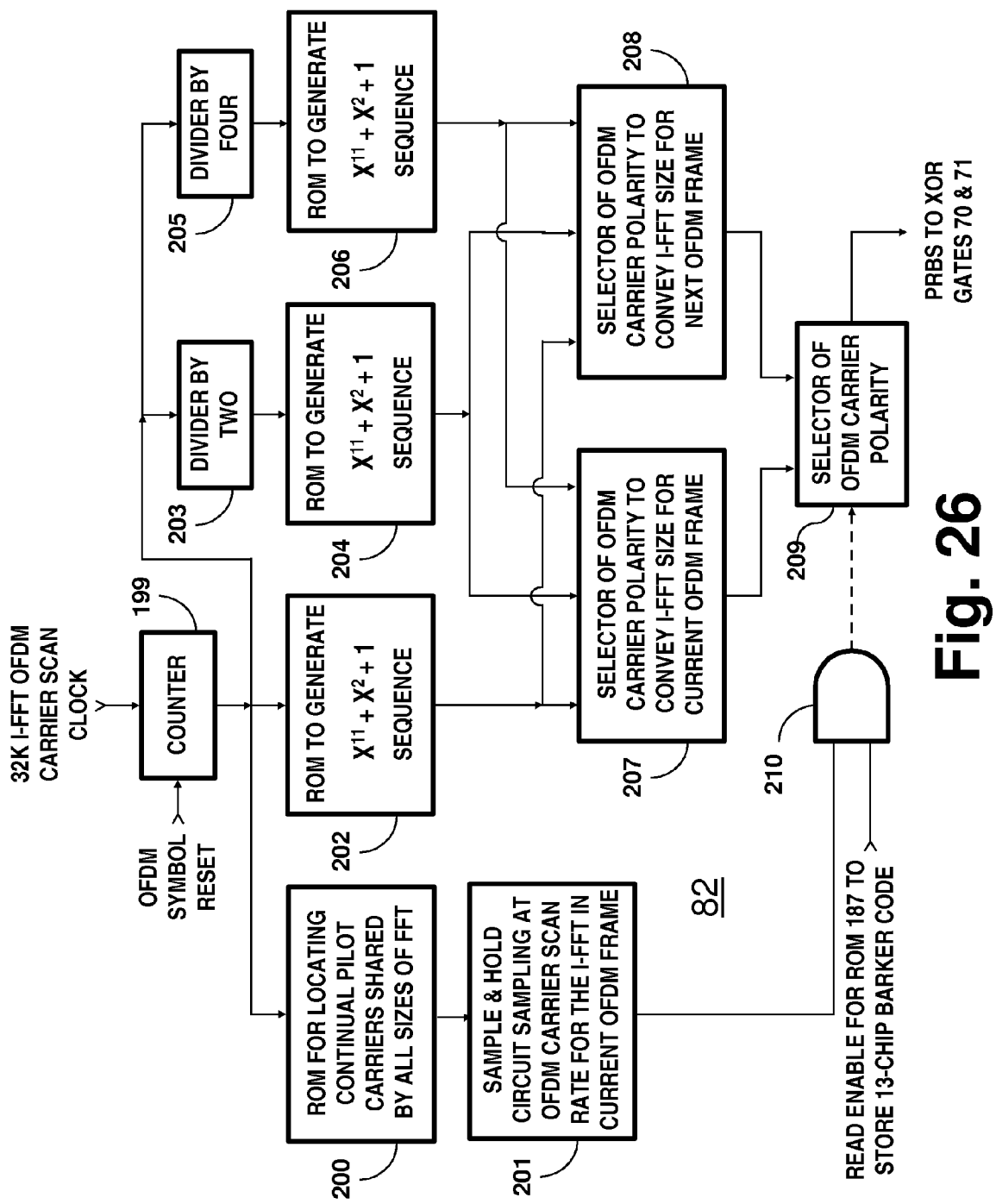

FIG. 26 is a schematic diagram depicting a specific structure for the PRBS generator depicted in each of FIGS. 5, 24 and 25, which specific structure in accordance with an aspect of the invention provides for advanced signaling of the inverse fast Fourier transform (I-FFT) of each successive OFDM frame.

Figure 12:
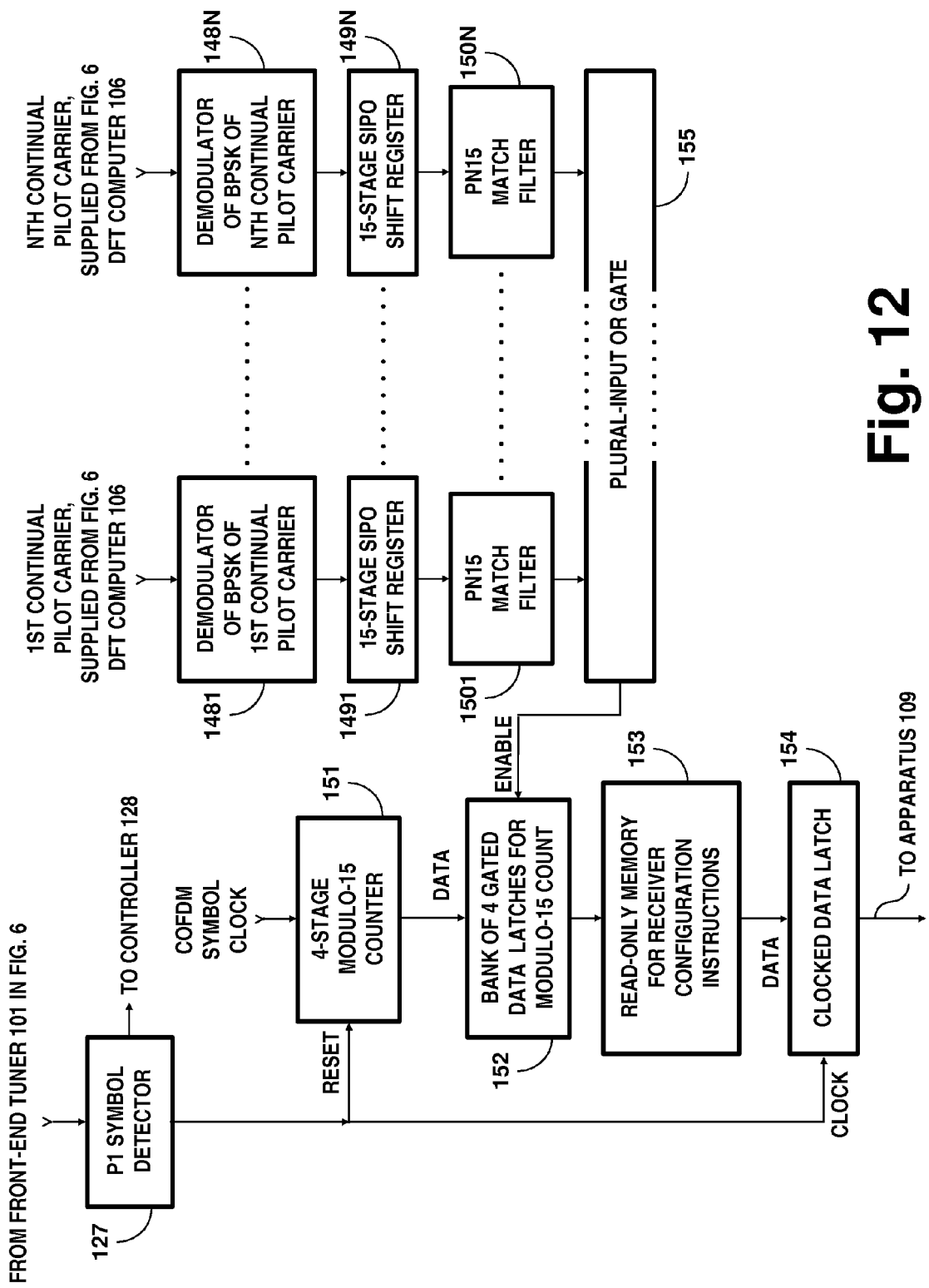
FIG. 12 is a detailed schematic diagram of a modification of representative portion of the pilot carriers processor depicted in FIG. 11, which modification helps overcome frequency-selective fading caused by multipath reception.
Figure 27:
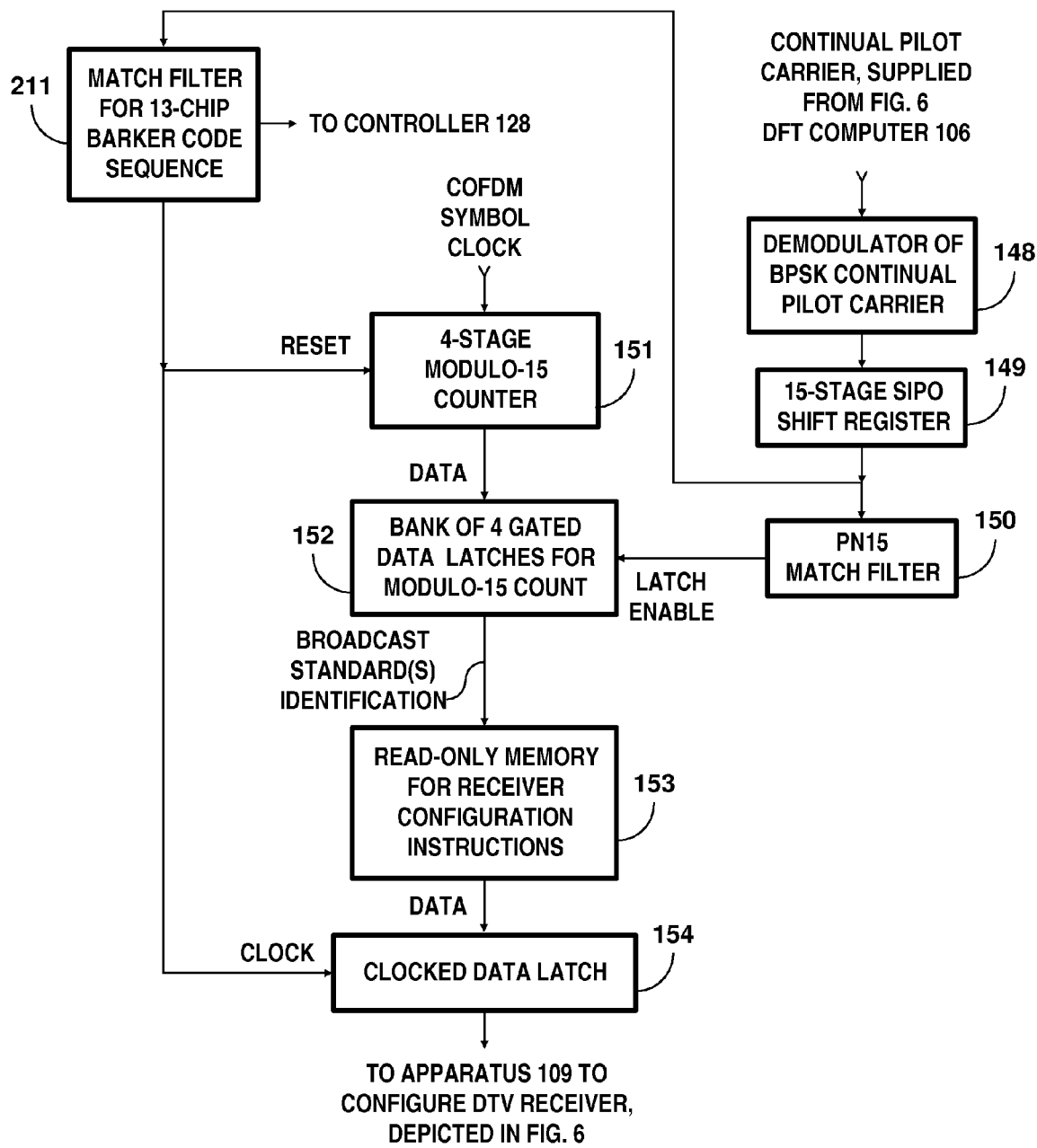

FIG. 27 is a detailed schematic diagram of a modification of the portion of the pilot carriers processor depicted in FIG. 12, which modification in accordance with an aspect of the invention utilizes prescribed plural-bit binary sequences modulating continual pilot carrier waves signaling the beginnings of COFDM frames as a time reference for processing other binary sequences modulating the continual pilot carrier waves.

Each of FIGS. 28, 29, 30, 31 and 32 is a detailed schematic diagram of a modification of the portion of the pilot carriers processor depicted in FIGS. 13, 14, 15, 16 and 17, respectively, which modification in accordance with an aspect of the invention utilizes prescribed plural-bit binary sequences modulating continual pilot carrier waves signaling the beginnings of COFDM frames as a time reference for processing other binary sequences modulating the continual pilot carrier waves.

Figure 33:
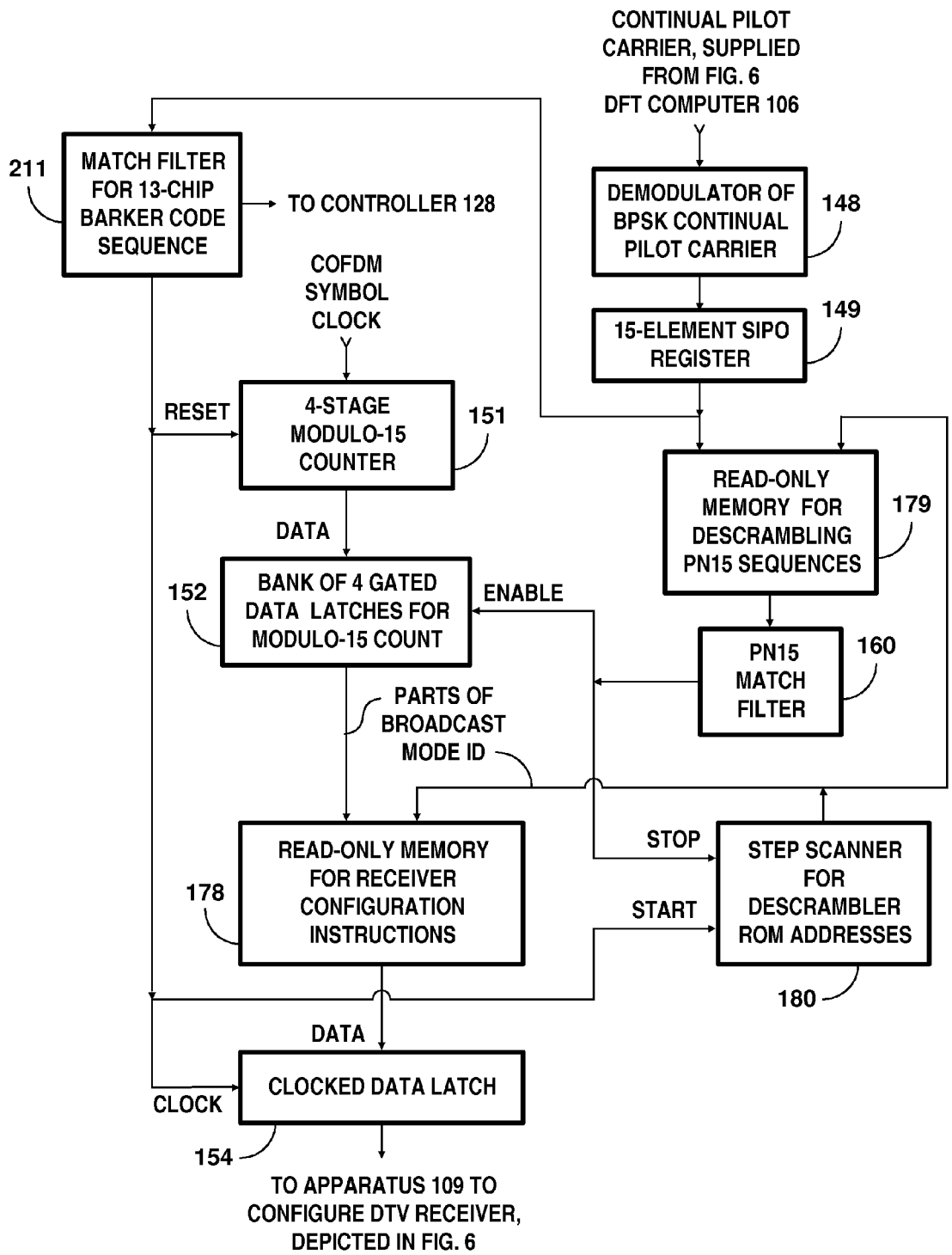
Figure 34:
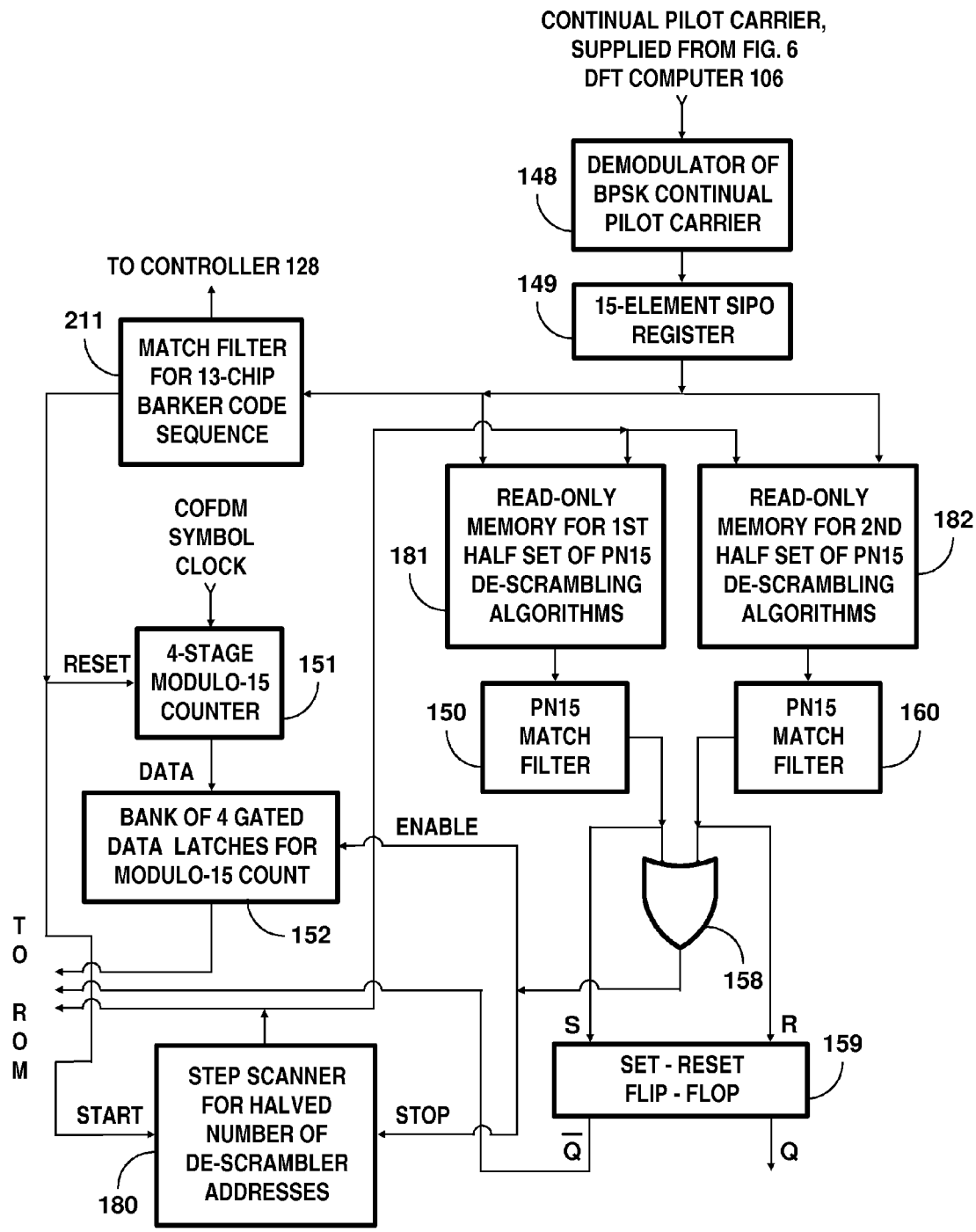
Figure 35:
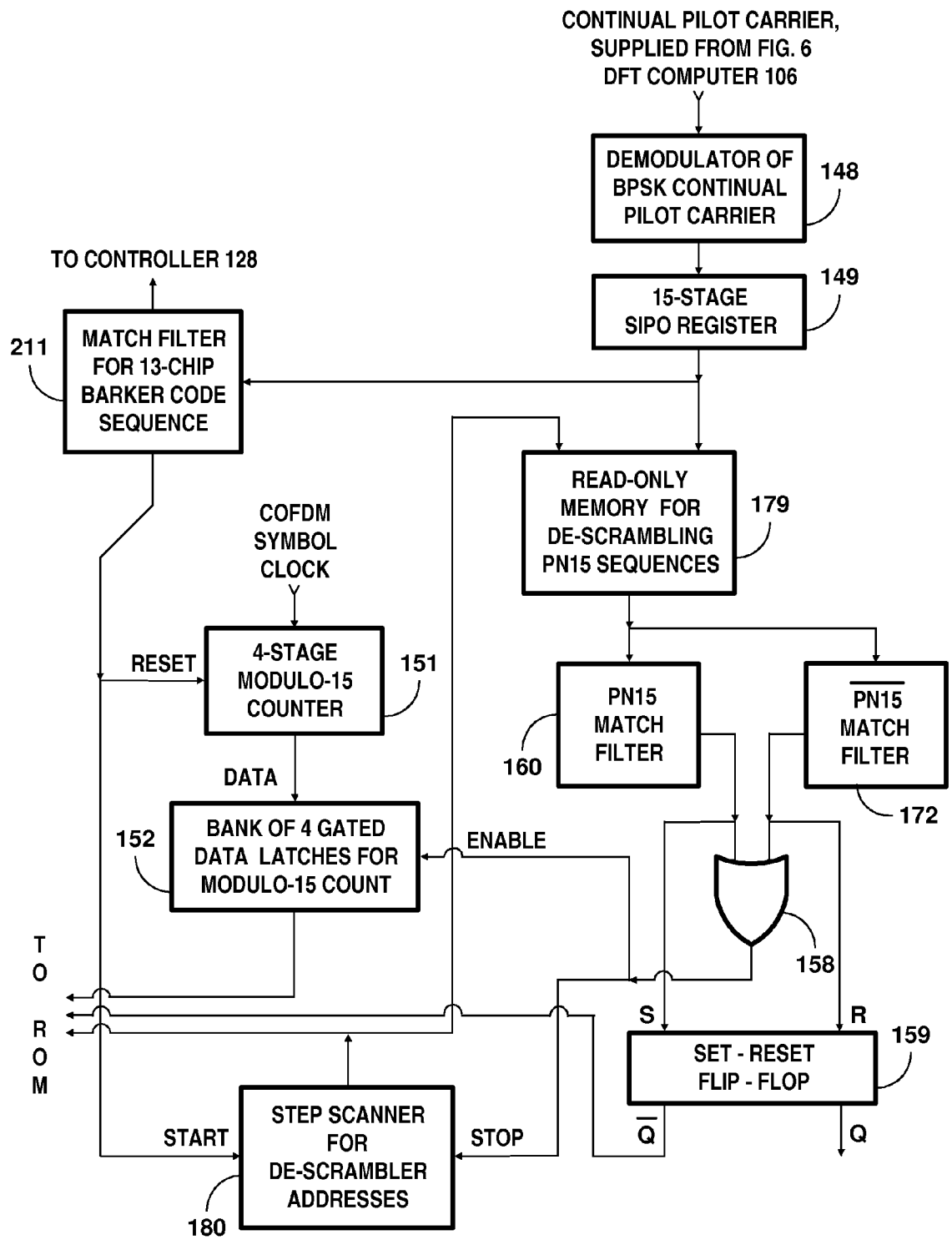

Each of FIGS. 33, 34 and 35 is a detailed schematic diagram of a modification of the portion of the pilot carriers processor depicted in FIGS. 20, 21 and 22, respectively, which modification in accordance with an aspect of the invention utilizes prescribed plural-bit binary sequences modulating continual pilot carrier waves signaling the beginnings of COFDM frames as a time reference for processing other binary sequences modulating the continual pilot carrier waves.

FIG. 36 is a table illustrating a set of fifteen possible patterns of transmitting a particular sort of COFDM frame identified as "A" that can be signaled by binary phase shift keying (BPSK) of pilot carrier waves in accordance with a repeating signature sequence, which particular sort of COFDM frame "A" is identified by a 15-chip sequence that is cyclically repeated in the BPSK, and which pattern of transmitting COFDM frames "A" is specified by the phasing of the 15-chip sequences in their repetition.

FIG. 37 is a table illustrating a set of fifteen further possible patterns of transmitting a particular sort of COFDM frame identified as "A" that can be signaled by binary phase shift keying (BPSK) of pilot carrier waves in accordance with another cyclically repeating signature sequence.

DETAILED DESCRIPTION

Figure 1:
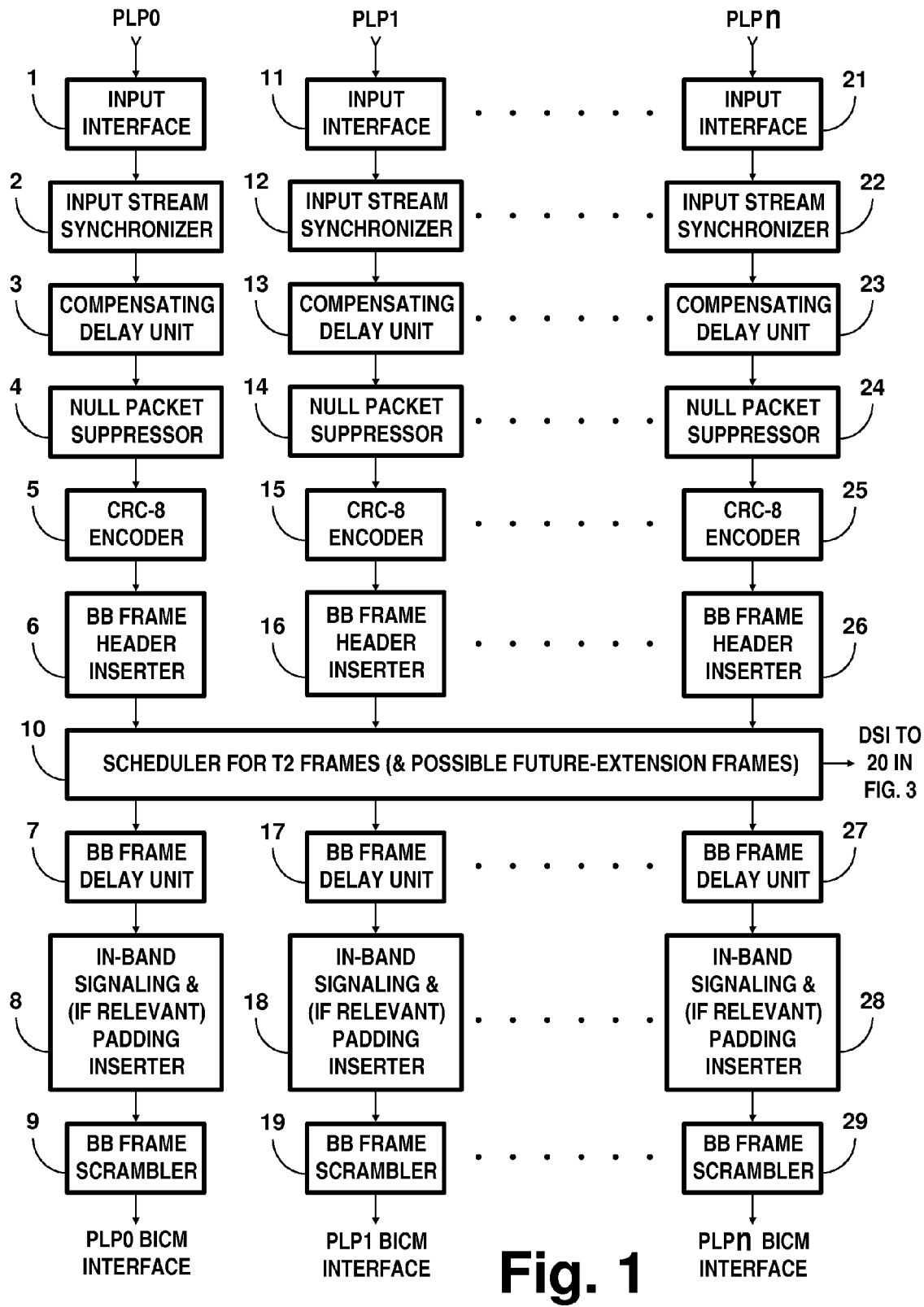
FIGS. 1, 2, 3 and 4 together form a schematic diagram of COFDM transmitter apparatus embodying aspects of the invention, which transmitter apparatus generates pilot carrier waves that collectively identify the broadcast standard governing the nature of the current transmissions generated by that COFDM transmitter apparatus.
Figure 2:
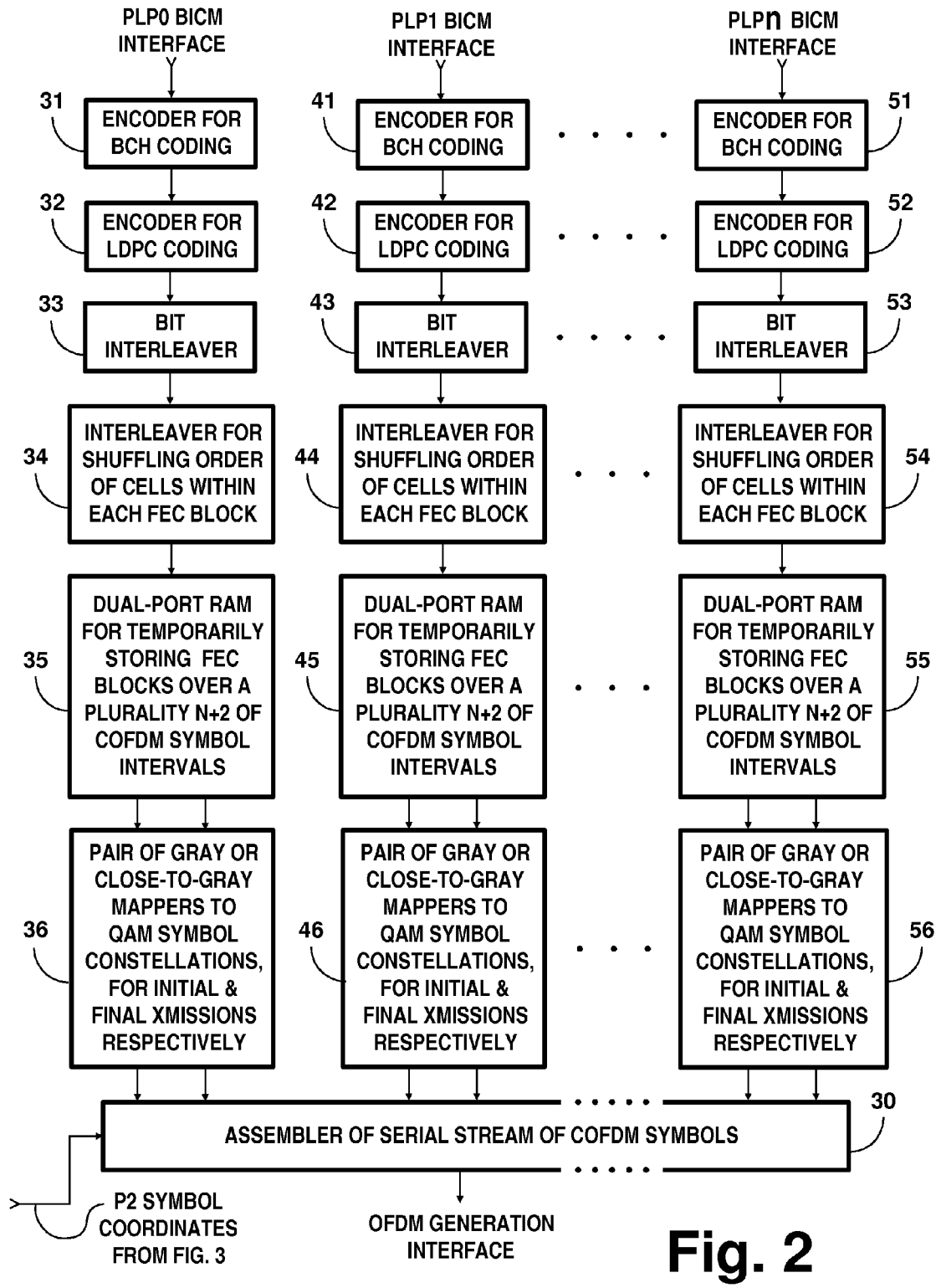
Figure 3:
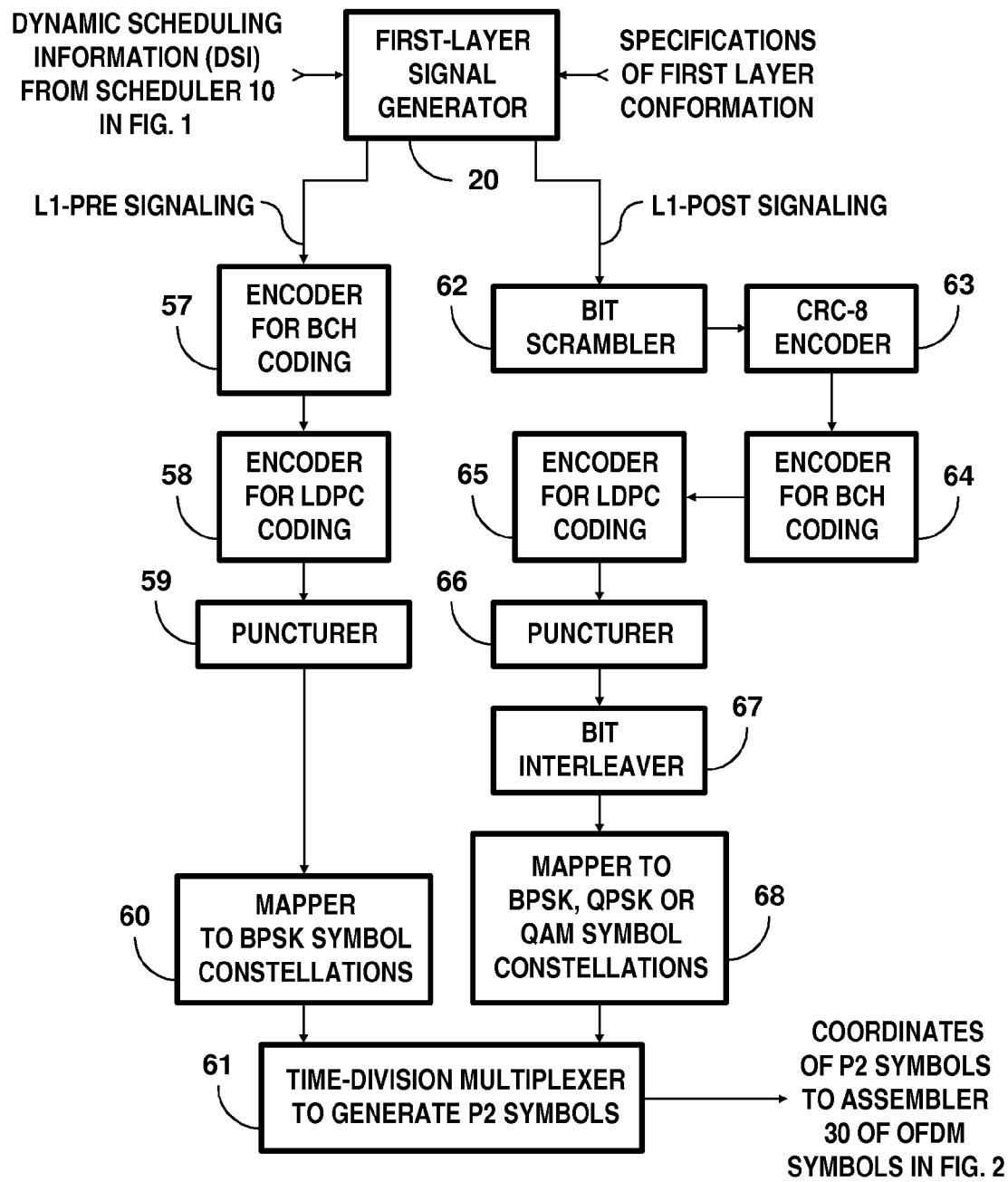

FIGS. 1, 2, 3 and 4 depict a DTV transmitter apparatus generating COFDM signals designed for reception by DTV receivers. FIG. 1 depicts apparatus for generating baseband frames (BBFRAMES) at a Bit-Interleaved Coding and Modulation (BICM) interface. FIG. 2 depicts apparatus for generating bit-wise forward-error-correction (FEC) coding and subsequent COFDM symbol blocks responsive to the BBFRAMEs supplied at the BICM interface. FIG. 3 depicts apparatus for generating bit-wise forward-error-correction (FEC) coding and subsequent COFDM symbol blocks responsive to first layer (L1) conformation specifications and to dynamic scheduling information (DSI). FIG. 4 depicts apparatus for generating and transmitting radio-frequency COFDM signals. Except for the processing of QAM symbol constellations into COFDM symbols, the DTV transmitter apparatus depicted in FIGS. 1, 2, 3 and 4 is essentially the same as specified in ETSI standard EN 302 755 V1.3.1 published in April 2012, titled "Digital Video Broadcasting (DVB); Frame structure channel coding and modulation for a second generation digital terrestrial television broadcasting system (DVB-T2)".

A scheduler 10 for interleaving time-slices of services to be broadcast to stationary DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-(n+1) numbering system. The scheduler 10 also generates and schedules dynamic scheduling information (DSI) for application to apparatus depicted in FIG. 3, which apparatus generates the P2 portions of COFDM frame preambles. Recommended practice is that at least the physical layer pipe PLP0 is a so-called "common" PLP used for transmitting data, such as a program guide, relating to the other "data" PLPs. The common PLP or PLPs are transmitted in each T2 frame following the P1 and P2 symbols, but before the data PLP or PLPs. A data PLP may be of a first type transmitted as a single slice per T2 frame, or a data PLP may be of a second type transmitted as a plurality of sub-slices disposed in non-contiguous portions of each T2 frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 bit-interleaved coding and modulation (BICM) interface. More specifically, FIG. 1 indicates that a PLP0 stream of logical digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is not sufficient to completely fill a BBFRAME, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 BICM interface. In practice the delay unit 7, the inserter 8 and the BBFRAME scrambler 9 are realized by suitable configuration of a random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 bit-interleaved coding and modulation (BICM) interface. More specifically, FIG. 1 indicates that a PLP1 stream of logical digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data randomizes bits of the BBFRAME supplied from the output port of the BBFRAME scrambler 19 as the PLP1 BICM interface. In practice the delay unit 17, the inserter 18 and the BBFRAME scrambler 19 are realized by suitable operation of a random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn bit-interleaved coding and modulation (BICM) interface. More specifically, FIG. 1 indicates that a PLPn stream of logical digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn BICM interface. In practice the delay unit 27, the inserter 28 and the BBFRAME scrambler 29 are realized by suitable operation of a random-access memory.

The input stream synchronizers 2, 12, 22 etc. are operable to guarantee Constant Bit Rate (CBR) and constant end-to-end transmission delay for any input data format when there is more than one input data format. Some transmitters may not include ones of the input stream synchronizers 2, 12, 22 etc. or ones of the compensating delay units 3, 13, 23 etc. For some Transport-Stream (TS) input signals, a large percentage of null-packets may be present in order to accommodate variable bit-rate services in a constant bit-rate TS. In such a case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions they originally were in, thus guaranteeing constant bit-rate and avoiding the need for updating the Programme Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 depicts the (n+1)th physical layer pipe PLP0 further comprising elements 31-36 in cascade connection after the PLP0 BICM interface, but before a respective input port of an assembler 30 for assembling a serial stream of OFDM symbols. More specifically, FIG. 2 depicts an encoder 31 for BCH coding with its input port connected to receive the PLP0 BICM interface signal from the output port of the BBFRAME scrambler 9 and with its output port connected to the input port of an encoder 32 for LDPC coding. FIG. 2 depicts the output port of the encoder 32 for LDPC coding connected to the input port of a bit interleaver 33, the output port of which is connected for applying bit-interleaved bit-wise FEC coding to the input port of a further interleaver 34 that shuffles the order of the QAM symbols in each successive FEC block. This shuffling implements cyclic delay diversity (CDD) that helps the FEC coding to overcome fading. The output port of the interleaver 34 connects to the write-input port of dual-port random-access memory 35. The dual-port RAM 35 is capable of temporarily storing each FEC block for a plurality of OFDM symbol intervals to implement the single-time retransmission of FEC blocks from the (n+1)th physical layer pipe PLP0, as explained in more detail with reference to FIG. 5 further on in this specification. In practice the interleaver 34 (and possibly the bit interleaver 33 as well) may be subsumed into the dual-port RAM 35 by appropriately controlling the read addressing and write addressing thereof.

The two read-output ports of the dual-port RAM 35 connect to respective input ports of a pair 36 of mappers for mapping successive bits of the interleaved bit-wise FEC coding to successive QAM symbol constellations. In the case of transmissions broadcast for reception by stationary DTV receivers, these QAM symbol constellations are apt to be square 256QAM symbol constellations or cruciform 512QAM symbol constellations, by way of specific examples. In the case of transmissions broadcast for reception by mobile DTV receivers, these QAM symbol constellations are apt to be square 16QAM symbol constellations, square 64QAM symbol constellations or cruciform 128QAM symbol constellations, by way of specific examples.

Each of the pair 36 of mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLP0. A first of the pair 36 of mappers responds to the consecutive segments of the interleaved bit-wise FEC coding in initial transmissions thereof to generate the complex coordinates of successive QAM constellations. A second of the pair 36 of mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to first and second patterns, respectively. Bits that map to lattice points in the first mapping pattern more likely to experience error are mapped to lattice points in the second mapping pattern less likely to experience error. Bits that map to lattice points in the second mapping pattern more likely to experience error are mapped to lattice points in the first mapping pattern less likely to experience error. The complex coordinates of the QAM symbol constellations are supplied from the respective output ports of the pair of 36 of mappers to respective input ports of an assembler 30 for assembling a stream of OFDM symbols.

FIG. 2 depicts the first physical layer pipe PLP1 further comprising elements 41-46 in cascade connection after the PLP1 BICM interface, but before a respective input port of the assembler 30 for assembling a serial stream of OFDM symbols. More specifically, FIG. 2 depicts an encoder 41 for BCH coding with its input port connected to receive the PLP1 BICM interface signal from the output port of the BBFRAME scrambler 19 and with its output port connected to the input port of an encoder 42 for LDPC coding. FIG. 2 depicts the output port of the encoder 42 for LDPC coding connected to the input port of a bit interleaver 44, the output port of which is connected for applying bit-interleaved bit-wise FEC coding to the input port of a further interleaver 45 that shuffles the order of the QAM symbols in each successive FEC block. This shuffling implements cyclic delay diversity (CDD) that helps the FEC coding to overcome fading. The output port of the interleaver 44 connects to the write-input port of dual-port random-access memory 45. The dual-port RAM 45 is capable of temporarily storing each FEC block for a plurality of OFDM symbol intervals to implement the single-time retransmission of FEC blocks from the first physical layer pipe PLP1, as explained in more detail with reference to FIG. 5 further on in this specification. In practice the interleaver 44 (and possibly the bit interleaver 43 as well) may be subsumed into the dual-port RAM 45 by appropriately controlling the read addressing and write addressing thereof.

The two read-output ports of the dual-port RAM 45 connect separately to respective input ports of a pair 46 of mappers for mapping successive bits of the interleaved bit-wise FEC coding to successive QAM symbol constellations. Each of the pair 46 of mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLP1. A first of the pair 46 of mappers responds to the consecutive segments of the interleaved bit-wise FEC coding in initial transmissions thereof to generate the complex coordinates of successive QAM constellations. A second of the pair 46 of mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to third and fourth patterns, respectively. Bits that map to lattice points in the third mapping pattern more likely to experience error are mapped to lattice points in the fourth mapping pattern less likely to experience error. Bits that map to lattice points in the fourth mapping pattern more likely to experience error are mapped to lattice points in the third mapping pattern less likely to experience error. The complex coordinates of the QAM symbol constellations are supplied from the respective output ports of the pair of 46 of mappers to respective input ports of the assembler 30 for assembling a stream of OFDM symbols.

FIG. 2 depicts the (n)th physical layer pipe PLPn further comprising elements 51-56 in cascade connection after the PLPn BICM interface, but before a respective input port of the assembler 30 for assembling a serial stream of OFDM symbols. More specifically, FIG. 2 depicts an encoder 51 for BCH coding with its input port connected to receive the PLPn BICM interface signal from the output port of the BBFRAME scrambler 29 and with its output port connected the input port of an encoder 52 for LDPC coding. FIG. 2 depicts the output port of the encoder 52 for LDPC coding connected to the input port of a bit interleaver 53, the output port of which is connected for applying bit-interleaved bit-wise FEC coding to the input port of a further interleaver 54 that shuffles the order of the QAM symbols in each successive FEC block. This shuffling implements cyclic delay diversity (CDD) that helps the FEC coding to overcome fading. The output port of the interleaver 54 connects to the write-input port of dual-port random-access memory 55. The dual-port RAM 55 is capable of temporarily storing each FEC block for a plurality of OFDM symbol intervals to implement the single-time retransmission of FEC blocks from the first physical layer pipe PLP1, as explained in more detail with reference to FIG. 5 further on in this specification. In practice the interleaver 54 and possibly the bit interleaver 53 as well may be subsumed into the dual-port RAM 55 by appropriately controlling the read addressing and write addressing thereof.

The two read-output ports of the dual-port RAM 55 connect separately to respective input ports of a pair 56 of mappers for mapping successive bits of the interleaved bit-wise FEC coding to successive QAM symbol constellations. Each of the pair 56 of mappers parses the successive bits of the interleaved bit-wise FEC coding supplied to its input port into consecutive segments or "cells", each having as many bits as in the labeling of each of the lattice points in the particular QAM constellations to which the FEC coding is mapped in the physical layer pipe PLPn. A first of the pair 56 of mappers responds to the consecutive segments of the interleaved bit-wise FEC coding in initial transmissions thereof to generate the complex coordinates of successive QAM constellations. A second of the pair 56 of mappers responds to the consecutive segments of the interleaved bit-wise FEC coding in final transmissions thereof to generate the complex coordinates of successive QAM constellations. The coded DTV signals of initial transmissions and of final transmissions are mapped to quadrature amplitude modulation (QAM) of the COFDM carriers according to fifth and sixth patterns, respectively. Bits that map to lattice points in the fifth mapping pattern more likely to experience error are mapped to lattice points in the sixth mapping pattern less likely to experience error. Bits that map to lattice points in the sixth mapping pattern more likely to experience error are mapped to lattice points in the fifth mapping pattern less likely to experience error. The complex coordinates of the QAM symbol constellations are supplied from the respective output ports of the pair of 56 of mappers to respective input ports of the assembler 30 for assembling a stream of OFDM symbols.

Preferably, cells of each COFDM symbol in the initial read-out of each COFDM frame from any of the dual-port ROMs 35, 45, 55 etc. for single-time retransmission are read out in different order than cells of each corresponding COFDM symbol in the final read-out of that each COFDM frame. This is done such that the cyclic I-FFT of the initial transmission is rotated one-half revolution respective to the cyclic I-FFT of the initial transmission. This provides best possible frequency diversity between the initial and final transmissions of the same cells. A DTV receiver of appropriately design will be enabled better to overcome in-channel narrowband interference and to overcome single-side adjacent-channel interference.

There is usually a number of other physical layer pipes besides PLP0, PLP1 and PLPn, which other physical pipes are identified by the prefix PLP followed by respective ones of consecutive numbers two through (n−1). Each of the PLPs, n in number, may differ from the others in at least one aspect. One possible difference between these n PLPs concerns the natures of the concatenated BCH-LDPC coding these PLPs respectively employ. ETSI standard EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ.

Each of the interleavers 34, 44, 54 etc. in the data PLPs can by way of specific example, be composed of a cell interleaver (as specified in §§6.4 of ETSI standard EN 302 755 V1.3.1) followed in cascade connection by a time interleaver (as specified in §§6.5 of ETSI standard EN 302 755 V1.3.1). ETSI standard EN 302 755 V1.3.1 defines the OFDM cell as being the modulation value for one OFDM carrier during one OFDM symbol—i. e., a single modulation constellation symbol. The pseudo-random cell interleaving spreads the cells uniformly in each FEC codeword to ensure an uncorrelated distribution of channel distortions and interference along the FEC codewords in the receiver. Furthermore the cell interleaving "rotates" the interleaving sequence differently in each of the FEC blocks of one time interleaver (TI) block. If used, time interleaving operates at PLP level, and the parameters of the time interleaving may differ for different PLPs within the COFDM broadcasting system.

The function of the assembler 30 is to assemble the complex coordinates of QAM symbol constellations read from the pairs of mappers 36, 46, 56 etc. for each of the PLPs and the complex coordinates of QAM symbol constellations of the modulated L1 signaling data into arrays of OFDM symbols to be conveyed successively within respective ones of OFDM frames—e. g., T2-frames as prescribed for DVB-T2 in ETSI standard EN 302 755 V1.3.1. Successive ones of these T2-frames, possibly with Future Extension Frame (FEF) parts interspersed among them, make up super-frames in the overall frame structure. The assembler 30 comprises respective buffer memories for the n PLPs and means for time-division multiplexing OFDM frames from the various PLPs into an OFDM generation interface signal to be supplied to the FIG. 4 portion of the transmitter apparatus for broadcasting DTV signals. The buffer memories included in the assembler 30 are usually dual-ported random-access memories (RAMs). The time interleaving procedures described in §§6.5 of ETSI standard EN 302 755 V1.3.1 are subsumed into the addressing of these RAMs. Designs are possible in which the buffer memories for the assembler 30 are subsumed at least in part within the dual-port RAMs 35, 45, 55 etc. The operation of the assembler 30 for assembling a serial stream of OFDM symbols takes into account the conformation of the OFDM frame structure and is further controlled responsive to the dynamic scheduling information produced by the scheduler 10 depicted in FIG. 1. FIG. 2 does not explicitly show the connections for applying these control signals to the assembler 30. FIG. 2 shows the assembler 30 connected for receiving at an input port thereof coordinates of P2 modulation symbols supplied from apparatus depicted in FIG. 3.

The coordinates of P2 modulation symbol constellations supplied from the FIG. 3 apparatus convey the conformation of the OFDM frame structure and also convey the dynamic scheduling information (DSI) produced by the scheduler 10. FIG. 3 depicts a first-layer signal generator 20 with two input ports and two output ports. The first of the two input ports is connected for receiving DSI from the scheduler 10, and the second of the two input ports is connected for receiving digital indications specifying the conformation of the OFDM frame structure. Responsive to these control signals received at its first and second input ports, the first-layer (L1) signal generator 20 generates L1-pre signaling at its first output port and L1-post signaling at its second output port.

FIG. 3 depicts an encoder 57 for BCH coding having its input port connected for receiving L1-pre signaling supplied from the first output port of the first-layer (L1) signal generator 20. The output port of the encoder 57 for BCH coding connects to the input port of an encoder 58 for LDPC coding. The output port of the encoder 58 connects to the input port of a puncturer 59, the output port of which connects to the input port of a mapper 60 for mapping the coded L1-pre signaling to BPSK symbol constellations. The output port of the mapper 60 connects to a first of two input ports of a time-division multiplexer 61. Details of the processing of L1-pre signaling are essentially as described in §§7.3.1.1 of ETSI standard EN 302 755 V1.3.1 for DVB-T2.

FIG. 3 depicts a bit scrambler 62 having its input port connected for receiving L1-post signaling supplied from the second output port of the first-layer (L1) signal generator 20. The bit scrambler 62 provides data bit randomization similar to that provided by the BBFRAME scramblers 9, 19 and 29. The output port of the bit scrambler 62 connects to the input port of an encoder 63 for CRC-8 coding, the output port of which connects to the input port of an encoder 64 for BCH coding. The output port of the encoder 64 for BCH coding connects to the input port of an encoder 65 for LDPC coding. FIG. 3 shows the output port of the encoder 65 connected to the input port of a puncturer 66, the output port of which connects to the input port of a bit interleaver 67 similar to the bit interleavers 33, 43 and 54. The output port of the bit interleaver 67 connects to the input port of a mapper 68 for mapping the coded L1-post signaling to BPSK, QPSK, 16QAM or 64QAM symbol constellations. The output port of the mapper 68 connects to the second input port of the time-division multiplexer 61. The puncturer 66 is optional and can be replaced by a direct connection from the output port of the encoder 65 for LDPC coding to the input port of the bit interleaver 67. Details of the processing of L1-post signaling are essentially as described in §§7.3.2 and §§7.3.3 of ETSI standard EN 302 755 V1.3.1 for DVB-T2.

The time-division multiplexer 61 is configured for generating a response therefrom that time-interleaves complex coordinates of the BPSK symbol constellations mapping respective segments of coded L1-pre signaling supplied to its first input port from the mapper 60 with the complex coordinates of the BPSK, QPSK or QAM symbol constellations mapping respective segments of coded L1-post signaling supplied to its second input port from the mapper 68. FIG. 3 indicates that the time-division multiplexer 61 supplies the complex coordinates of P2 symbols in its response to a respective input port of the assembler 30 of OFDM symbols depicted in FIG. 2.

A transmission signal in an OFDM broadcast system is transmitted in successive segments called OFDM symbol blocks. Each OFDM symbol block includes an interval during which an effective symbol is supplied for inverse discrete Fourier transformation (I-DFT), and further includes a guard interval into which the waveform of a concluding portion of the latter half of this effective symbol will be directly copied. This guard interval is provided at the beginning of the initial half of the OFDM symbol block. In an OFDM system, such a guard interval is provided to improve performance during multi-path reception. A plurality of OFDM symbol blocks are collected to form one OFDM transmission frame, which the DVB-T2 standard calls a "T2 frame".

FIG. 4 depicts apparatus that generates and transmits radio-frequency COFDM signals responsive to the stream of OFDM symbols supplied via an OFDM generation interface from the output port of the assembler 30 for assembling a serial stream of OFDM symbols, which assembler 30 is depicted in FIG. 2. The output port of the assembler 30 connects to the input port of a parser 69 for parsing the stream of complex coordinates of BPSK, QPSK and QAM symbol constellations into the effective portions of COFDM symbols. The output port of the parser 69 connects to the input port of a pilot carriers insertion and dummy tones reservation unit 70. Part 9.2.3.1 of ETSI standard EN 302 755 V1.3.1 titled "Locations of the scattered pilots" prescribes eight different patterns for the insertion of pilot carriers into the frequency spectrum of the transmission channel, any one of which may be used for a PLP in DVB-T2. As of late June 2014 the ATSC 3.0 standard prescribed twelve different patterns for the insertion of pilot carriers into the frequency spectrum of the transmission channel. Part 9.2.2 of ETSI standard EN 302 755 V1.3.1 titled "Definition of the reference sequence" prescribes a reference sequence of some 2048 bits (or "chips"). Each successive cell in the COFDM frame or "T-2 frame" has a consecutive one of these chips associated therewith. The modulation of the pilot carriers in respective cells of the T-2 frame depends on the respective chips associated with those cells.

In a departure from the DVB-T2 practice prescribed by ETSI standard EN 302 755 V1.3.1 the pilot carriers insertion and dummy tones reservation unit 70 is arranged for modulating pilot carriers in accordance with any one of various reference signals that is supplied from a unit 71 for generating sequences that identify the COFDM broadcast modes used in following COFDM frames. This facilitates the following operation of a COFDM transmitter during a transition period when an earlier-adopted broadcast standard is gradually supplanted by a later-adopted broadcast standard. Some DTV material can continue being transmitted in accordance with the earlier adopted broadcast standard until most receivers for that standard that are already in the field are likely to be retired. Similar or different DTV material can be transmitted in accordance with the later-adopted broadcast standard as more and more of the population of DTV receivers is capable of receiving transmissions so made. This practice allows DTV broadcasting supported by sale of advertising to reach a larger audience of viewers than might otherwise be possible during transition from one standard to another.

Using the modulation of pilot carrier waves to signal the broadcast standard by which transmissions are being made exacts no sacrifice in digital payload. ATSC 3.0 and modifications thereof are apt to use some sort of "first-layer" or L1 signaling information specifying the operating parameters used in accompanying COFDM broadcasting. Their L1 signaling is apt to be akin to that used in DVB-T2, although the bits in their L1 signaling may differ in meaning from the bits in the L1 signaling information in DVB-T2. Supplying DTV receivers with the knowledge of what broadcast standard is currently being received expedites different interpretations of the bits of L1 signaling information for each broadcast standard that is employed. The modulation of pilot carrier waves can serve as the index to a codebook of different L1 signaling formats. This tends to conserve digital payload when transmissions according to different broadcast standards are apt to be received.

The output port of the unit 71 connects to the input port of an OFDM modulator 72. The unit 71 may also insert zero-valued carriers to reserve spectrum for the subsequent insertion of dummy tones by a peak-to-average-power-ratio (PAPR) reduction unit 73. The OFDM modulator 72 includes a serial-to-parallel converter for converting the serially generated complex digital samples of the effective OFDM symbols to parallel complex digital samples for inverse discrete Fourier transformation (I-DFT). The OFDM modulator 72 further includes a parallel-to-serial converter for converting the parallel complex digital samples of the I-DFT results to serial complex digital samples of the I-DFT results. The OFDM modulator 72 has 1 K, 2K, 4K, 8K, 16K or 32K carriers capability. That is, DFT size can be 1 K, 2K, 4K, 8K, 16K or 32K. The 8K, 16K and 32K sizes of DFT are suitable for transmissions to stationary DTV receivers. Transmissions to mobile receivers usually employ 8K DFT size, 4K DFT size possibly being resorted to. The 1K DFT size is employed when sending indications of the beginnings of T2 frames, and the 2K DFT size is employed for transmitting L1 signaling. FIG. 4 shows a connection for applying digital samples supplied from the output port of the OFDM modulator 72 to the input port of a peak-to-average-power-ratio (PAPR) reduction unit 73.

ETSI standard EN 302 755 V1.3.1 includes two methods for reducing PAPR in DVB-T2 that allow about a 58% reduction in peak amplifier power rating, which can save electricity costs for a broadcasting station significantly. In the first method, called "tone reservation", 1% of the OFDM carriers are reserved and do not carry any data, but instead may be used for inserting values that will counteract the peaks in the signal. In the second method, called "active constellation extension", the values of certain of the edge constellation points are moved "outwards" in such way as to reduce the signal peaks. Since only edge constellation points are ever moved outwards, their movement has no significant impact on the ability of the DTV receiver to decode the data.

The output port of the PAPR reduction unit 73 is connected to the input port of a guard-interval-and-cyclic-prefix-insertion unit 74. The output port of the guardinterval-and-cyclic-prefix insertion unit 74 is connected to the input port of a unit 75 for inserting preamble-1 (P1) symbols into the digital data stream. The output port of the P1 symbols insertion unit 75 connects to a first of two input ports of a time-division multiplexer 76. A bootstrap signal generator 77 is connected for supplying bootstrap signals to the second of the two input ports of the time-division multiplexer 76 therein to be inserted at various times among the successive COFDM frames conveying coded data. The output port of the time-division multiplexer 76 supplies the input port of a digital-to-analog converter 78 with the multiplex of bootstrap signals and COFDM frames that convey coded data.

The output port of the digital-to-analog converter 78 is connected for supplying analog COFDM carriers to the input port of an up converter 79. The up converter 79 converts the analog COFDM carriers in the DAC 78 response to final radio frequencies and is connected for supplying them from its output port to the input port of a linear power amplifier 80. FIG. 4 shows the output port of the linear power amplifier 80 connected for driving RF analog COFDM signal power to a transmission antenna 81. FIG. 4 omits showing some details of the DTV transmitter, such as band-shaping filters for the RF signals.

FIG. 5 depicts a representative structure for the FIG. 4 unit 71 for generating sequences that identify the COFDM broadcast modes used in subsequent COFDM frames. The general structure of the unit 71 is similar to that of the unit for generating a reference sequence described in Part 9.2.2 of ETSI standard EN 302 755 V1.3.1 titled "Definition of the reference sequence". The output sequence supplied from a pseudo-random binary sequence (PRBS) generator 82 and an overall pseudo-noise (PN) sequence read from a read-only memory (ROM) 83 are applied to first and second input connections respectively of an exclusive-OR gate 84, which responds to supply a reference signal to the pilot carriers insertion and dummy tones reservation unit 70 depicted in FIG. 4. (Each successive bit in such sequences or in the reference signal formed from them is more particularly referred to as a "chip" by many persons skilled in the art.)

The read-only memory (ROM) 83 stores an overall pseudo-noise sequence per the description in Part 9.2.2.2 of ETSI standard EN 302 755 V1.3.1 titled "Frame level" and is addressed as follows to be read. A 12-bit-wide counter 85 is arranged for counting the number of COFDM symbols in a COFDM frame. The count is reset to zero response to the P1 preamble at the beginning of each T2 frame. FIG. 5 shows the counter 85 being an up/down counter, counting up from zero if "forward-time" PN15 sequences are to be read from the ROM 83, and counting down from maximum count value if "reversed-time" PN15 sequences are to be read from the ROM 83. The counter 85 supplies this count as a first of two summands to a 12-bit-wide digital adder 86, the sum from which adder 86 is supplied to the ROM 83 as read addressing. The second summand applied to the digital adder 86 is an addend identifying the COFDM broadcasting mode employed in current DTV signal transmissions. This addend is presumed to be arithmetic zero if current DTV signal transmission adheres to DVB-T2 practice as prescribed in ETSI standard EN 302 755 V1.3.1. The overall pseudo-noise sequence prescribed by part 9.2.2.2 of ETSI standard EN 302 755 V1.3.1 is based on a PN15 sequence facilitating identification of fifteen different COFDM broadcasting modes by the addend applied to the digital adder 86 as second summand, presuming the address counter 85 is conditioned for upward counting. This addend is presumed to be other than arithmetic zero if current DTV signal transmission adheres to the initial version of the ATSC standard 3.0. If the counter 85 is conditioned for counting downward rather than upward, an additional fifteen different COFDM broadcasting modes can be signaled.

The PRBS generator 82 is configured per the description in part 9.2.2.1 of ETSI standard EN 302 755 V1.3.1 titled "Symbol level". The output port of an exclusive-OR gate 87 is connected for supplying its response to the data input port of a shift register consisting of eleven data flip-flops 88, 89, 90, 91, 92, 93, 94, 95, 96, 97 and 98 successively arranged in cascade. The output port of the flip-flop 96 is connected for supplying its response to a first input port of the exclusive-OR gate 87; and the output port of the flip-flop 98 is connected for supplying its response to a second input port of the exclusive-OR gate 87. At the outset of each COFDM symbol interval a unit 99 resets the output levels from the flip-flops 88, 89, 90, 91, 92, 93, 94, 95, 96, 97 and 98 all to ONEs value. Therefore, the first eleven chips supplied from the shift register consisting of eleven data flip-flops 88, 89, 90, 91, 92, 93, 94, 95, 96, 97 and 98 following reset at the outset of each COFDM symbol interval are ONEs that condition the response of the exclusive-OR gate 84 to ONEs'-complement chips read from the ROM 83. Accordingly, the carriers insertion and dummy tones reservation unit 70 modulates each of the continual pilot carrier waves in the I-DFT frequency spectrum by a PN sequence read from the ROM 83 or by a sequence complementary to the portion of the overall PN sequence read from the ROM 83, depending on the position of that continual pilot carrier in the frequency spectrum. The ONEs and ZEROs of this sequence are converted to first and second phases, respectively, of the binary phase-shift keying (BPSK) of the continual pilot carrier wave.

It is important to understanding the invention to realize that the PRBS generator 82 generates chips at carrier clock rate and consequently generates a respective chip for each carrier, regardless of whether that carrier be a pilot carrier or not. Therefore, the carriers insertion and dummy tones reservation unit 70 modulates every continual pilot carrier by a sequence defined by the portion of the overall PN sequence read from the ROM 38 or by the ONE's-complement thereof, depending on the chip that the PRBS generator 82 generates respective to that continual pilot carrier. While phasing of the repetitive 15-chip sequences is used as modulating signal for BSK of the continual pilot carriers, it is preferable that the BPSK of each of the scattered pilot carrier waves is done in accordance with one repetitive PN15 sequence, the phasing of which is unchanging, as exclusive-ORed by the respective chip the PRBS generator 82 generates for that carrier wave.

FIG. 6 shows the initial portion of a DTV receiver designed for iterative-diversity reception of COFDM signals as transmitted at VHF or UHF by a DTV transmitter, such as the one depicted in FIGS. 1, 2, 3 and 4. A reception antenna 100 captures the radio-frequency COFDM signal for application as input signal to a front-end tuner 101 of the receiver. The front-end tuner 101 can be of a double-conversion type composed of initial single-conversion super-heterodyne receiver circuitry for converting radio-frequency (RF) COFDM signal to intermediate-frequency (IF) COFDM signal followed by circuitry for performing a final conversion of the IF COFDM signal to baseband COFDM signal. The initial single-conversion receiver circuitry typically comprises a tunable RF amplifier for RF COFDM signal incoming from the reception antenna, a tunable first local oscillator, a first mixer for heterodyning amplified RF COFDM signal with local oscillations from the first local oscillator to obtain the IF COFDM signal, and an intermediate-frequency (IF) amplifier for the IF COFDM signal. Typically, the front-end tuner 101 further includes a synchronous demodulator for performing the final conversion from IF COFDM signal to baseband COFDM signal and an analog-to-digital converter for digitizing the baseband COFDM signal. Synchronous demodulation circuitry typically comprises a final local oscillator with automatic frequency and phase control (AFPC) of its oscillations, a second mixer for synchrodyning amplified intermediate-frequency COFDM signal with local oscillations from the final local oscillator to obtain the baseband COFDM signal, and a low-pass filter for suppressing image signal accompanying the baseband COFDM signal. In some designs of the front-end tuner 101, synchronous demodulation is performed in the analog regime before subsequent analog-to-digital conversion of the resulting complex baseband COFDM signal. In other designs of the front-end tuner 101, analog-to-digital conversion is performed before synchronous demodulation is performed in the digital regime.

Simply stated, the front-end tuner 101 converts radio-frequency COFDM signal received at its input port to digitized samples of baseband COFDM signal supplied from its output port. Typically, the digitized samples of the real component of the baseband COFDM signal are alternated with digitized samples of the imaginary component of the baseband COFDM signal for arranging the complex baseband COFDM signal in a single stream of digital samples. FIG. 6 shows an AFPC generator 102 for generating the automatic frequency and phase control (AFPC) signal for controlling the final local oscillator within the front-end tuner 101.

Figure 8:
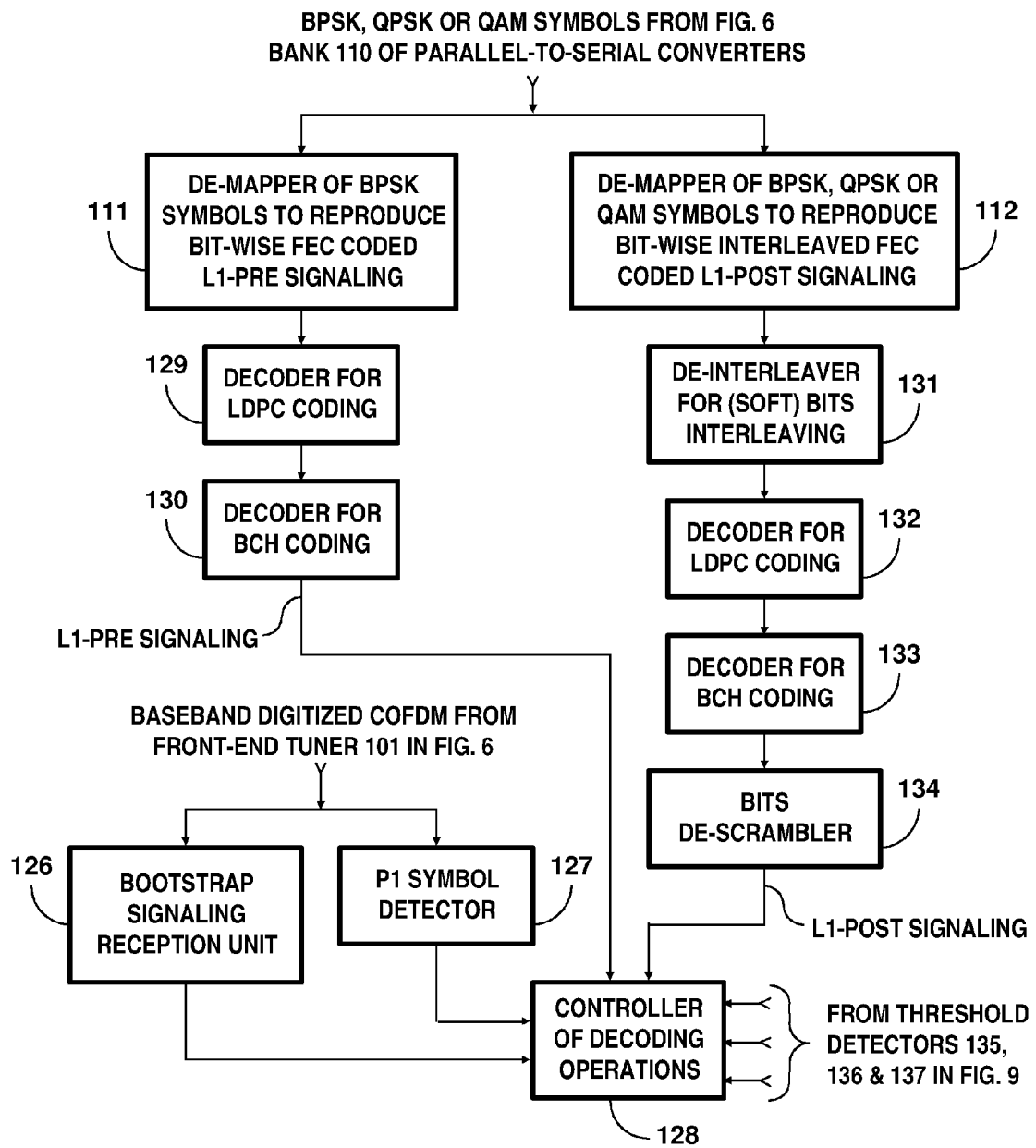

The output port of the front-end tuner 101 is connected for supplying digitized samples of baseband COFDM signal to FIG. 8 metadata recovery apparatus and to a cyclic prefix detector 103 depicted in FIG. 6. The cyclic prefix detector 103 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 103 is connected to supply these indications to a first of two input ports of timing synchronization apparatus 104.

A first of two output ports of the timing synchronization apparatus 104 is connected for supplying gating control signal to the control input port of a guard-interval-removal unit 105, the signal input port of which is connected for receiving digitized samples of baseband COFDM signal from the output port of the front-end tuner 101. The output port of the guard-interval-removal unit 105 is connected for supplying the input port of discrete-Fourier-transform computer 106 with windowed portions of the baseband COFDM signal that contain effective COFDM samples. A second of the output ports of the timing synchronization apparatus 104 is connected for supplying the DFT computer 106 with synchronizing information concerning the effective COFDM samples.

The indications concerning the phasing of COFDM symbols that the cyclic prefix detector 103 supplies to the timing synchronization apparatus 104 is sufficiently accurate for initial windowing of a baseband COFDM signal that the guard-interval-removal unit 105 supplies to the DFT computer 106. A first output port of the DFT computer 106 is connected for supplying demodulation results for at least all of the pilot carriers in parallel to the input port of a pilot carriers processor 107, and a second output port of the DFT computer 106 is connected for supplying demodulation results for each of the COFDM carriers to the input port of a frequency-domain channel equalizer 108. The processor 107 selects the demodulation results concerning pilot carriers for processing, part of which processing generates weighting coefficients for channel equalization filtering performed in the frequency domain. A first of three output ports of the processor 107 that are explicitly shown in FIG. 6 is connected for supplying these weighting coefficients (via wiring depicted as a dashed-line connection) to the frequency-domain channel equalizer 108, which uses those weighting coefficients for adjusting its responses to the demodulation results for each of the COFDM carriers.

A second of the output ports of the pilot carriers processor 107 that are explicitly shown in FIG. 6 is connected for supplying more accurate window-positioning information to the second input port of the timing synchronization apparatus 104. This window-positioning information is an adjustment generated by a feedback loop that seeks to minimize the noise accompanying pilot carriers, which noise increases owing to intercarrier interference from adjoining modulated carriers when window positioning is not optimal.

A third of the output ports of the pilot carriers processor 107 explicitly shown in FIG. 6 is connected for forwarding unmodulated pilot carriers to the input port of the AFPC generator 102. The real components of the unmodulated pilot carriers are multiplied by their respective imaginary components in the AFPC generator 102. The resulting products are summed and low-pass filtered to develop the AFPC signal that the AFPC generator 102 supplies to the front-end tuner 101 for controlling the final local oscillator therein. Other methods to develop AFPC signals for the final local oscillator in the front-end tuner 101 are also known, which can replace or supplement the method described above. One such other method is described in U.S. Pat. No. 5,6102,165 titled "Transmission system and receiver for orthogonal frequency-division multiplexing signals, having a frequency-synchronization circuit", which was granted to Flavio Daffara and Ottavio Adami on 11 Nov. 1997. In that method complex digital samples from the tail of each OFDM symbol are multiplied by the conjugates of corresponding digital samples from the cyclic prefix of the OFDM symbol. The resulting products are summed and low-pass filtered to develop the AFPC signal that the AFPC generator 102 supplies to the front-end tuner 101 for controlling the final local oscillator therein.

A fourth of the output ports of the pilot carriers processor 107 that are explicitly shown in FIG. 6 is connected for supplying instructions to apparatus 109 to configure the DTV receiver to suit the broadcast standard used for transmissions currently received. Portions of the pilot carriers processor 107 used for extracting these instructions will be described in some detail further on in this specification, with reference to FIGS. 9-22 and 27-33 of the drawings.

The DFT computer 106 is customarily constructed so it can demodulate any one of the 1K, 2K, 4 k, 8K, 16K and 32K options as to the number of OFDM carriers. If this be the case, the correct option is chosen responsive to information from a P1 symbol detector 114 depicted in FIG. 7. If the P1 signal cannot be detected, this information can also be extracted from the bootstrap signal or from the I-FFT signature conveyed by selected ones of the continual pilot carriers. As noted supra, the second output port of the DFT computer 106 is connected to supply demodulated complex digital samples of the complex coordinates of QPSK or QAM symbol constellations in parallel to the input port of the frequency-domain channel equalizer 108. To implement a simple form of frequency-domain channel equalization, the pilot carriers processor 107 measures the amplitudes of the demodulated pilot carriers to determine basic weighting coefficients for various portions of the frequency spectrum. The pilot carriers processor 107 then interpolates among the basic weighting coefficients to generate respective weighting coefficients supplied to the frequency-domain channel equalizer 108 with which to multiply the complex coordinates of QPSK or QAM symbol constellations supplied from the DFT computer 106. Various alternative types of frequency-domain channel equalizer are also known.

The output port of the DFT computer 106 involves a plurality of connections for supplying respective sets of complex coordinates for QPSK or QAM symbol constellations of respective OFDM carriers. The frequency-domain channel equalizer 108 weights each of these respective sets of complex coordinates for QPSK or QAM symbol constellations of respective OFDM carriers received in parallel at its input port and supplies the weighted responses in parallel from its output port to the respective input ports of a bank 110 of parallel-to-series converters. The response of the one of the parallel-to-series converters in this bank 110 of them that is appropriate for the number of OFDM carriers in the DFT and the sort of modulation symbol constellations for those carriers is selected as the response supplied from the bank 110 of parallel-to-series converters for de-mapping of the modulation symbol constellations in that response. FIGS. 6 and 8 indicate that the response of the bank 110 of parallel-to-series converters is supplied directly to a de-mapper 111 of FEC-coded L1-pre signaling and to a de-mapper 112 of FEC-coded L1-post signaling, which de-mappers 111 and 112 are depicted in FIG. 8.

Figure 7:
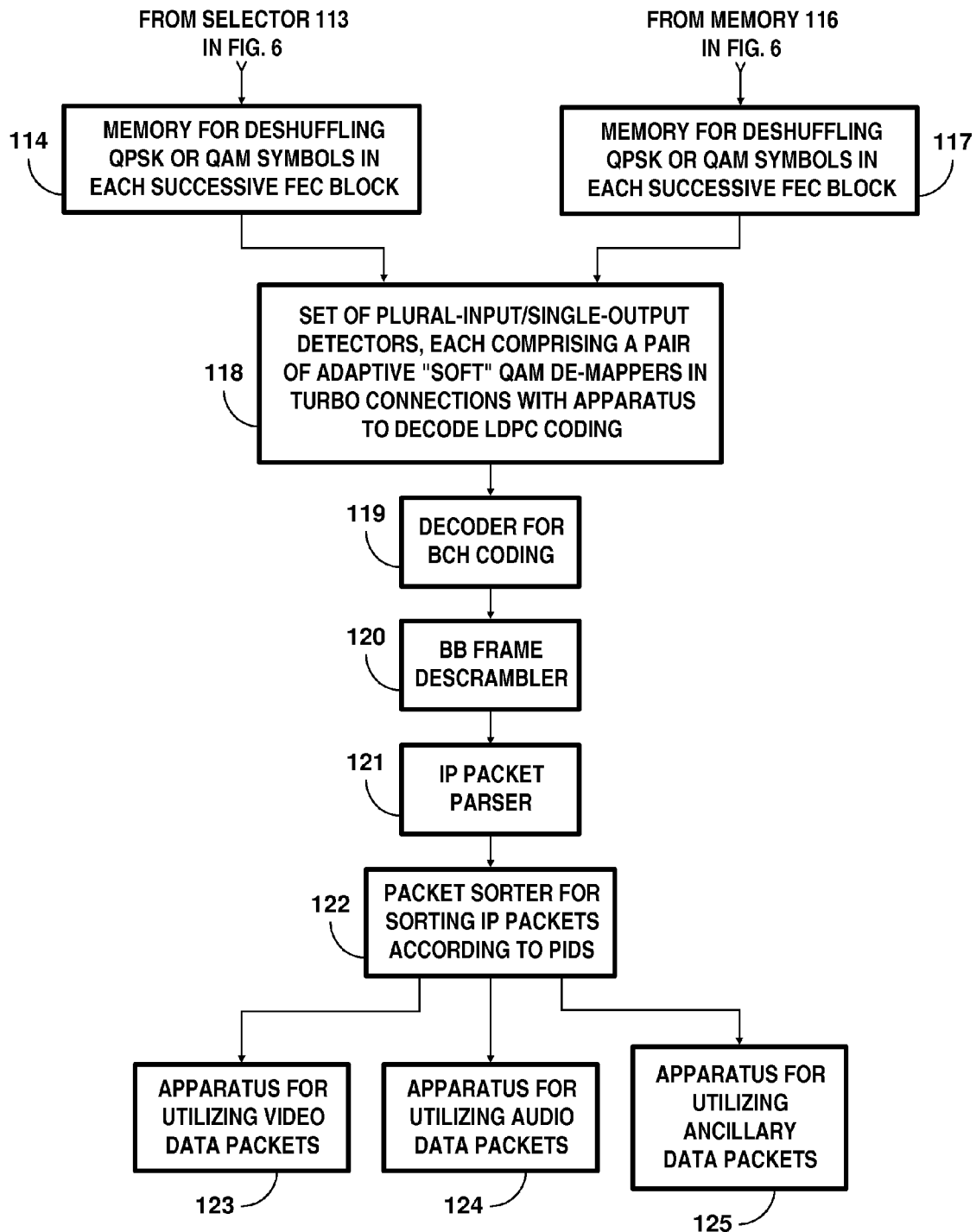

As thusfar described, the FIG. 6 initial portion of a COFDM receiver is similar to the initial portions of COFDM receivers used for DVB-T2 in Europe. However, in a departure from customary practice, the response of the bank 110 of parallel-to-series converters is not supplied directly to a de-mapper for the successive QPSK or QAM constellations in data PLPs. Instead, that response is supplied to an input port of a selector 113 that is conditioned to forward to that de-mapper just the final transmissions for diversity reception and single-time transmissions that are not later repeated. FIGS. 6 and 7 indicate that the output port of the selector 113 connects to the write input port of a memory 114 depicted in FIG. 7.

In another departure from customary practice, the connections to the input ports of another bank 115 of parallel-to-series converters are arranged so as in effect to de-rotate the circular DFT components computed by the DFT computer 106 and equalized by the frequency-domain channel equalizer 108. The one of the parallel-to-series converters in this bank 115 of them that is appropriate for the number of OFDM carriers in the DFT and the sort of modulation symbol constellations for those carriers is selected to be loaded from the frequency-domain channel equalizer 108 with the rotated circular DFT components computed by the DFT computer 106 responsive to initial transmissions of data that are later transmitted again. The response of this selected parallel-to-series converter is supplied from the bank 115 of parallel-to-series converters to the write input port of a memory 116 to be temporarily stored and subsequently read concurrently with corresponding final transmissions of like data supplied from the output port of the selector 113. FIGS. 6 and 7 indicate that the read output port of the memory 116 connects to the write input port of a memory 117 depicted in FIG. 7.

FIG. 7 depicts memories 114 and 117, each configured for deshuffling the QPSK or QAM symbols shuffled by the cell interleavers 34, 44, 54 etc. in the FIG. 2 portion of a DTV transmitter. FIG. 7 indicates that the output port of the selector 113 shown in FIG. 6 is connected for supplying the write input port memory 114 with such shuffled symbols. FIG. 7 indicates that the read output port of the memory 116 shown in FIG. 6 is connected for supplying the write input port memory 117 with such shuffled symbols. A controller 128 of decoding operations depicted in FIG. 8 supplies the memories 114 and 117 instructions as to how to deshuffle the successive complex coordinates of 16QAM, 32QAM, 64QAM, 119QAM, 256QAM or 512QAM symbol constellations supplied to their respective write input ports. E. g., the controller 128 generates these instructions responsive to the contents of the 3-bit PLP_MOD field in the L1-post signaling prescribed in the DVB-T2 standard. The instructions that the controller 128 supplies to the memories 114 and 117 specify their write addressing and read addressing. Deshuffling the QPSK or QAM symbols before their de-mapping, rather than deshuffling of the cells defined by those symbols after de-mapping, facilitates soft de-mapping as well as subsequent soft LDPC decoding together being performed iteratively.

FIG. 7 depicts a set 118 of plural-input/single-output detectors, each having one of its two input ports connected for receiving read-out from the memory 114 and the other of its input ports connected for receiving read-out from the memory 117. Each of the set 118 of PISO detectors is of a type similar to any one of known types used to decode duplicated FEC coding in COFDM signals received either in frequency-division multiplex or via respective antennas for spatial diversity reception. Each of the set 118 of PISO detectors comprises a plural-input "soft" de-mapper of QAM symbol constellations combined with apparatus to decode LDPC coding. The pair of QAM de-mappers in respective ones of the set 118 of PISO detectors de-map QAM symbol constellations different from those in others of the set 118 of PISO detectors. The apparatus to decode each sort of LDPC coding broadcast may be shared amongst several of the PISO detectors in the set 118 of them. Specifics concerning representative structures for the set of 118 of plural-input/single-output detectors are disclosed in U.S. Pat. No. 9,143,375 granted to A. L. R. Limberg 12 Sep. 2015 and titled "ITERATIVE-DIVERSITY COFDM BROADCASTING WITH IMPROVED SHAPING GAIN". See FIGS. 20 and 21 of its drawing together with descriptions of those figures in its specification.

The output port of a selected one of the set 118 of plural-input/single output detectors is connected for supplying the results of decoding LDPC coding to the input port of a decoder 119 for BCH coding. The output port of the decoder 119 is connected for supplying the results of decoding BCH coding to the input port of a BB Frame descrambler 120, which includes a de-jitter buffer and null-packet re-inserter not explicitly shown. FIG. 7 shows the output port of the BB Frame descrambler 120 connected to supply IP packets to the input port of an internet-protocol packet parser 121. The output port of the IP packet parser 121 is connected to supply IP packets to a packet sorter 122 for sorting IP packets according to their respective packet identifiers (PIDs) to one of the respective input ports of apparatus 123 for utilizing video data packets, apparatus 124 for utilizing audio data packets, and apparatus 125 for utilizing ancillary data packets.

FIG. 8 indicates that baseband digitized COFDM from the front-end tuner 101 in FIG. 6 is supplied to the respective input ports of a bootstrap signaling reception unit 126 and a P1 symbol detector 127 in FIG. 8. The respective output ports of the bootstrap signaling reception unit 126 and the P1 symbol detector 127 connect to respective input ports of the controller 128 of decoding operations in the DTV receiver. Drawing FIGS. 6, 7 and 8 do not explicitly depict connections from the controller 128 to elements of the receiver through which connections those elements are controlled thus to implement apparatus 109 to configure the DTV receiver to suit the broadcast standard used for the transmissions currently received. Among its duties the controller 128 controls the DFT computer 106 In FIG. 6 regarding its selection of a prescribed number of COFDM carriers for which discrete Fourier transforms are to be computed. Among its other duties the controller 128 controls the selection of the one of the set 118 of PISO detectors that is to supply BCH coding to the decoder 119 for BCH coding. The P1 symbol detector 127 detects each occurrence of a P1 symbol in the baseband digitized COFDM signal from the front-end tuner 101 depicted in FIG. 6, which P1 symbol is based on a 1K OFDM symbol with frequency-shifted repeats at its beginning and its conclusion. A P1 symbol signals the beginning of a COFDM or T2 frame, and the P1 symbol detector 127 supplies this important timing information to the controller 128. The structure of the P1 symbol facilitates easy detection thereof, as well as forestalling any possibility of its being imitated by any part of the signal within the ensuing T2 frame. Only a fraction of the 1K OFDM carrier positions convey energy, and these carry one of a set of carefully chosen data patterns to provide some capability for signaling the controller 128 for decoding operations in the DTV receiver. This format of P1 symbol provides (a) a simple and robust mechanism for rapid detection of T2 signals when a receiver scans through the appropriate spectrum band, (b) a fast frequency lock mechanism for the receiver and (c) 7 bits of signaling. E.g., these bits may be used for signaling the FFT size used for symbols in the T2 frame. If the DTV standard prescribes inverting the polarity of T2 frames of OFDM signals during initial transmissions, one of these bits can be reserved to signal such inversion.

FIG. 8 depicts a de-mapper 111 for successive coordinates of BPSK symbol constellations as supplied to its input port from the output port of the bank 110 of parallel-to-serial converters in FIG. 6. The controller 128 of decoding operations activates the de-mapper 111 when L1-pre signaling is received, the time for such activation being determined so as to follow the P1 symbol detector 127 indicating to the controller 128 that P1 symbols have just been detected in full. Responsive to the respective parities of the COFDM carriers, the de-mapper 111 generates "soft" bits in logarithmic-likelihood ratio (LLR) format that convey bit-wise FEC coded L1-pre signaling. These soft bits are supplied from the output port of the de-mapper 111 to the input port of a decoder 129 for LDPC coding. The output port of the decoder 129 for LDPC coding is connected for supplying reproduced BCH coding to the input port of a decoder 130 for BCH coding, the output port of which is connected for supplying reproduced L1-pre signaling to a respective input port of the controller 128 of decoding operations within the DTV receiver.

FIG. 8 depicts a de-mapper 112 for successive complex coordinates of QPSK or QAM symbol constellations as supplied to its input port from the output port of the bank 110 of parallel-to-serial converters in FIG. 6. ETSI standard EN 702 755 V1.3.1 prescribes BPSK, QPSK, 16QAM, or 64QAM symbol constellations be used for L1-post signaling in DVB-T2. The controller 128 of decoding operations activates an appropriate section of the de-mapper 112 when L1-post signaling is received, the time for such activation being determined so as to follow the P1 symbol detector 127 indicating to the controller 128 that a P1 symbol has just been detected and further to follow the L1-pre signaling interval immediately after that P1 symbol. The de-mapper 112 responds to the complex coordinates descriptive of successive BPSK symbol constellations to recover a single soft bit of FEC coding from each constellation. The de-mapper 112 responds to the complex coordinates descriptive of successive QPSK symbol constellations to recover two soft bits of FEC coding from each constellation. The de-mapper 112 responds to the complex coordinates descriptive of successive 16QAM symbol constellations to recover four soft bits of FEC coding from each constellation. The de-mapper 112 responds to the complex coordinates descriptive of successive 64QAM symbol constellations to recover six soft bits of FEC coding from each constellation. In any one of these four cases, the de-mapper 112 generates the soft bits of FEC coding in LLR format. The de-mapper 112 is connected to supply these soft bits from its output port to the input port of a de-interleaver 131 of the interleaving of those soft bits, attributable to the bit interleaver 67 in the FIG. 3 portion of the DTV transmitter. The design of the de-interleaver 131 is different for different ones of these four cases. The output port of the de-interleaver 131 connects to the input port of a soft-input/soft-output decoder 132 for decoding LDPC coding. The output port of the SISO decoder 132 is connected for supplying soft bits of BCH coding to the input port of a soft-input decoder 133 for decoding BCH coding.

FIG. 8 shows the output port of the BCH decoder 133 connected to the input port of a bits de-scrambler 134. The output port of the bits de-scrambler 134 is connected for supplying L1-post signaling to a respective input port of the controller 128 of decoding operations within the DTV receiver. The L1-post signaling has CRC-8 coding, which coding can be decoded within the controller 128 to verify whether or not the L1-post signaling received by the controller 128 is correct.

Figure 9:
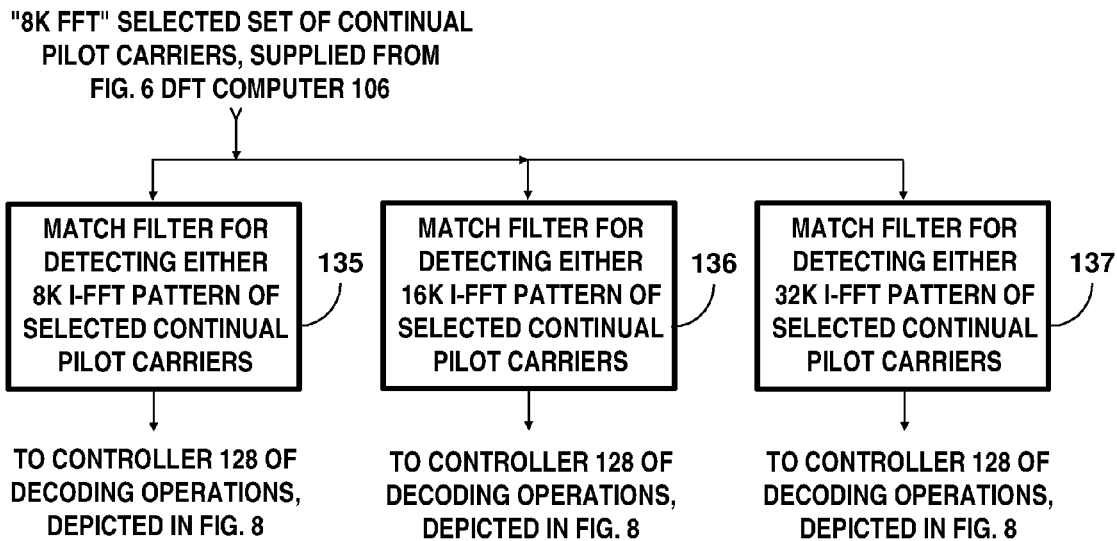
FIG. 9 is a detailed schematic diagram of a representative portion of the pilot carriers processor depicted in FIG. 6, which portion in accordance with aspects of the invention detects the size of the inverse FFT used in COFDM transmissions received by the COFDM receiving apparatus depicted in FIGS. 6, 7 and 8.

FIG. 9 depicts a representative portion of the pilot carriers processor 107 depicted in FIG. 9, which portion detects the size of the inverse FFT used in COFDM transmissions received by the COFDM receiving apparatus depicted in FIGS. 6, 7 and 8. The continual pilot carriers supplied from the DFT computer 106 depicted in FIG. 6 are modulated using binary phase shift keying (BPSK). A selected set of the continual pilot carriers supplied from the DFT computer 106 to the pilot carriers processor 107 is supplied to the respective input ports of match filters 135, 136 and 137. This selected set of the continual pilot carriers corresponds to a substantial number of the continual pilot carriers used in the 8K size I-FFT, at least those located in the central portion of the transmission channel. This selected set of continual pilot carriers corresponds to alternate ones of the continual pilot carriers used in the 16K size I-FFT insofar as frequency allocations within the transmission channel are concerned, but the polarities of BPSK of those carriers will differ in some regard for the 8K and 16K sizes of I-FFT. This selected set of continual pilot carriers corresponds to every fourth ones of the continual pilot carriers used in the 32K size I-FFT insofar as frequency allocations within the transmission channel are concerned, but the polarities of BPSK of those carriers will differ in some regards from the polarities of BPSK of those carriers for the 8K and 16K sizes of I-FFT.

The match filter 135 responds to the selected set of continual pilot carriers exhibiting respective BPSK in accordance with a pattern associated with 8K size I-FFT to supply a logic ONE as signaling to a respective input connection of the controller 128 of decoding operations, which controller 128 is depicted in FIG. 8. The match filter 136 responds to the selected set of continual pilot carriers exhibiting respective BPSK in accordance with a pattern associated with 16K size I-FFT to supply a logic ONE as signaling to a respective input connection of the controller 128 of decoding operations. The match filter 137 responds to the selected set of continual pilot carriers exhibiting respective BPSK in accordance with a pattern associated with 32K size I-FFT to supply a logic ONE as signaling to a respective input connection of the controller 128 of decoding operations. The controller 128 responds to the signaling from the match filters 135, 136 and 137 to condition the DFT computer 106 depicted in FIG. 9 to perform FFT processing suitable for the one of the 8K, 16K and 32K I-FFTs currently being received.

This provides back-up for conditioning the DFT computer 106 to perform suitable FFT processing when the frequency-domain preamble is corrupted by noise interfering with its control of such processing. Also, if there be a channel change during a COFDM frame, suitable FFT processing by the DFT computer 106 can be more quickly established.

Figure 10:
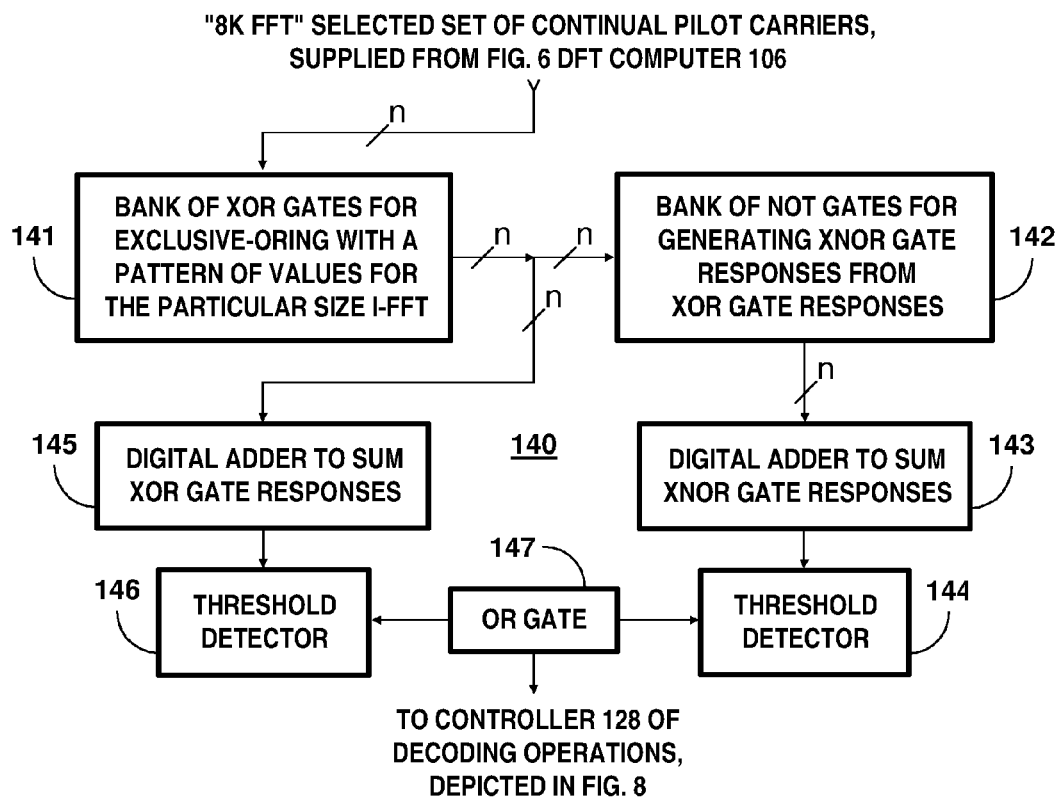
FIG. 10 is a still more detailed schematic diagram of a structure for each of the match filters depicted in FIG. 9.

FIG. 10 depicts a representative generic structure 140 for each of the match filters depicted in FIG. 9, which structure 140 comprises elements 141-147. The selected set of continual pilot carriers, p in number, are supplied to a bank 141 of respective exclusive-OR gates for exclusive-ORing the current samples of these continual pilot carriers with a pattern of ONE and ZERO values associated with a particular one of the different sizes of I-FFT. The plurality, p in number, of respective responses from the XOR gates in the bank 141 of them are supplied as respective input signals to a plurality, p in number, of NOT gates in a bank 142 of them to generate respective responses from those NOT gates. These responses, each of which may be ZERO or ONE, are supplied to the input ports, p in number, of a digital adder 143 that sums these responses as arithmetic values to generate a sum response. This sum response is supplied from the output port of the digital adder 143 to the input port of a threshold detector 144. If the respective current BPSK modulation conditions of the selected set of continual pilot carriers correspond to the pattern of values for the particular size of I-FFT, the respective responses from the NOT gates in the bank 142 of them will all be ONEs. The threshold detector 144 generates a ONE response if the sum response from the digital adder 143 is the sum of all ONEs or is close enough to distinguish the responses from the NOT gates in the bank 142 of them as being indicative that the particular size of I-FFT has currently been received. Otherwise, the threshold detector 144 generates a ZERO response indicative that the particular size of I-FFT may not have been received currently.

The threshold detector 144 generates a ZERO response indicative that the particular size of I-FFT may not have been received currently even when the particular size of I-FFT has been received currently, but the polarities of the BPSK of the selected carriers are opposite to those specified by the pattern of values for that particular size of I-FFT used for exclusive-ORing by the bank 141 of XOR gates. This possibility is checked for by supplying the respective responses of these XOR gates, each of which responses may be ZERO or ONE, to the input ports, p in number, of a digital adder 145 that sums these responses as arithmetic values to generate a sum response. This sum response is supplied from the output port of the digital adder 145 to the input port of a threshold detector 146. If the respective current BPSK modulation conditions of the selected set of continual pilot carriers not to correspond at all to the pattern of values for the particular size of I-FFT, the respective responses from the XOR gates in the bank 141 of them will all be ONEs. The threshold detector 146 generates a ONE response if the sum response from the digital adder 145 is the sum of all ONEs or is close enough to distinguish the responses from the XOR gates in the bank 142 of them as being indicative that the particular size of I-FFT has currently been received, but with polarities of BPSK modulation opposite to those specified by the pattern of values for that particular size of I-FFT used for exclusive-ORing by the bank 141 of XOR gates. Otherwise, the threshold detector 146 generates a ZERO response indicative that the particular size of I-FFT may not have been received currently.

The output ports of the threshold detectors 144 and 146 connect to respective ones of the two input ports of an OR gate 147. The OR gate 147 supplies a ONE from its output port to an input port of the controller 128 for decoding, which controller 128 is depicted in FIG. 6 if and only if one of the respective responses from the threshold detectors 144 and 146 is a ONE indicative that the particular size of I-FFT has been received currently.

Figure 11:
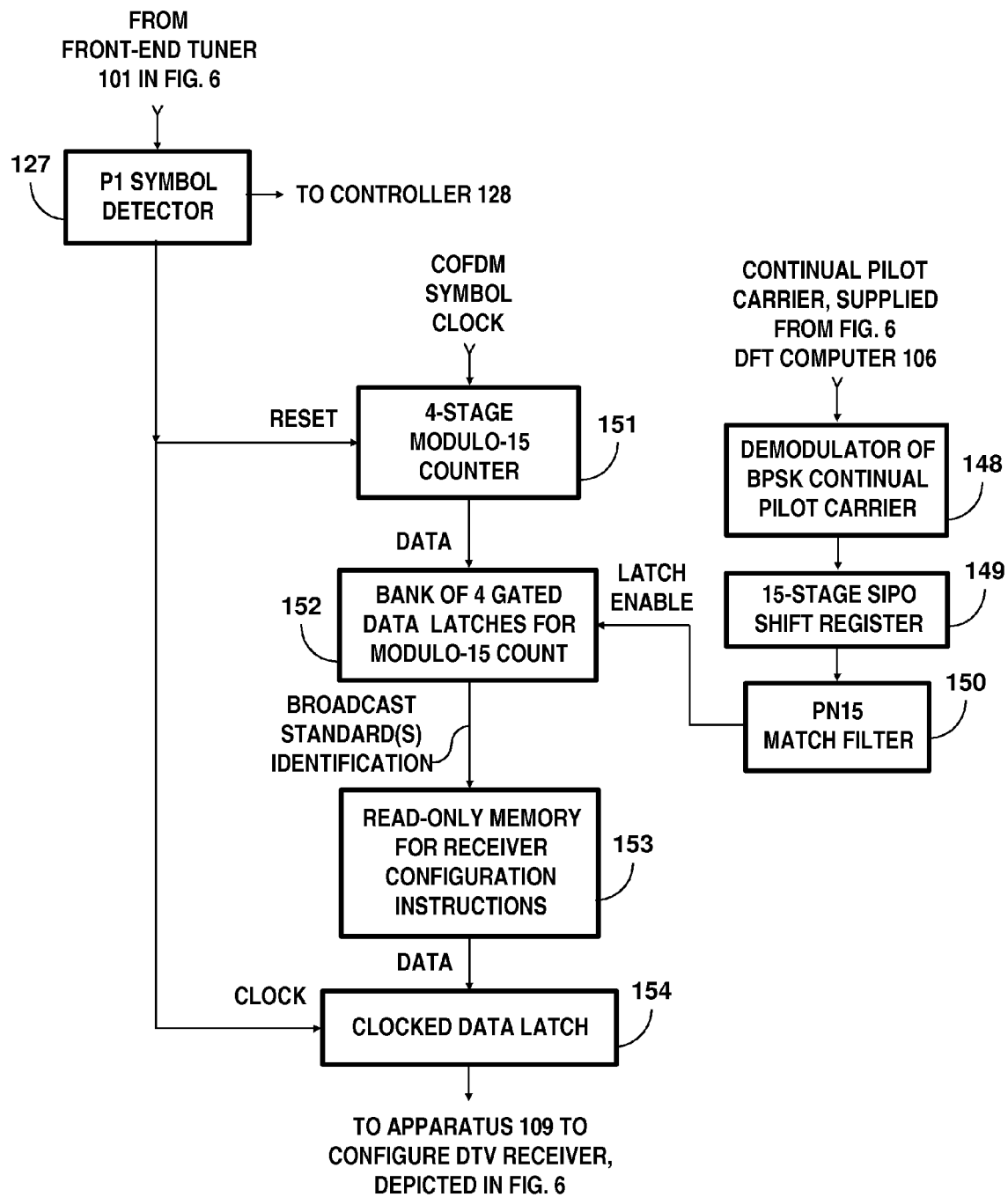
FIG. 11 is a detailed schematic diagram of a representative portion of the pilot carriers processor depicted in FIG. 6, which portion in accordance with aspects of the invention detects which one of a possible fifteen broadcast standards is employed in COFDM frames that are next to be received.

FIG. 11 depicts a portion of the pilot carriers processor depicted in FIG. 6, which portion in accordance with aspects of the invention detects the broadcast standard employed in currently received transmissions and possibly the service profile(s) of those currently received transmissions. The DFT computer 106 (depicted in FIG. 6) supplies a demodulator 148 (depicted in FIG. 11) with complex coordinates of a continual pilot carrier. As noted supra with regard to the detailed description of FIG. 5 structure for the unit 71 for generating a reference signal, this continual pilot carrier is BPSK-modulated by an overall PN sequence based on serially concatenated PN15 fragments. The response of the demodulator 148 is itself a series of PN15 sequences, if the BPSK modulation of the continual pilot carrier is demodulated with appropriate phasing. The output port of the demodulator 148 is connected to supply this series of PN15 sequences to the serial-input port of a serial-in/parallel-out (SIPO) shift register 149 shifting at COFDM symbol clock rate. The parallel-output port of the SIPO shift register 149 connects to the 15-bits-wide input port of a PN15 match filter 150.

A representative known structure for the PN15 match filter 150 is described as follows. Fifteen 2-input exclusive-NOR gates have first input ports that have respective bits of the PN15 sequence applied to them in order of their occurrence in forward time. The second input ports of these fifteen exclusive-NOR gates constitute the 15-bits-wide input port of the PN15 match filter and have the respective bits of the 15-chip sequence from the parallel-output port of the SIPO shift register 149 parallel-output port applied to them in the order in which those bits were supplied to the serial-input port of the SIPO shift register 149. The output ports of these fifteen exclusive-NOR gates are supplied to respective input ports of a 15-input AND gate, the output port of which is also the output port of the PN15 match filter 150. The PN15 match filter 150 generates a logic ONE output signal whenever a 15-chip sequence supplied from the output port of the SIPO shift register 149 correlates with the PN15 sequence applied to the first input ports of these fifteen exclusive-NOR gates.

This logic ONE response from the PN15 match filter 150 can occur during any specific one of fifteen phases of modulo-fifteen indexing of consecutive COFDM symbol intervals. The specific phase depends on the identity of the broadcast standard governing the transmission of currently received COFM signal. Referring back to FIG. 5, this specific phase was established by the addend identifying that broadcast standard being used by the adder 86 to augment the count from the counter 85, thus to generate the read addressing of the ROM 83 storing the overall PN sequence.

Care should be taken in the receiver design to assure that demodulation of the BPSK of each continual pilot carrier wave for recovering cyclically repeating 15-chip sequences is performed in correct phasing or polarity, so 15-chip sequences intended to be PN15 sequences are recovered as PN15 sequences rather than as ONEs'-complemented PN15 sequences. (Demodulation of the BPSK of each continual pilot carrier wave for recovering cyclically repeating 15-chip sequences should be performed in correct phasing or polarity to accommodate the alternative transmissions of 15-chip sequences intended to be ONEs'-complemented PN15 sequences also, which alternative transmission are described further on in this specification with reference to FIG. 13 of the drawings. This assures the 15-chip sequences intended to be ONEs'-complemented PN15 sequences will indeed be recovered as ONEs'-complemented PN15 sequences rather than as PN15 sequences.) The demodulator 148 for BPSK of a continual pilot carrier preferably provides amplitude limiting of plus and minus responses before converting them to logic ONEs and to logic ZEROs, respectively. This amplitude limiting compensates against the BPSK modulation of continual pilot carrier waves being reduced in amplitude when scattered pilot carriers coincide in time and frequency with continual pilot carriers in accordance with DVB-T2 practice. Also, this amplitude limiting mitigates problems caused by noise and interference in the reception channel. The remaining design consideration concerns the establishment of a reference time against which that phase can be measured.

By way of specific example, the occurrence of the P1 symbol at the beginning of each COFDM frame provides a good basis against which to index consecutive COFDM symbol intervals modulo-fifteen. This leaves the matter of how to measure the phase of the pulse response of the PN15 match filter 150 against this reference time. In FIG. 11 a counter 151 is clocked at the rate that consecutive COFDM symbols occur and is reset to zero count responsive to the P1 symbol detector 127 signaling the start of a COFDM frame. The counter 151 is a four-stage counter for counting COFDM-symbol intervals modulo fifteen, rolling over from the all-ONEs count to the all-ZEROs count. The COFDM-symbol-interval count from the counter 151 is clocked forward to the DATA input ports of a bank 152 of four gated data latches for respective bits of the modulo-15 count. Responsive to a pulse forwarded from the PN15 match filter 150 to their respective ENABLE input ports, the bank 152 of gated data latches are conditioned for temporarily storing the count of COFDM symbol interval from the counter 151.

The PN15 match filter 150 generates a respective pulse response to each of the serial PN15 fragments that occur in the demodulator 148 response during a COFDM frame. Since the counter 151 counts COFDM-symbol intervals modulo-15, during a COFDM frame the gated data latches in the bank 152 of them will latch the same count irrespective of when respective pulse responses to each of the serial PN15 fragments occur within that COFDM frame. Doppler fading, adjacent-channel interference or co-channel interference may eliminate one or more of the ONE-going impulse responses from the PN15 match filter 150 during the beginning of a COFDM frame. However, if a ONE-going impulse response is supplied from the PN15 match filter 150 later in the COFDM frame, that impulse response will still condition the gated data latches in the bank 152 of them to latch to a count from the counter 151 that will identify the broadcast standard governing the DTV transmissions to be received in the next COFDM frame.

FIG. 11 shows the broadcast standard identification provided by the 4-bit count latched in the bank 152 of gated data latches being applied as read-addressing to a read-only memory 153 for storing receiver configuration instructions. The ROM 153 is connected for supplying in parallel-bit format a set of receiver configuration instructions, as selected responsive to that read addressing, to the many-parallel-bits-wide input port of a clocked data latch 154. The clocked data latch 154 is clocked by indications of the starts of a COFDM frames supplied from the P1 symbol detector 114. This causes the clocked data latch 154 to latch the set of receiver configuration instructions supplied from the ROM 153 at the close of the previous COFDM frame for application to the apparatus 109 depicted in FIG. 6. The apparatus 109 is used to configure the DTV receiver to suit the broadcast standard that will govern the transmissions during the ensuing COFDM frame.

FIG. 11 shows the broadcast standard identification being derived from a single continual pilot carrier. A single continual pilot carrier is susceptible to severe frequency-selective fading. This problem arises when an in-band echo has nearly 0 dB amplitude and is of a phase tending to cancel the principal signal. This problem can be mitigated by demodulating two or more of the continual pilot carriers and maximal-ratio code-combining the results to develop a series of PN15 sequences to be applied to the input port of the PN15 match filter.

FIG. 12 depicts alternative, currently preferred apparatus for combating the problem of frequency-selective fading of continual pilot carrier waves. A plurality, N in number, of demodulators 1481, . . . 131N are connected for demodulating the binary phase-shift keying (BPSK) of respective continual pilot carrier waves and supplying their responses to the serial-input ports of a plurality, N in number, of 15-stage serial-in/parallel-out shift registers 1491, . . . 149N, respectively. The 15-bits-wide parallel-output port of each of these SIPO shift registers 1491, . . . 149N connects to the 15-bits-wide parallel-input port of a respective of one of PN15 match filters 1501, . . . 150N. Each of these PN15 match filters 1501, . . . 150N is similar to the PN15 match filter 150 in FIG. 11, and their respective output ports connect to respective input ports of a plural-input OR gate 155. The plural-input OR gate 155 supplies an output ONE responsive to receiving a logic ONE response from any one of the plurality of PN15 match filters 1501, . . . 150N. The output port of the plural-input OR gate 155 is connected for supplying its output ONE response to the bank 152 of gated data latches as an ENABLE signal, conditioning them to latch the modulo-15 count from the counter 151 for application to the ROM 153 as read addressing. A person skilled in the art of DTV receiver design should appreciate that the inventors' method of combating the problem of frequency-selective fading of continual pilot carrier waves, which method is illustrated in the FIG. 12 modification of the FIG. 9 pilot processing apparatus, can be extended for use in modifications of the pilot processing apparatuses depicted in 13-22. Such modifications are not depicted in the drawings, which would then be excessively complex and difficult to comprehend in a reasonable length of time.

Fifteen different broadcast standards governing the nature of current COFDM transmissions could be identified in a broadcast system in which transmitter apparatus includes the FIG. 5 unit for generating a reference sequence that specifies the broadcast standard and in which receiver apparatus includes the FIG. 11 unit that detects the specified broadcast standard. This might be enough to accommodate the evolution of COFDM broadcasting standards for several years. The bootstrap signaling being incorporated into the ATSC 3.0 DTV Standard provides for robust signaling of general broadcast standards, so such signaling no longer tends to be a matter of appreciable concern. However, the problem of how to specify particular ones of the many possible modes of operation, or "service profiles", within any specific broadcast standard is still of appreciable concern. A need for being able to identify more types of broadcasting can arise sooner if respective service profiles for each broadcast standard are identified by the modulation of the pilot carrier waves, rather than the modulation of the pilot carrier waves being used to identifying just the broadcast standard alone. Being able to signal more than fifteen service profiles for each broadcast standard is apt to be of concern, since this can relieve pressure to extend the number of bits in the L1 first layer of signaling to accommodate new features in COFDM broadcasting.

The overall PN sequence based on cyclically repeating PN15 sequence can replaced by an overall PN sequence based on repetition of a longer fundamental sequence, such as a PN31 sequence. Basing the overall PN sequence on cyclically repeating PN31 sequence, rather than on cyclically repeating PN15 sequence, would slightly more than double the number of different COFDM broadcasting systems that could be specified. However, such approach has the drawback that it does not provide the backward compatibility broadcasters may desire during transition from DVB-T2 broadcasting to a newer COFDM broadcasting standard such as ATSC 3.0. There would be less flexibility in the choice of COFDM ("T2") frame size being a multiple of the chips in the overall PN sequence than is afforded by the cyclically repeating PN15 sequence. Match filtering of the cyclically repeating longer PN sequence would require more computation and would be slower. The match filtering would provide fewer impulse responses per COFDM frame, increasing the likelihood that noise or interference might occasionally disrupt identification of the broadcast standard governing the transmission of the next COFDM frame.

Other approaches to increasing the number of different COFDM broadcasting systems use phase shifting of various different cyclically repeating 15-chip sequences to specify the different COFDM broadcasting systems. In many of these approaches the COFDM transmitter manipulates cyclically repeating standard PN15 sequences to generate one(s) of these different 15-chip sequences. The COFDM receiver attempts to reverse this manipulation and detect the recovered PN15 sequence with a PN15 match filter. The COFDM receiver is apt to be constructed to attempt reversal of more than one such manipulation followed by detection of the phasing of any cyclically repeating PN15 sequence amongst the resulting 15-chip sequences performed by respective PN15 match filters.

One of these other approaches to increasing the number of different COFDM broadcasting systems that can be specified doubles the number to thirty. The order of sequencing ONEs and ZEROs in the original-order PN15 sequence per DVB-T2 practice is reversed, to define a new reversed-order PN15 sequence for being cyclically repeated. This changes the PN15 match filtering procedure from just involving auto-correlation of the original PN15 sequence to a match filtering procedure that further involves cross-correlation between the original-order PN15 sequence and the reversed-order PN15 sequence. Cross-correlation between either of these PN15 sequences and any other serial sequence of bits is lower than the peak auto-correlation result, this being a well-known property of PN sequences in general. The match filters that are composed of a plurality of exclusive-NOR gates and a plural-input AND gate provide a ONE response when and only when complete auto-correlation obtains.

Figure 13:
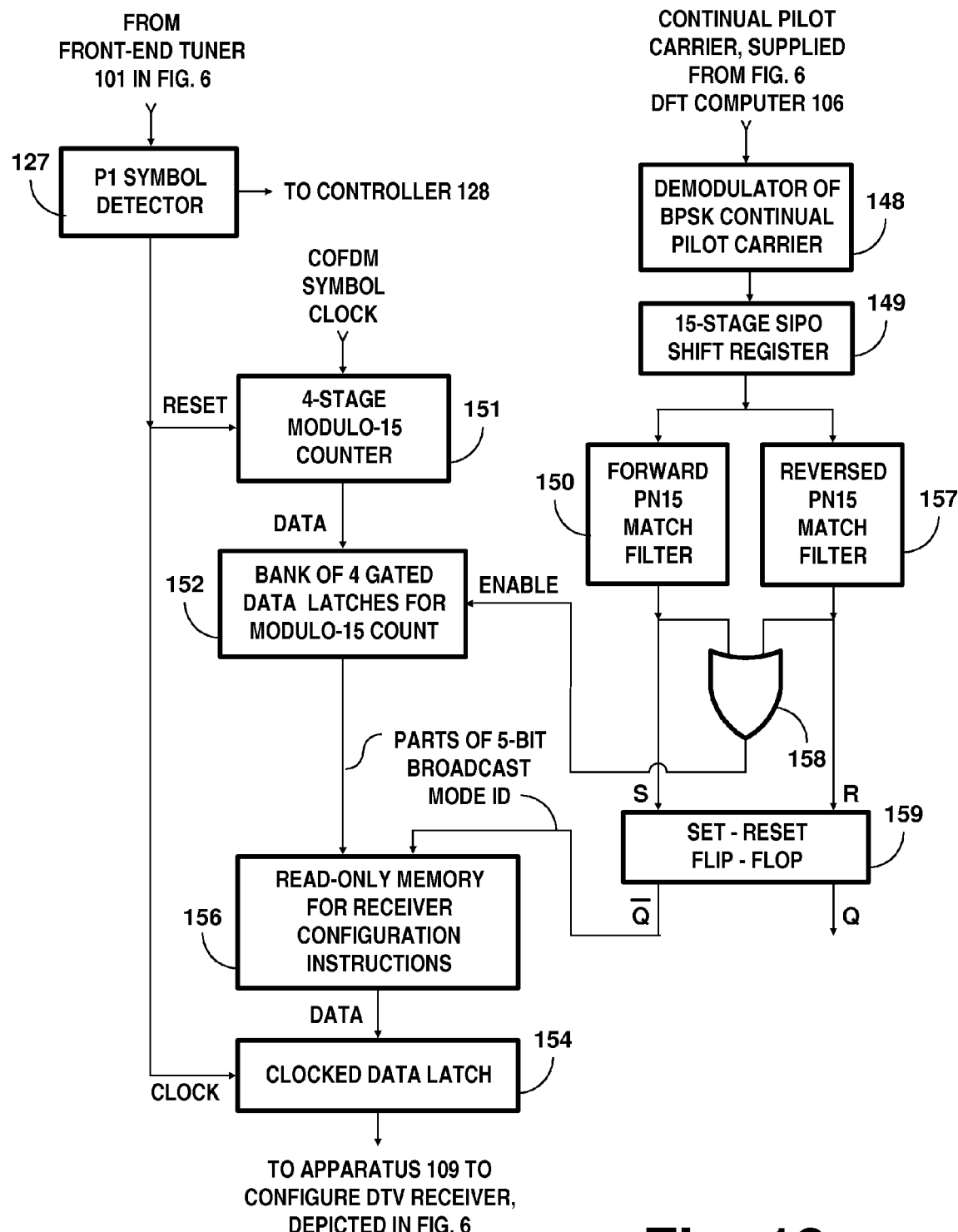
FIG. 13 is a detailed schematic diagram of a representative portion of the pilot carriers processor depicted in FIG. 6, which portion in accordance with aspects of the invention detects which one of a possible thirty broadcast standards is employed in COFDM frames that are next to be received.

FIG. 13 depicts a modification of the FIG. 11 portion of the pilot carriers processor 107 depicted in FIG. 6, which modification allows identification of up to thirty different types of COFDM transmissions being currently received. The ROM 153 with four-bit-wide read addressing is replaced in FIG. 13 by a read-only memory 156 with five-bit-wide read addressing The read-output port of the ROM 156 is connected for supplying the data input port of the clocked data latch 154 with a set of receiver configuration instructions in parallel-bit format. The FIG. 13 modification employs a pair of match filters, the match filter 150 for the normal-order PN15 sequence and another match filter 157 for the reversed-order PN15 sequence. Their responses are ORed by an OR gate 158 to generate the ENABLE signal controlling the bank 152 of four gated data latches used for latching a modulo-15 count of COFDM symbols in the COFDM frame. The COFDM broadcasting system used in the next COFDM frame is identified by extending the latched modulo-15 count by another bit indicating which of the pair of match filters exhibited a logic ONE auto-correlation response.

The DFT computer 106 (depicted in FIG. 6) supplies the demodulator 148 in FIG. 13 with complex coordinates of a continual pilot carrier. This continual pilot carrier is BPSK-modulated by an overall PN sequence based on serially concatenated PN15 fragments scanned in a "forward" temporal order or, alternatively, on the same serially concatenated PN15 fragments scanned in a "reversed" temporal order. Like FIG. 11, FIG. 13 shows the output port of the demodulator 148 connected for supplying its baseband response to the serial-input port of the 15-stage SIPO shift register 149. The 15-bits-wide parallel-output port of the 15-stage SIPO shift register 149 connects to the 15-bits-wide parallel-input port of the "forward" PN15 match filter 150 for the normal-order PN15 fragments. FIG. 13 further shows the 15-bits-wide parallel-output port of the 15-stage SIPO shift register 149 also connected for supplying its baseband response to the 15-bits-wide parallel-input port of the "reversed" PN15 match filter 157 for reversed-time-order PN15 fragments.

The respective output ports of the match filters 150 and 157 have connections to respective input ports of a two-input OR gate 158 that generates a ONE-going pulse whenever either one of the PN15 match filters 150 and 157 exhibits a logic ONE response. This ONE-going pulse is supplied to the bank 152 of four gated data latches as a ENABLE signal conditioning them to latch the current modulo-15 count from the counter 151. The four-bit-wide response from the bank 152 of four gated data latches is joined by another fifth bit to supply a five-bit-wide read address to the ROM 157. This other bit indicates which one of the PN15 match filters 150 and 157 generated the logic ONE response supplied as ENABLE signal to the bank 152 of four gated data latches. Toward this goal, the respective output ports of the match filters 150 and 157 have connections to the SET input port and the RESET input port of a set-reset flip-flop 159 that supplies from an output port thereof the fifth bit of the ROM 156 read address.

Figure 14:
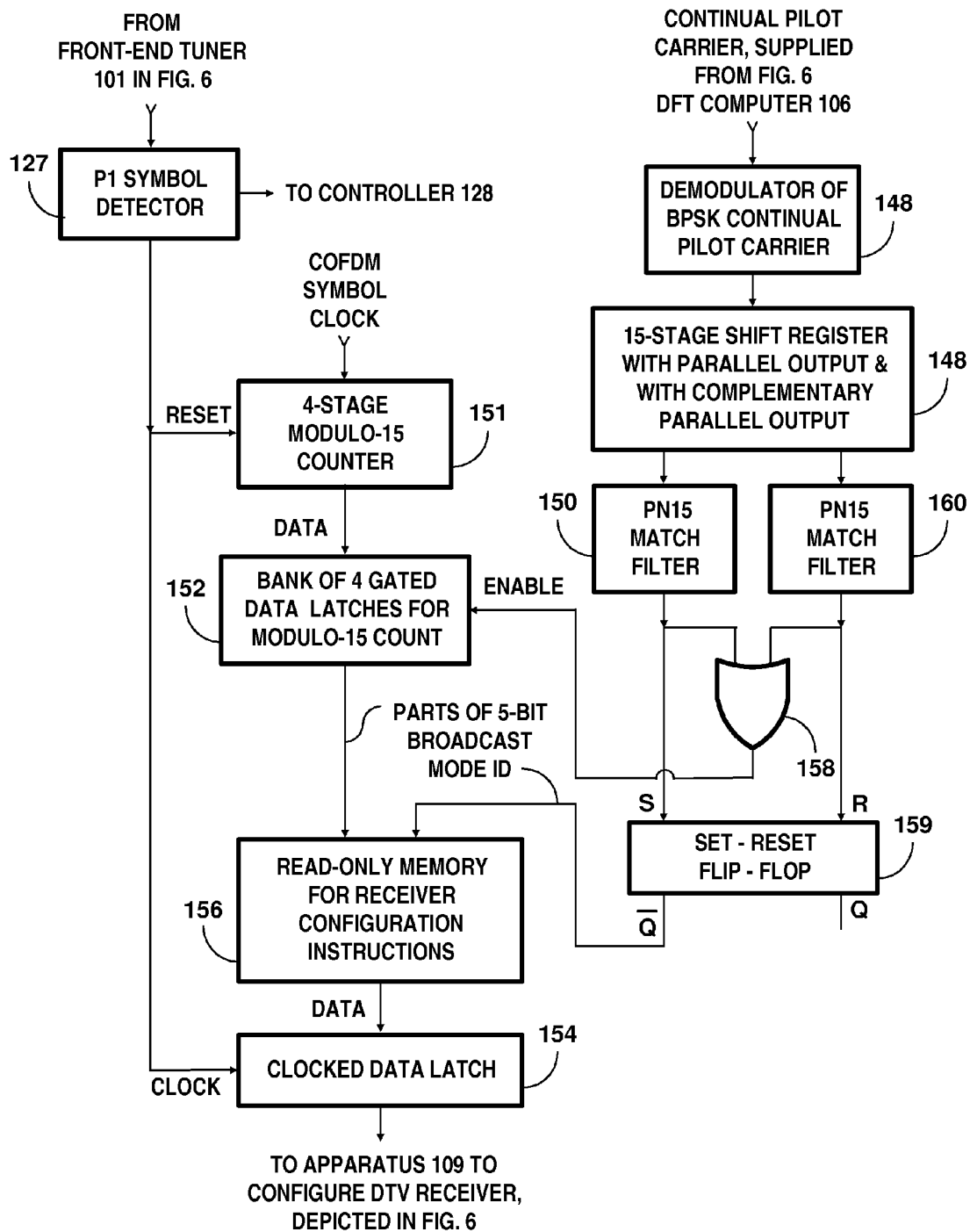
FIG. 14 is a detailed schematic diagram of a different representative portion of the pilot carriers processor depicted in FIG. 6, which portion in accordance with aspects of the invention detects which one of a possible thirty broadcast standards is employed in COFDM frames that are next to be received.

Another approach to doubling the number of different COFDM broadcasting systems that can be specified is modulating the pilot carrier waves with cyclically repeated ONEs'-complemented PN15 sequences as an alternative to modulating the pilot carrier waves with cyclically repeated PN15 sequences. FIG. 14 depicts a modification of the FIG. 11 portion of the pilot carriers processor 107 alternative to that depicted in FIG. 13, which alternative modification also allows identification of up to thirty different types of COFDM transmissions being currently received. As depicted in FIG. 14, the receiver employs a pair of match filters, the PN15 match filter 150 and another PN15 match filter 160 of similar structure. The output port of the demodulator 148 is connected for supplying its baseband response to the serial-input of a 15-stage serial-in/parallel-out shift register 161 that has a first 15-bits-wide parallel-output port for supplying 15-chip sequences to the 15-bits-wide parallel-input port of the PN15 match filter 150, much like the portion of a pilot carriers processor depicted FIG. 11. The SIPO shift register 161 depicted in FIG. 14 also a second 15-bits-wide parallel-output port for supplying ONEs'-complemented 15-chip sequences to the 15-bits-wide parallel-input input port of the PN15 match filter 160. This connection of the SIPO shift register 161 and the PN15 match filter 160 functions as a match filter for ONEs'-complemented PN15 sequences. The COFDM broadcasting system currently in use is identified by extending the latched modulo-15 count from the bank 152 of gated latches by another bit indicating which of the pair of match filters 150 and 160 exhibited a logic ONE auto-correlation response.

The respective output ports of the PN15 match filters 150 and 160 depicted in FIG. 14 connect to respective input ports of the two-input OR gate 158 that generates a ONE-going pulse whenever either one of the match filters 150 and 160 exhibits a logic ONE response. Cross-correlation between the cyclically repeated ONEs'-complemented PN15 sequences and the cyclically repeated original PN15 sequences is lower than the peak auto-correlation result for either of them. Consequently, only one of the PN15 match filters 150 and 160 exhibits a logic ONE response to cause the two-input OR gate 158 to generate a ONE-going pulse. This ONE-going pulse is supplied to the bank 152 of four gated data latches as a ENABLE signal conditioning them to latch the current modulo-15 count from the counter 151. The four-bit-wide response from the bank 152 of four gated data latches is joined by another fifth bit to supply a five-bit-wide read address to the ROM 156. This other bit indicates which one of the PN15 match filters 150 and 160 generated the logic ONE response supplied as ENABLE signal to the bank 152 of four gated data latches. Toward this goal, the respective output ports of the match filters 150 and 160 have connections to the SET input port and the RESET input port of a set-reset flip-flop 159 that supplies from an output port thereof the fifth bit of the ROM 156 read address.

A third approach to doubling to thirty the number of broadcast standards that can be identified is to shuffle the order of the fifteen bits in the PN15 sequence and use the shuffled PN15 sequences to identify additional possible broadcast standards. Doubling the number of broadcast standards that can be identified by using reverse-order PN15 sequences in addition to forward-order PN15 sequences is one species of this generic approach. Each different shuffling of the chips in the PN15 sequence allows the identification of fifteen more COFDM broadcasting modes. The number of possibilities for shuffling the bits of the PN15 sequence can be computed, but is clearly much larger than required for signaling COFDM broadcasting modes. The permutation formula indicates that eight individual items can be arranged in fifteen places the following number of ways: 15!/(15−8)!=2,882,880. The eight ONEs are indistinguishable from each other which in accordance with the combination formula reduces the number of different possibilities for shuffling by the factor 8!. There are 715 possible unique patterns of eight ONEs in a 15-chip sequence, fifteen of which patterns are discarded for being the possible phase rotations of the original PN15 sequence. (When a PN sequence is shifted and the shifted sequence modulo-2 added to the un-shifted sequence with an exclusive-OR gate, the result is the same PN sequence with some other shift. This effect interferes with practice of the invention.) This leaves 700 possible patterns of shuffling the PN15 sequence, groups of fifteen of which are simple phase rotations of the same basic pattern. Eliminating the replications of basic patterns cuts the number of shuffling patterns of actual interest to 46 or somewhat fewer. If a number of different additive scrambling procedures are to be applied to PN15 sequences in order to be able to distinguish among the respective signaling of a very large number of different COFDM broadcasting modes, it is preferable albeit unnecessary that the various scrambled PN15 sequences exhibit as low as possible cross-correlations with each other. Computer simulation facilitates determining which among these 46 or so possible shuffling algorithms generate respective cyclically repeating 15-chip sequences exhibiting the smallest cross-correlations with each other.

FIG. 15 depicts a modification of the FIG. 11 portion of the pilot carriers processor 107 that responds to the phasing of a PN15 sequence to identify fifteen possible broadcast standards and that responds to the phasing of a shuffled PN15 sequence to identify an additional fifteen possible broadcast standards. Similar to what is depicted in FIG. 13, the receiver employs a pair of match filters, the PN15 match filter 150 and the PN15 match filter 160 of similar structure. The output port of the demodulator 148 is connected to the serial-input port of the SIPO shift register 149 shifting at COFDM symbol clock rate. The parallel-output port of the SIPO shift register 149 connects to the 15-bits-wide input port of the PN15 match filter 150, just as in the portion of a pilot carriers processor depicted FIG. 11. FIG. 15 shows the parallel-output port of the SIPO shift register 149 further connected via an unshuffler 162 of the shuffled bits of PN15 sequences to 15-bits-wide input port of the PN15 match filter 160. Essentially, the unshuffler 162 just consists of fifteen "wired" connections from the parallel-output port of the SIPO shift register 149 to the parallel-input port of the PN15 match filter 160, the pattern of those fifteen individual "wired" connections defining the unshuffling algorithm. The cascade connection of the unshuffler 162 and the PN15 match filter 160 functions as a match filter for the shuffled PN15 sequences. The COFDM broadcasting system currently in use is identified by extending the latched modulo-15 count by another bit indicating which of the pair of match filters 150 and 160 has exhibited a logic ONE auto-correlation response.

The rest of the FIG. 15 modification of the FIG. 11 portion of the pilot carriers processor 107 is similar to the FIG. 14 modification. The respective output ports of the match filters 150 and 160 depicted in FIG. 13 have connections to respective input ports of the two-input OR gate 158. Whenever either one of the PN15 match filters 150 and 160 generates a logic ONE response, this causes the two-input OR gate 158 to generate a ONE-going pulse supplied to the bank 152 of four gated data latches as an ENABLE signal conditioning them to latch the current modulo-15 count from the counter 151. The four-bit-wide response from the bank 152 of four gated data latches is joined by another fifth bit to supply a five-bit-wide read address to the ROM 156. This other bit indicates which one of the PN15 match filters 150 and 160 generated the logic ONE response supplied as ENABLE signal to the bank 152 of four gated data latches. Toward this goal, the respective output ports of the match filters 150 and 160 have connections to the SET input port and the RESET input port of a set-reset flip-flop 159 that supplies from an output port thereof the fifth bit of the ROM 156 read address.

A fourth approach to doubling to thirty the number of broadcast standards that can be identified is to scramble the PN15 sequence synchronously and use the resulting additive scrambled PN15 sequences to identify additional possible broadcast standards. In additive scrambling (alternatively termed "synchronous" scrambling) a long maximal-length pseudo-random sequence is added modulo-2 to a data sequence. In this aspect of the invention, a cyclically repeating 15-chip sequence is added modulo-2 to the cyclically repeating PN15 sequence to generate a BPSK modulating signal for continual pilot carrier waves. This BPSK can be demodulated in the COFDM DTV receiver and summed modulo-2 with a cyclically repeating 15-chip sequence in an attempted additive descrambling procedure. If the cyclically repeating 15-chip sequence the receiver uses in the attempted additive descrambling procedure is the same as the cyclically repeating 15-chip sequence the transmitter used for additive scrambling the cyclically repeating PN15 sequence, the attempted additive descrambling procedure will reproduce the cyclically repeating PN15 sequence. The modulo-2 sum from the attempted descrambling is supplied to a PN15 match filter to determine whether or not the attempted additive descrambling procedure successfully reproduces the PN15 sequence.

It is desirable that the BPSK of a continual pilot carrier wave has about as many ONEs as ZEROes to reduce direct current terms. So, the scrambled PN15 sequence preferably has about as many ONEs as ZEROes. As indicated supra eight individual items can be arranged in fifteen places in 2,882,880 ways according to the permutation formula. If the eight individual items are indistinguishable from each other, according to the formula ruling combinations the number of different possibilities for arrangement is reduced by the factor 8!. There are 715 possible unique patterns of eight ONEs in a 15-chip sequence, fifteen of which patterns are discarded for being the possible phase rotations of the original PN15 sequence. Furthermore, there are 715 possible unique patterns of eight ZEROs in a 15-chip sequence, fifteen of which patterns are discarded for being the possible phase rotations of the ONEs'-complemented original PN15 sequence. These observations leave 1,400 possible 15-chip sequences to be considered for additive scrambling, groups of fifteen of which are simple phase rotations of the same basic pattern. Eliminating the replications of basic patterns cuts the number of shuffling patterns of actual interest to 92 or somewhat fewer. If a number of different additive scrambling procedures are to be applied to PN15 sequences in order to be able to distinguish among the respective signaling of a very large number of different COFDM broadcasting modes, it is preferable although not necessary that the various scrambled PN15 sequences exhibit as low as possible cross-correlations with each other. Computer simulation facilitates determining which among these 92 or so possible scrambling algorithms generate respective cyclically repeating 15-chip sequences exhibiting the smallest cross-correlations with each other.

The 15-chip sequence for generating either one of pair of scrambled PN15 sequences can be the same as the other of the two scrambled PN15 sequences. E. g, the 15-chip sequences 100 100 111 100 110 and 011 000 101 111 100 have such relationship to each other. So do the 15-chip sequences 100 111 100 110 100 and 011 100 010 001 010. Rotations of the PN15 sequence should be avoided as scrambling sequences. This is because a cyclically repeated PN sequence of a first phasing having its chips added modulo-2 to the chips of the same cyclically repeated PN sequence of a second phasing results in the same cyclically repeated PN sequence of a third phasing. This interferes with attempting to use the fifteen possible phases of a cyclically repeating PN15 sequence to identify 15 possible COFDM broadcasting modes and further to use the fifteen possible phases of a cyclically repeating additively scrambled PN15 sequence to identify 15 more possible COFDM broadcasting modes.

FIG. 16 depicts a modification of the FIG. 11 portion of the pilot carriers processor 93 that responds to the phasing of a PN15 sequence to identify fifteen possible broadcast standards and that responds to the phasing of an additively scrambled PN15 sequence to identify an additional fifteen possible broadcast standards. Similar to what is depicted in FIGS. 14 and 15, the receiver employs the PN15 match filter 150 and the PN15 match filter 160 of similar structure. The output port of the demodulator 148 is connected to the serial-input port of the SIPO shift register 149 shifting at COFDM symbol clock rate. The parallel-output port of the SIPO shift register 149 connects to the 15-bits-wide input port of the PN15 match filter 150. FIG. 16 shows the parallel-output port of the SIPO shift register 149 further connected via an additive descrambler 163 of the PN15 sequences to 15-bits-wide input port of the PN15 match filter 160. The cascade connection of the additive descrambler 163 and the PN15 match filter 160 functions as a match filter for the scrambled PN15 sequences. The COFDM broadcasting system currently in use is identified by extending the latched modulo-15 count by another bit indicating which of the pair of match filters 150 and 160 has exhibited a logic ONE auto-correlation response.

The rest of the FIG. 16 modification of the FIG. 11 portion of the pilot carriers processor 107 is similar to the modifications in FIGS. 13, 14 and 15. The respective output ports of the match filters 150 and 160 depicted in FIG. 14 have connections to respective input ports of the two-input OR gate 158 that generates a ONE-going pulse whenever either one of the PN15 match filters 150 and 160 exhibits a logic ONE response. This ONE-going pulse is supplied to the bank 152 of four gated data latches as an ENABLE signal conditioning them to latch the current modulo-15 count from the counter 151. The four-bit-wide response from the bank 152 of four gated data latches is joined by another fifth bit to supply a five-bit-wide read address to the ROM 156. This other bit indicates which one of the PN15 match filters 150 and 160 generated the logic ONE response supplied as ENABLE signal to the bank 152 of four gated data latches. Toward this goal, the respective output ports of the match filters 150 and 160 have connections to the SET input port and the RESET input port of a set-reset flip-flop 159 that supplies from an output port thereof the fifth bit of the ROM 156 read address.

FIG. 17 depicts a modification of the FIG. 11 portion of the pilot carriers processor 107 in a receiver capable of identifying as many as sixty different modes of COFDM broadcasting that might be used in COFDM transmissions. The signaling of the COFDM broadcasting mode governing a COFDM transmission combines the two approaches to increasing the number of broadcast standards that can be identified described supra with reference to FIGS. 13 and 14. The ROM 156 with five-bit-wide read addressing depicted in FIGS. 13 and 14 is replaced in FIG. 17 by a read-only memory 164 with six-bit-wide read addressing. The COFDM broadcasting mode used in the next COFDM frame is identified by extending by two bits a latched modulo-15 count from the bank 152 of four gated data latches to generate the six-bit-wide read addressing for the ROM 164. The ROM 164 is connected for supplying in parallel-bit format a set of receiver configuration instructions, as selected responsive to that read addressing, to the many-parallel-bits-wide input port of the clocked data latch 154. The clocked data latch 154 is clocked by indications of the starts of a COFDM frames supplied from the P1 symbol detector 127. This causes the clocked data latch 154 to latch the set of receiver configuration instructions supplied from the ROM 164 at the close of the previous COFDM frame for application to the apparatus 109 to configure the DTV receiver to suit the broadcast standard used for the transmissions during the ensuing COFDM frame, which apparatus 109 is depicted in FIG. 6.

FIG. 17 depicts the receiver employing two pairs of match filters. One pair of match filters includes the "forward" PN15 match filter 150 for ordinary-time-order PN15 sequence and another PN15 match filter 160 of similar structure. The other pair of match filters includes the "reversed" PN15 match filter 157 for reversed-time-order PN15 sequence and another "reversed" PN15 match filter 165 of similar structure. The output port of the demodulator 148 is connected for supplying its baseband response to the serial-input port of the 15-stage SIPO shift register 161. The first 15-bits-wide parallel-output port of the SIPO shift register 161 is connected for supplying 15-chip sequences to the 15-bits-wide parallel-input ports of the "forward" PN15 match filter 150 and of the "reversed" PN15 match filter 157. The second 15-bits-wide parallel-output port of the SIPO shift register 161 is connected for supplying ONEs'-complemented 15-chip sequences to the 15-bits-wide parallel-input ports of the "forward" PN15 match filter 160 and of the "reversed" PN15 match filter 165.

The respective output ports of the "forward" PN15 match filter 150 and of the "reversed" PN15 match filter 157 have connections to respective input ports of a two-input OR gate 166 that generates a ONE-going pulse whenever either one of the match filters 150 and 157 exhibits a logic ONE response. The respective output ports of the "forward" PN15 match filter 160 and of the "reversed" PN15 match filter 165 have connections to respective input ports of a two-input OR gate 167 that generates a ONE-going pulse whenever either one of the match filters 160 and 165 exhibits a logic ONE response. The output ports of the OR gates 166 and 167 connect to respective ones of the two input ports of an OR gate 168. The gates 166, 167 and 168 function as a four-input OR gate that responds to any one of the match filters 150, 157, 160 and 165 exhibiting a logic ONE response to supply a ONE-going pulse as ENABLE signal to the bank 152 of four gated data latches, conditioning these gated data latches to latch the current modulo-15 count supplied them from the counter 151.

The output ports of the PN15 match filters 150, 157, 160 and 165 connect respectively to the input ports of four gated data latches arranged in a bank 169 of gated data latches for temporarily storing positional code specifying which of the PN15 match filters 150, 157, 160 and 165 most recently generated a logic ONE response. Toward this goal, the bank 169 of gated data latches temporarily stores the positional code defined by the responses of the PN15 match filters 150, 157, 160 and 165 whenever the OR gate 167 supplies a ONE-going pulse as ENABLE signal to that bank 169 of four gated data latches, signaling an update of the positional code. The positional code latched in the bank 169 of four gated data latches is supplied from the respective output ports of those gated data latches as 4-bit-wide read addressing to a read-only memory 170 for converting each of the four possible positional codewords to a respective one of four 2-bit binary numbers. The COFDM broadcasting mode used in a next COFDM frame is identified by extending the modulo-15 count latched in the bank 152 of four gated data latches by two extra bits, which extra two bits are supplied from the ROM 170 as read output signal therefrom. This six-bit-wide identification of the COFDM broadcast mode to be used in the next COFDM frame is applied to the ROM 164 as read addressing thereof.

FIG. 18 depicts an alternative modification of the FIG. 11 portion of the pilot carriers processor 107 in a receiver capable of identifying as many as sixty different modes of COFDM broadcasting that might be used in COFDM transmissions. The signaling of the COFDM broadcasting mode governing a COFDM transmission combines the two approaches to increasing the number of broadcast standards that can be identified described supra with reference to FIGS. 14 and 15. The ROM 153 with five-bit-wide read addressing depicted in FIGS. 14 and 15 is replaced in FIG. 18 by the read-only memory 164 with six-bit-wide read addressing. The COFDM broadcasting mode to be used in the next COFDM frame is identified by extending by two bits a latched modulo-15 count from the bank 152 of four gated data latches to generate the six-bit-wide read addressing for the ROM 164. The ROM 164 is connected for supplying in parallel-bit format a set of receiver configuration instructions, as selected responsive to that read addressing, to the many-parallel-bits-wide input port of the clocked data latch 154. The clocked data latch 154 is clocked by indications of the starts of a COFDM frames supplied from the P1 symbol detector 149. This causes the clocked data latch 154 to latch the set of receiver configuration instructions supplied from the ROM 164 at the close of the previous COFDM frame for application to the apparatus 109 to configure the DTV receiver to suit the broadcast standard used for the transmissions during the ensuing COFDM frame, which apparatus 109 is depicted in FIG. 6.

FIG. 18 depicts the receiver employing two pairs of match filters. One pair of match filters includes the PN15 match filter 150 for normal-order PN15 sequence and another match filter 171 for ONEs'-complemented normal-order PN15 sequence. The other pair of match filters includes the PN15 match filter 160 for normal-order PN15 sequence and another match filter 172 for ONEs'-complemented normal-order PN15 sequence. The output port of the demodulator 148 is connected to the serial-input port of the SIPO shift register 149 shifting at COFDM symbol clock rate. The parallel-output port of the SIPO shift register 149 connects to the 15-bits-wide input ports of the PN15 match filter 150 and of the match filter 171 for ONEs'-complemented PN15 sequence. The parallel-output port of the SIPO shift register 149 further connects via the unshuffler 162 of the shuffled bits of 15-chip sequences to 15-bits-wide input ports of the PN15 match filter 160 and of the match filter 172 for ONEs'-complemented PN15 sequence. Essentially, the unshuffler 162 just consists of fifteen "wired" connections from the parallel-output port of the SIPO shift register 149 to each of the parallel-input ports of the match filters 160 and 172, the pattern of those fifteen individual "wired" connections defining the unshuffling algorithm.

FIG. 18 shows the respective output ports of the PN15 match filter 150 and of the match filter 171 for ONEs'-complemented PN15 sequence connected to respective input ports of the two-input OR gate 166. FIG. 18 further shows the respective output ports of the PN15 match filter 160 and of the match filter 172 for ONEs'-complemented PN15 sequence connected to respective input ports of the two-input OR gate 167. The output ports of the OR gates 166 and 167 connect to respective ones of the two input ports of the OR gate 168. The two-input OR gates 166, 167 and 168 as so connected function as a four-input OR gate that responds to any one of the match filters 150, 171, 160 and 172 exhibiting a logic ONE response to supply a ONE-going pulse as ENABLE signal to the bank 152 of four gated data latches, which conditions these gated data latches to latch the current modulo-15 count supplied them from the counter 151.

The output ports of the PN15 match filters 150, 171, 160 and 172 connect respectively to the input ports of four gated data latches arranged in the bank 169 of gated data latches for temporarily storing positional code specifying which of the PN15 match filters 150, 171, 160 and 172 most recently generated a logic ONE response. Toward this goal, the bank 169 of gated data latches temporarily stores the positional code defined by the responses of the PN15 match filters 150, 171, 160 and 172 whenever the OR gate 168 supplies a ONE-going pulse as ENABLE signal to that bank 169 of four gated data latches, signaling an update of the positional code. The positional code latched in the bank 169 of four gated data latches is supplied from the respective output ports of those gated data latches as 4-bit-wide read addressing to the read-only memory 170 for converting each of the four possible positional codewords to a respective one of four 2-bit binary numbers. The COFDM broadcasting mode to be used in the next COFDM frame is identified by extending the modulo-15 count latched in the bank 152 of four gated data latches by two extra bits, which extra two bits are supplied from the ROM 170 as read output signal therefrom. This six-bit-wide identification of the COFDM broadcasting system to be used in the next COFDM frame is applied to the ROM 164 as read addressing thereof.

FIG. 19 depicts modifications that can be made to the FIG. 16 portion of the pilot carriers processor 107 so the receiver is capable of identifying as many as ninety different conditions governing COFDM broadcasts. FIG. 19 depicts the receiver employing three PN15 match filters 150, 160 and 173. FIG. 19 further depicts the receiver employing three match filters 171, 172 and 174 for ONEs'-complemented PN15 sequence. The output port of the demodulator 148 is connected to the serial-input port of the SIPO shift register 149 shifting at COFDM symbol clock rate. The parallel-output port of the SIPO shift register 149 connects to the 15-bits-wide input ports of the PN15 match filter 150 and of the match filter 171 for ONEs'-complemented PN15 sequence. The parallel-output port of the SIPO shift register 149 further connects via the first additive descrambler 163 for 15-chip sequences to the 15-bits-wide input ports of the PN15 match filter 160 and of the match filter 172 for ONEs'-complemented PN15 sequence. The parallel-output port of the SIPO shift register 149 further connects via a second additive descrambler 175 for 15-chip sequences to the 15-bits-wide input ports of the PN15 match filter 173 and of the match filter 174 for ONEs'-complemented PN15 sequence.

The output ports of the match filters 150, 171, 160, 172, 173 and 174 connect to the input ports of a 6-input OR gate 176 that responds to any one of these match filters exhibiting a logic ONE response to supply a ONE-going pulse as ENABLE signal to the bank 152 of four gated data latches, which conditions these gated data latches to latch the current modulo-15 count supplied them from the counter 151. Owing to drafting limitations FIG. 19 does not explicitly depict the counter 151, the bank 152 of gated latches, a read-only memory for storing receiver configuration instructions and the ensuing clocked data latch 154. The ROM for storing receiver configuration instructions is larger in size with 7-bit-wide addressing, four of which bits are supplied from the bank 152 of gated latches. The other three bits of the 7-bit-wide addressing indicate which of the match filters 150, 171, 160, 172, 173 and 174 most recently generated a logic ONE response.

The output ports of the match filters 150, 171, 160, 172, 173 and 174 connect respectively to the input ports of six gated data latches arranged in a bank 177 of gated data latches for temporarily storing positional code specifying which of the PN15 match filters 150, 171, 160, 172, 173 and 174 most recently generated a logic ONE response. Toward this goal, the bank 177 of gated data latches temporarily stores the positional code defined by the responses of the match filters 150, 171, 160, 172, 173 and 174 whenever the OR gate 176 supplies a ONE-going pulse as ENABLE signal to that bank 177 of six gated data latches, signaling an update of the positional code. The positional code latched in the bank 177 of six gated data latches is supplied from the respective output ports of those gated data latches as 6-bit-wide read addressing to a read-only memory 178 for converting each of the six possible positional codewords to a respective one of six 3-bit binary numbers. The COFDM broadcasting mode to be used in the next COFDM frame is identified by extending the modulo-15 count latched in the bank 152 of four gated data latches by three extra bits, which extra three bits are supplied from the ROM 178 as read output signal therefrom. This 7-bit-wide identification of the COFDM broadcasting system to be used in the next COFDM frame is applied as read addressing to the read only memory for storing receiver configuration instructions.

The procedure used for generating the FIG. 19 modification of the FIG. 16 portion of the pilot carriers processor 107 is illustrative of a more general procedure for increasing the number of COFDM broadcasting modes that can be conveyed via COFDM-symbol-to-COFDM-symbol BPSK modulation of a continual pilot carrier wave. Each increase by thirty in this number is secured by an additional descrambler for descrambling PN15 sequences scrambled in a different way, another PN15 match filter and another match filter for ONEs'-complemented PN15 sequence connected like analogous elements 175, 173 and 174. The OR gate generating the ENABLE signal for the bank 152 of gated data latches is replaced by an OR gate with two more inputs connected for receiving the respective responses of the further PN15 match filter and further match filter for ONEs'-complemented PN15 sequence. The bank of gated data latches for storing respective responses of the match filters as a positional code has another two gated data latches added thereto, and the ROM for converting positional codes to binary numbers will have to be modified to accommodate larger read addresses.

FIG. 20 depicts a portion of the pilot carriers processor 107 in a receiver capable of detecting at least the thirty different COFDM broadcasting modes that a receiver including the FIG. 16 portion of the pilot carriers processor 107 can. The FIG. 20 portion of the pilot carriers processor 107 can be considered as being a modification of the FIG. 16 portion of the pilot carriers processor 107. FIG. 20 shows a read-only memory 178 for receiver configuration instructions replacing the ROM 153 depicted in FIG. 16, the expectation being that a ROM with more than 5-bits-wide read addressing will be required so as to allow the detection of more than thirty different COFDM broadcasting modes. The FIG. 20 portion of the pilot carriers processor 107 employs just a single PN match filter 160, rather than the pair of PN15 match filters 150 and 160 employed in the FIG. 16 portion of the pilot carriers processor 107. The PN15 match filter 150, the OR gate 158 and the set-reset flip-flop 159 are dispensed with in the FIG. 20 portion of the pilot carriers processor 107. The output port of the PN15 match filter 160 is connected for supplying LATCH signal to the bank 152 of gated data latches. Any ONE-going impulse response from the PN15 match filter 160 conditions the gated data latches in the bank 152 of them to latch to a count from the counter 151 that will help identify the broadcast standard governing the DTV transmissions to be received in the next COFDM frame.

The output port of the demodulator 148 is connected for supplying its baseband response directly to the serial-input port of the 15-stage serial-input/parallel-output (SIPO) register 149, and the parallel-output port of the SIPO shift register 149 connects to provide partial read addressing to a read-only memory 179 used for additive descrambling of PN15 sequences. The read output port of the ROM 179 is connected for supplying cyclically repeated 15-chip sequences to the parallel-input port of the PN15 match filter 160. The one of the descrambling algorithms stored in the ROM 179 that the ROM 179 uses for attempting to descramble PN15 sequences is determined by further partial read addressing supplied the ROM 179 from a step scanner 180.

Upon receiving pulse response from the P1 symbol detector 127 that signals the start of a COFDM frame, the step scanner 180 begins to step through a circular list of further partial read addresses for the ROM 179. One of these further partial read addresses is apt to be such as to condition the ROM 179 to simply pass on 15-bits-wide partial read addressing supplied from the SIPO shift register 149 output port to the ROM 179. The PN15 match filter 160 responds to the reproduced partial read addressing supplied from the SIPO shift register 149 supplied from the output port of the ROM 179 similarly to the way PN15 match filter 150 responds to the response from the SIPO shift register 149 in the FIG. 16 portion of the pilot carriers processor 107. This is why the PN15 match filter 150, the OR gate 158 and the set-reset flip-flop 159 are omitted from the FIG. 20 portion of the pilot carriers processor 107.

As the step scanner 180 steps through its circular list of further partial read addresses for the ROM 179, one of these further partial read addresses will presumably descramble PN15 sequences, if necessary, for application to the input port of the PN15 match filter 160, causing the PN15 match filter 160 to supply a logic ONE response that conditions the gated data latches in the bank 152 of them to latch to a count from the counter 151. These four latched bits supplied to the ROM 178 as partial read addressing help identify the broadcast standard governing the DTV transmissions to be received in the next COFDM frame. The remaining bits of the read addressing for the ROM 179 correspond to the further partial read addressing that the step scanner 180 supplies to the ROM 179 used for descrambling PN15 sequences. The ONE-going impulse response from the PN15 match filter 160 is supplied as a STOP signal to the step scanner 180 to halt its stepping through its circular list of further partial read addresses.

The ROM 179 continues to receive the same read addressing slightly after the conclusion of the COFDM frame. The ONE-going pulse the P1 symbol detector 127 supplies at the outset of the next COFDM frame clocks the receiver configuration instructions supplied as read output from the ROM 178 into temporary storage within the clocked data latch 154 for subsequent application to the FIG. 6 apparatus 109 to configure the DTV receiver. Upon receiving the pulse response from the P1 symbol detector 127 as a START signal, the step scanner 180 is enabled to begin again stepping through a circular list of further partial read addresses for the ROM 178 and for the ROM 179. The step scanner 180 begins its stepping from the further partial read address it is stopped at, and the beginning of stepping is deferred for fifteen or thirty COFDM symbols. This delay allows it to be ascertained whether the COFDM broadcasting mode signaled in the new COFDM frame is the same as the COFDM broadcasting mode signaled in the previous COFDM frame without the step scanner 180 having to scan the complete circular list of further partial read addresses.

FIG. 21 shows a modification of the FIG. 20 portion of the pilot carriers processor 107 that halves the time needed for a step scanner to scan a given number of descrambler algorithms, while maintaining the same duration for each of the intervals between successive steps in the scanning of a circular list of further partial read addresses. FIG. 21 shows a pair of read-only memories 181 and 182 for descrambling PN15 sequences, which ROMs 181 and 182 replace the ROM 179 depicted in FIG. 20 and are about one-half its size in terms of addressable storage locations. The ROM 181 stores a first half of the PN15 descrambling algorithms that the ROM 179 stores. The ROM 182 stores another, second half of the PN15 descrambling algorithms that the ROM 179 stores. The output port of the demodulator 148 is connected for supplying its baseband response to the serial input port of the SIPO shift register 149, and the parallel-output port of the SIPO shift register 149 is connected for supplying partial read addresses to each of the ROMS 181 and 182. The read-out ports of the ROMS 181 and 182 connect to the parallel-input ports of PN match filters 150 and 160, respectively.

FIG. 21 shows a step scanner 183 that steps through a circular list of further partial read addresses one-half as long as the circular list of further partial read addresses that the FIG. 20 step scanner 180 steps through. The output port of the step scanner 183 is connected for supplying the further partial read addresses it generates to a read-only memory for receiver configuration instructions, which ROM is not explicitly depicted in FIG. 21. The output port of the step scanner 183 is also connected for supplying these further partial read addresses to the ROMs 181 and 182, thereby augmenting the partial read addresses supplied them from the SIPO shift register 149. The algorithms for descrambling 15-chip sequences implanted in the ROM 181 are different from the algorithms for descrambling 15-chip sequences implanted in the ROM 182. So, each further partial read address the step scanner 183 supplies to the ROMs 181 and 182 creates a possibility for one of the ROMs 181 and 182 to descramble PN115 sequences, thus to cause one of the PN15 match filters 150 and 160 to supply ONE-going pulses in response to the descrambled PN15 sequences.

The responses of the PN15 match filters 150 and 160 are ORed by the OR gate 158 to generate the ENABLE signal controlling the bank 152 of gated data latches used for latching a modulo-15 count of COFDM symbols in the COFDM frame. The bank 152 of gated data latches supplies the 4-bit latched modulo-15 count latched therein as partial read addressing to the read-only memory for receiver configuration instructions. The COFDM broadcasting system used in the next COFDM frame is identified by extending the latched modulo-15 count by the further partial read address supplied from the step scanner 183 and by another bit indicating which of the pair of match filters 150 and 160 most recently generated a logic ONE auto-correlation response. The respective output ports of the match filters 150 and 160 have connections to the SET input port and the RESET input port of the set-reset flip-flop 159 that supplies from an output port the bit indicating which of the pair of match filters 150 and 160 most recently generated a logic ONE auto-correlation response. The read-output port of the ROM for receiver configuration instructions is connected for supplying the data input port of the clocked data latch 154 with a set of receiver configuration instructions in parallel-bit format.

FIG. 22 shows an alternative modification of the FIG. 20 portion of the pilot carriers processor 107 that halves the time needed for a step scanner to scan a given number of descrambler algorithms, while maintaining the same duration for each of the intervals between successive steps in the scanning of a circular list of further partial read addresses. The modification of the FIG. 21 portion of the pilot carriers processor 107 depicted in FIG. 22 can signal just as many different COFDM broadcasting modes as the modification depicted in FIG. 21, but is somewhat simpler in structure. Rather than replacing the ROM 179 for descrambling PN15 sequences shown in FIG. 20 with the pair of ROMs 181 and 182 shown in FIG. 21, FIG. 22 shows the ROM 179 replaced by just the ROM 181 one-half the size the ROM 179 in terms of addressable storage locations. The output port of the demodulator 148 is connected for supplying its baseband response to the serial input port of the SIPO shift register 149, and the parallel output port of the SIPO shift register 149 is connected for supplying partial read addresses just to the ROM 179.

Operation of the step scanner 183 depicted in FIG. 22 is similar to the operation of the step scanner 107 depicted in FIG. 21. The output port of the step scanner 183 is connected for supplying the further partial read addresses it generates to a read-only memory for receiver configuration instructions, which ROM is not explicitly depicted in FIG. 22. The output port of the step scanner 183 is also connected for supplying these further partial read addresses to the ROM 181, thereby augmenting the partial read addresses supplied to the ROM 181 from the SIPO shift register 149. The read-out port of the ROM 181 connects to the parallel-input port of the PN15 match filter 160 and to the parallel-input port of the match filter 172 for ONEs'-complemented PN15 sequences.

The responses of the match filters 160 and 172 are ORed by the OR gate 158 to generate the ONE-going ENABLE signal controlling the bank 152 of gated data latches used for latching a modulo-15 count of COFDM symbols in the COFDM frame. The bank 152 of gated data latches supplies the 4-bit latched modulo-15 count latched therein as partial read addressing to the read-only memory for receiver configuration instructions. The COFDM broadcasting system used in the next COFDM frame is identified by extending the latched modulo-15 count by the further partial read address supplied from the step scanner 183 and by another bit indicating which of the match filters 160 and 172 most recently generated a logic ONE auto-correlation response. The respective output ports of the match filters 160 and 172 have connections to the SET input port and the RESET input port of the set-reset flip-flop 159 that supplies from an output port the bit indicating which of the match filters 160 and 172 most recently generated a logic ONE auto-correlation response. The read-output port of the ROM for receiver configuration instructions is connected for supplying the data input port of the clocked data latch 154 with a set of receiver configuration instructions in parallel-bit format.

Most, but not all, of the proposals for a future ATSC 3.0 COFDM Television Broadcasting Standard that were submitted to ATSC in October 2013 used preambles similar to the P1 preamble used in the DVB-T2 second generation digital terrestrial television broadcasting system, which P1 preambles are periodically detected in a 1K FFT at the outsets of COFDM frames. An alternative proposal received by ATSC uses preambles of a different sort periodically detected in an 8K FFT at the outsets of COFDM frames. Each of these preambles is redundantly coded and is included at the beginning of a COFDM symbol followed by one of a selection of signature sequences transmitted by QPSK modulation of OFDM carriers. Should this alternative proposal be adopted in ATSC 3.0, the P1 symbol detector 127 in the FIG. 7 portion of a COFDM digital television receiver will presumably be replaced by a detector for the preambles of a different sort. Whether a COFDM symbol is the initial COFDM symbol in a COFDM frame can be resolved or confirmed by detectors for the signature sequences that succeed those preambles of a different sort. The construction of such detectors is deemed to entail no more than ordinary skill for the designers of COFDM receivers. Such replacement of the P1 symbol detector 127 in FIG. 7 will then also apply to respective modifications of the configurations depicted in FIGS. 11-18 and 20-22. Such replacement of the P1 symbol detector 127 in FIG. 8 will then also apply to the modification of the FIG. 19 configuration, although the P1 symbol detector 127 is not explicitly depicted in FIG. 19.

Another way for signaling the outsets of COFDM frames is known in which the OFDM carriers are modulated by Barker code for a number of COFDM symbols before the start of the data-conveying portion of each COFDM frame. A usual practice has been to use 13-chip Barker code for periodically modulating all the OFDM carriers, no longer Barker codes being known. Signaling the outsets of COFDM frames in this way is reported to offer better performance than single-COFDM-symbol preambles when reception is accompanied by additive white Gaussian noise (AWGN). The problem with this way of using use 13-chip Barker code to signal the outsets of COFDM frames is the overhead cost is thirteen times as great as for using single-COFDM-symbol preambles to signal the outsets of COFDM frames. Thirteen COFDM symbols per COFDM frame can be almost 25% overhead cost when 32K FFT is used, since COFDM frame size is limited to around 60 COFDM symbols or so, presuming the duration of COFDM frames is constrained to be 250 milliseconds at most.

An important thing to practicing the various aspects of the inventions disclosed supra is provision for signaling COFDM receivers as to when the initial COFDM symbols in COFDM frames occur, so that the counter 151 can be reset to a prescribed initial count. The manner in which the initial COFDM symbols in COFDM frames are signaled is not to be considered as the sine qua non as to whether apparatus embodies some aspects of the invention. Another important thing to practicing many of the various aspects of the inventions disclosed supra is the receiver being informed as to the placement of at least some of the continual pilot carriers in the frequency spectrum.

Signaling the beginnings of COFDM frames can be done in the time domain in addition to or instead of signaling them in the frequency domain. The BPSK of continual pilot carriers can be done in accordance with a unique binary sequence either at the respective conclusions of COFDM frames or at their respective outsets. As a further alternative, the unique binary sequence can begin near the conclusion of each COFDM frame and conclude after the very beginning of the next COFDM frame. Each unique binary sequence is detected and used to reset the modulo-15 counter 151 to its initial count within each COFDM frame. The 13-chip Barker code is a good choice for each unique binary sequence. Since this 13-chip Barker code or other unique binary sequence only modulates pilot carrier waves within each data-conveying COFDM frame, there is no additional overhead cost for signaling the beginnings of COFDM frames in this way. Since the continual pilot carriers are typically only about one or two percent of the OFDM carriers in the COFDM signal, AWGN noise is averaged over fewer carriers, but this will not affect noise reduction much. (The chips of Barker codes are normally considered in terms of +1 and −1 values, which correspond respectively to first and second phases of the BPSK of the continual pilot carrier wave, rather than being considered In terms of logic ONE and logic ZERO values as is the custom with regard to PN sequences.).

FIG. 23 depicts a modification of the FIG. 4 portion of COFDM transmitter apparatus in which the unit 70 for generating sequences that identify the COFDM broadcast modes used in following COFDM frames is replaced by a unit 184 for generating sequences that identify the COFDM broadcast modes used in following COFDM frames and for additionally generating 13-chip Barker codes for signaling the outsets of COFDM frames. FIG. 23 indicates that the preamble 1 insertion unit 75 is optional when the respective beginnings of COFDM frames is done in the time domain. If the preamble 1 insertion unit 75 is not used, the output port of the guard-interval-and-cyclic-prefix-insertion unit 74 connects directly to the first of the two input ports of the time-division multiplexer 76, it being presumed that the bootstrap signal generator 77 is used and that its output port connects to the second input port of the time-division multiplexer 76.

FIG. 24 depicts a representative structure for the FIG. 23 unit 184 for generating repeating signature sequences in the BPSK of pilot carriers for look-forward signaling the sorts of COFDM frames to be used and for further generating a Barker code in the BPSK of pilot carriers at the conclusion of each COFDM frame. The general structure of the unit 184 is in some respects similar to that of the unit 185 for generating a reference sequence depicted in FIG. 5. FIG. 5 depicts the 12-bit-wideup/down counter 85 for counting the number of COFDM symbols in a COFDM frame. In FIG. 24 a counter 185, clocked at OFDM symbol rate for counting up to OFDM frame size and then rolling over to zero count, replaces the counter 85. In FIG. 24 a bank 186 of read-only memories each storing a respective phasing of one of a number of cyclically repeating 15-chip sequences replaces the digital adder 86 and the ROM 83. Different 15-chip sequences associated with different broadcast standards can be stored in selected ones of the ROMs in the bank 186 of them, and up to fifteen different phases of each of those 15-chip sequences associated with different broadcasting modes within a standard can be stored in respective ones of the ROMs in the bank 186 of them. A ROM selection control signal selects which ROM in the bank 186 of ROMs is to be read responsive to read addressing supplied from the counter 185 clocked at OFDM symbol rate. The counter 185 of successive OFDM symbols is reset to zero count at the beginning of each successive OFDM frame, counting up from zero count to a specified OFDM frame size and then rolling over back to zero count.

The different phases of each of the 15-chip sequences associated with different broadcasting modes within a standard can be generated from a single ROM in the bank 186 of them by adding different offsets to the read addressing supplied from the counter 185 to that single ROM. This technique is analogous to that implemented with the counter 85, the digital adder 86 and the ROM 83 in FIG. 5. A repeated 15-chip signature sequence is read from a selected one of the bank 186 of ROMs in FIG. 24 during all but the final thirteen OFDM symbol intervals of each COFDM frame. The output sequence supplied from the pseudo-random binary sequence (PRBS) generator 82 and the cyclically repeated 15-chip signature sequence read from a selected one of the bank 185 of ROMs are applied to first and second input connections respectively of the exclusive-OR gate 84. A read-only memory 187 stores a 13-chip Barker code that is read to the second input connection of the exclusive-OR gate 84 during the final thirteen OFDM symbol intervals of each COFDM frame. (Each successive bit in such sequences or in the reference signal formed from them is more particularly referred to as a "chip" by many persons skilled in the art.) The exclusive-OR gate 84 responds to these input signals thereof applied to its first and second input connections to supply a reference signal from its output connection to the pilot carriers insertion and dummy tones reservation unit 184 depicted in FIG. 23.

The apparatus to enable the reading of the ROM 187 during the final thirteen OFDM symbol intervals of each successive OFDM frame and to enable reading of a selected one of the ROMs in the bank 186 of them is next to be considered. A digital adder 188 is connected for adding thirteen to the OFDM symbol count supplied from the counter 185, and a digital subtractor 189 is connected for subtracting the number of OFDM symbols in the OFDM frame from the sum output signal supplied from the adder 188. These arithmetic steps generate a difference signal at the output connection of the digital subtractor 189 that toggles to being positive during the final thirteen OFDM symbol intervals in an OFDM frame after having been negative in the preceding OFDM symbol intervals in that OFDM frame. A separator 190 of the polarity bit from this difference signal is connected for applying the separated polarity bit to the ROM 187 as a read control signal that when positive during the final thirteen OFDM symbol intervals in an OFDM frame enables reading from the ROM 187 to the second input connection of the exclusive-OR gate 84. FIG. 24 shows a logic inverter 191 connected for ONES'-complementing the polarity bit separated by the separator 190 to generate a response applied the bank 186 of ROMs as a read control signal that when positive during all but the final thirteen OFDM symbol intervals in an OFDM frame enables reading to the second input connection of the exclusive-OR gate 84 from a selected one of the ROMs in the bank 186 of them.

More particularly, read out can be supplied from the ROM 187 to the second input connection of the exclusive-OR gate 84 via a tri-state buffer amplifier conditioned by the read enable signal for ROM 187 to drive the second input connection of the exclusive-OR gate 84 from a low source impedance, but otherwise offering a relatively very high source impedance to the second input connection of the exclusive-OR gate 84. Read-out can be supplied from the bank 186 of ROM to the second input connection of the exclusive-OR gate 84 via another tri-state buffer amplifier conditioned by the read enable signal for the bank 186 of ROM to drive the second input connection of the exclusive-OR gate 84 from a low source impedance, but otherwise offering a relatively very high source impedance to the second input connection of the exclusive-OR gate 84. The two tri-state buffer amplifiers together with the logic inverter 191 function as a time-division multiplexer. In alternative designs this multiplexer is replaced by another time-division multiplexer of different form.

A separator 192 is connected for separating the four least significant bits of the difference signal supplied from the output connection of the digital subtractor 189 and supplying them to the ROM 187 as read addressing. During the final thirteen OFDM symbol intervals in an OFDM frame, when the ROM 187 receives read enable signal, these four least significant bits increment from 0000 to 1101.

It is important to understand that the PRBS generator 82 generates chips at OFDM carrier clock rate and consequently generates a respective chip for each OFDM carrier, regardless of whether that carrier be a pilot carrier or not. Therefore, the carriers insertion and dummy tones reservation unit 184 modulates half or about half of the continual pilot carriers by a cyclically repeating 15-chip signature sequence read from one of the ROMs in the bank 186 of them followed by a 13-chip Barker code read from the ROM 187. Furthermore, the carriers insertion and dummy tones reservation unit 184 modulates the remaining half or about half of the continual pilot carriers by the ONEs'-complement of a cyclically repeating 15-chip signature sequence read from one of the ROMs in the bank 186 of them followed by a 13-chip Barker code read from the ROM 187. The chip that the PRBS generator 82 generates respective to a continual pilot carrier determines which of the two modulating signals governs BPSK of that continual pilot carrier.

FIG. 25 depicts alternative structure for the FIG. 23 unit 184 for generating cyclically repeating signature sequences in the BPSK of pilot carriers for look-forward signaling the sorts of COFDM frames to be used and for further generating a Barker code in the BPSK of pilot carriers at the conclusion of each COFDM frame. The FIG. 25 structure has the following similarities to structure for the FIG. 23 unit 184 depicted in FIG. 24. The output sequence supplied from a pseudo-random binary sequence (PRBS) generator 82 and a cyclically repeated 15-chip signature sequence read from a selected one of the bank 186 of ROMs during all but the final thirteen OFDM symbol intervals of each COFDM frame are applied to first and second input connections respectively of the exclusive-OR gate 84. The read-only memory 187 stores a 13-chip Barker code that is read to the second input connection of the exclusive-OR gate 84 during the final thirteen OFDM symbol intervals of each COFDM frame.

A primary difference between the FIG. 24 and FIG. 25 structures for the FIG. 23 unit 184 is that the up counter 185 of the FIG. 24 structure is replaced in FIG. 25 by a down counter 193. The counter 193 is clocked at OFDM symbol rate to count down from the number of OFDM symbols in an OFDM frame to zero and then is reset to the number of OFDM symbols in the next OFDM frame. A digital subtractor 194 is connected for subtracting the counter 193 down count from the number of OFDM symbols in the current OFDM frame. The subtractor 194 is further connected for supplying the resulting difference signal to the bank 186 of ROMs as read addressing. A separator 195 separates the four least significant bits from the counter 193 down count for application to the ROM 187 as read addressing.

The apparatus to enable the reading of the ROM 187 during the final thirteen OFDM symbol intervals of each successive OFDM frame and to enable reading of a selected one of the ROMs in the bank 186 of them is next to be considered. A digital subtractor 196 is connected for subtracting thirteen from the counter 193 down count, thus to generate a difference signal at the output connection of the digital subtractor 196 that toggles to being negative during the final thirteen OFDM symbol intervals in an OFDM frame after having been positive in the preceding OFDM symbol intervals in that OFDM frame. A separator 197 of the polarity bit from this difference signal is connected for applying the separated polarity bit to the bank 186 of ROMs as a read control signal that when positive during all but the final thirteen OFDM symbol intervals in an OFDM frame enables reading to the second input connection of the exclusive-OR gate 84 from a selected one of the ROMs in the bank 186 of them. FIG. 25 shows a logic inverter 198 connected for ONES'-complementing the polarity bit separated by the separator 197 to generate a response applied to ROM 187 as a read control signal that when positive during the final thirteen OFDM symbol intervals in an OFDM frame enables reading from the ROM 187 to the second input connection of the exclusive-OR gate 84.

FIG. 26 depicts a structure for the generator 82 of pseudo-random binary sequences used for controlling the polarity of BPSK of the continual pilot carriers, which structure provides for advanced signaling of the size of the I-FFT used in the OFDM frame next to follow. This advanced signaling is provided by the polarities of the continual pilot carriers shared by all sizes of I-FFT in the final thirteen OFDM symbols of each OFDM frame spoofing the signature the polarities of the continual pilot carriers shared by all sizes of I-FFT provide in all except the final thirteen COFDM symbols of the OFDM frame next to follow.

A counter 199 responds to the scan rate of OFDM carriers in 32K I-FFT to count the OFDM carriers in each OFDM symbol interval. The count is reset to zero at the start of each OFDM symbol. This count is supplied as read addressing to a read-only memory 200 for locating the continual pilot carriers shared by all sizes of I-FFT. The read-out from the ROM 200 is ONE when a continual pilot carrier shared by all sizes of I-FFT obtains and otherwise is a ZERO. The read-out from the ROM 200 is supplied to the input port of a sample-and-hold circuit 201, which samples at the OFDM carrier scan rate in the I-FFT of the current OFDM frame. The sample-and-hold circuit 201 holds each ONE read from the ROM 200 for an OFDM symbol interval in the size I-FFT used in the current OFDM frame.

The count of OFDM carriers in 32K I-FFT supplied from the counter 199 provides read addressing for a read-only memory 202 used to generate an $X^{11}+X^2+1$ pseudo-random binary sequence for binary phase-shift keying the pilot carriers to be inserted amongst the OFDM carriers in 32K I-FFT OFDM symbols. FIG. 26 depicts the count of OFDM carriers from the counter 199 being supplied to a divider 203 to be divided by two, which can be done simply by omitting the least significant bit of the count. The count from the counter 199 as divided by two is a count of OFDM carriers in 16K I-FFT that provides read addressing for a read-only memory 204 used to generate an $X^{11}+X^2+1$ pseudo-random binary sequence for binary phase-shift keying the pilot carriers to be inserted amongst the OFDM carriers in 16K I-FFT OFDM symbols. FIG. 26 depicts the count of OFDM carriers from the counter 199 being supplied to a divider 205 to be divided by four, which can be done simply by omitting the two least significant bits of the count. The count from the counter 199 as divided by four is a count of OFDM carriers in 8K I-FFT that provides read addressing for a read-only memory 206 used to generate an $X^{11}+X^2+1$ pseudo-random binary sequence for binary phase-shift keying the pilot carriers to be inserted amongst the OFDM carriers in 8K I-FFT OFDM symbols.

The $X^{11}+X^2+1$ pseudo-random binary sequences read from the ROMs 202, 204 and 206 are supplied to a selector 207 for selecting the pattern of OFDM carrier polarities to be used in each current OFDM frame. The $X^{11}+X^2+1$ pseudo-random binary sequences read from the ROMs 202, 204 and 206 are supplied to a selector 208 for selecting the pattern of OFDM carrier polarities to be used in each immediately following OFDM frame. The output ports of the selectors 207 and 208 connected to further selector 209. The selector 209 reproduces the response of a selected one of the selectors 207 and 208 at its output port which connects to the first input ports of the XOR gate 84. The output port of an AND gate 210 is connected for supplying selector 209 a control signal that determines which of the responses of the selectors 207 and 208 is selected for reproduction at the output port of the selector 209.

When its control signal is a ZERO, the selector 209 will reproduce the response of the selector 207 at its output port. This provides for the BPSK of the continual pilot carriers shared by all sizes of I-FFT signaling the I-FFT size in the current OFDM frame. When its control signal is a ONE, the selector 209 will reproduce the response of the selector 208 at its output port. This provides for the BPSK of the continual pilot carriers shared by all sizes of I-FFT signaling the I-FFT size in the OFDM frame next after the current one.

The read-enable signal supplied to the ROM 186 in either of FIGS. 24 and 25 is also supplied to one of the two input ports of the AND gate 210. This read-enable signal is ZERO during all except the final thirteen of the OFDM symbols in each OFDM frame, which ZERO causes the AND gate 210 response supplied as control signal to the selector 209 to be a ZERO. Responsive to this ZERO, the selector 209 is conditioned to reproduce at its output port the response of the selector 207. The respective polarities of all the pilot carriers are determined by the PRBS read from the one of the ROMs 202, 204 and 206 selected for conveying the size of the I-FFT for the current OFDM frame.

The read-enable signal supplied to the ROM 187 in either of FIGS. 25 and 26 is ONE during the final thirteen OFDM symbols in each OFDM frame, which ONE causes the AND gate 210 response supplied as control signal to the selector 209 to reproduce a ONE or ZERO, as supplied from the sample-and-hold circuit 201. If the sample-and-hold circuit 201 supplies a ONE to the AND gate 210, indicative that a continual pilot carrier shared by all sizes of I-FFT obtains, during the final thirteen OFDM symbols in the OFDM frame the AND gate response is a ONE. This AND gate response is supplied as control signal to the selector 209, conditioning the selector 209 to reproduce at its output port the response of the selector 208. The respective polarities of all the pilot carriers are determined by the PRBS read from the one of the ROMs 202, 204 and 206 selected for conveying the size of the I-FFT for the OFDM frame that will occur next after the current OFDM frame. If the sample-and-hold circuit 201 supplies a ZERO to the AND gate 210, indicative that a continual pilot carrier shared by all sizes of I-FFT does not obtain, the AND gate response is a ZERO even during the final thirteen OFDM symbols in the OFDM frame. Responsive to this ZERO, the selector 209 is conditioned to reproduce at its output port the response of the selector 207. The respective polarities of all the pilot carriers are determined by the PRBS read from the one of the ROMs 202, 204 and 206 selected for conveying the size of the I-FFT for the current OFDM frame.

FIG. 27 shows a modification of the portion of the pilot carriers processor depicted in FIG. 11, the structure and operation of which modification does not involve a P1 symbol detector 127. FIG. 27 depicts connection from the parallel-output port of the SIPO shift register 149 for supplying the thirteen most recently received bits to the parallel-input port of a match filter 211 for the 13-chip Barker code sequence. While the chips of Barker codes are normally considered in terms of +1 and −1 values, which correspond respectively to first and second phases of the binary phase-shift keying (BPSK) of the continual pilot carrier wave, these chips can be being considered in terms of logic ONE and logic ZERO values when designing the match filter 211. The match filter 211 generates a ONE-going response at its output port when the 13-chip Barker code sequence is detected. This ONE-going response is supplied to the modulo-15 counter 151 for resetting the count therefrom to initial count value at the beginning of the following COFDM frame. The ONE-going response from the output port of the match filter 211 also clocks forward the content from the clocked data latch 154.

Modification of the portion of the pilot carriers processor depicted in FIG. 12 to replace the P1 symbol detector 127 with match filtering for 13-chip Barker coding is difficult to depict in a patent drawing. The parallel-output port of each of the SIPO shift registers 149₁, ... 149N connects to the parallel-input port of a respective match filter for the 13-chip Barker code sequence in a modification of the portion of the pilot carriers processor depicted in FIG. 12. The respective output ports of these match filters for the 13-chip Barker code sequence each connect to respective input ports of a plural-input OR gate. The plural-input OR gate supplies an output ONE responsive to receiving a logic ONE response from any one of the plurality of the match filters for the 13-chip Barker code sequence. The ONE-going edge of this ONE response resets the modulo-15 counter 151 to its initial count value and clocks receiver configuration instructions forward from the data latch 154 to the apparatus 109 in the FIG. 6 portion of the COFDM receiver.

Figure 28:
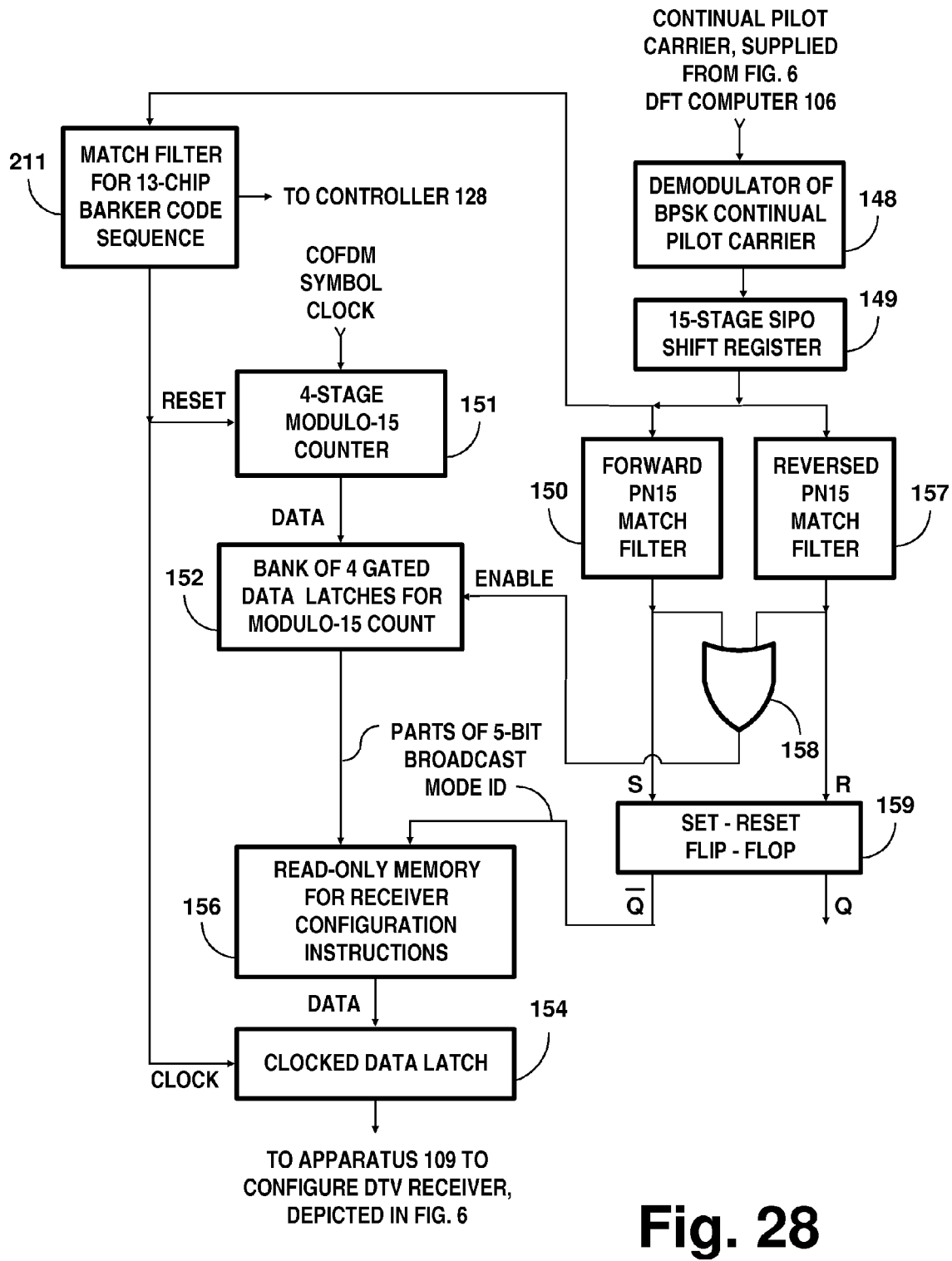

FIG. 28 shows a modification of the portion of the pilot carriers processor depicted in FIG. 13, the structure and operation of which modification does not involve a P1 symbol detector 127. FIG. 28 depicts connection from the parallel-output port of the SIPO shift register 149 for supplying the thirteen most recently received bits to the parallel-input port of a match filter 211 for the 13-chip Barker code sequence. The match filter 211 generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

Figure 29:
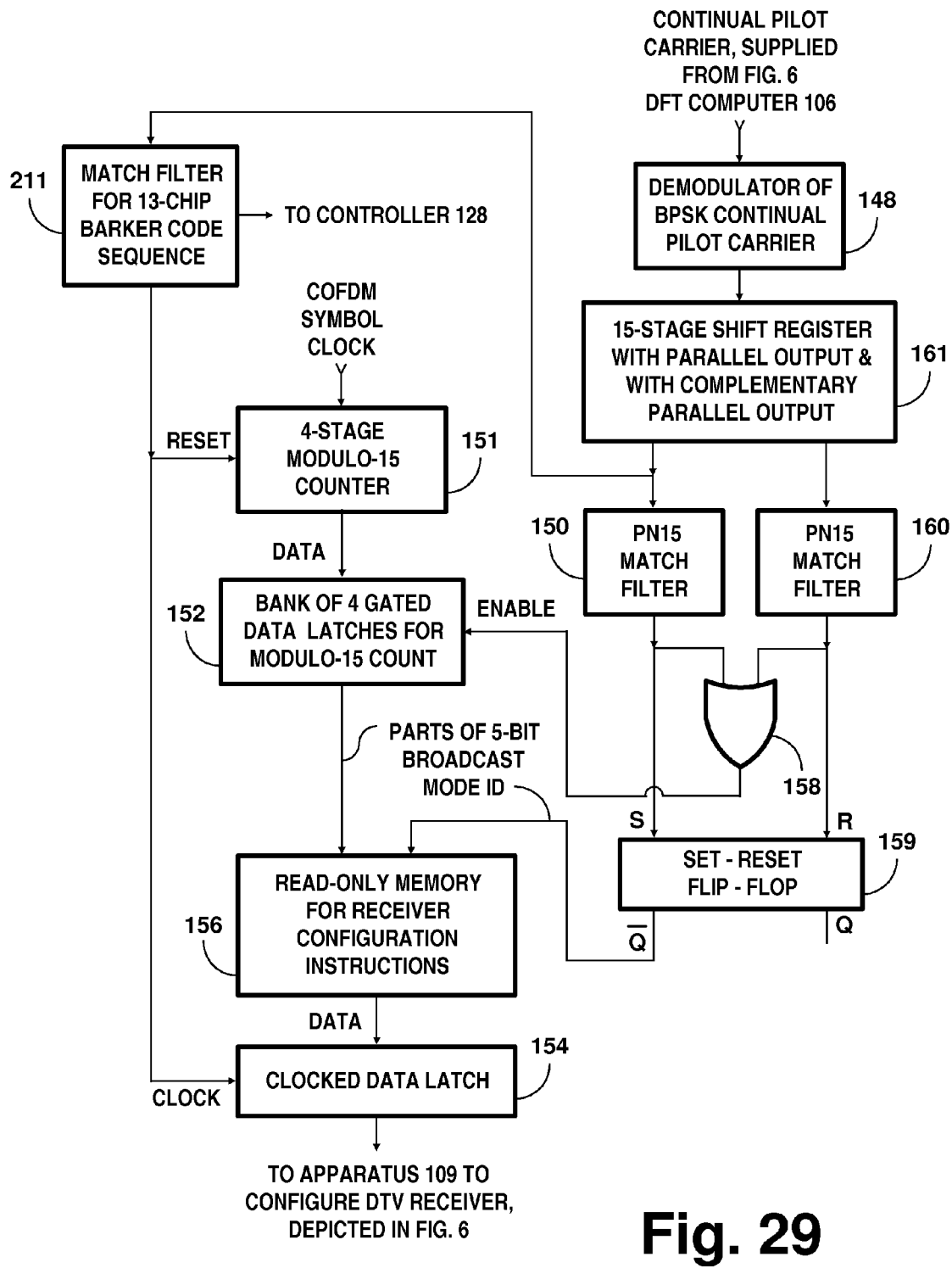

FIG. 29 shows a modification of the portion of the pilot carriers processor depicted in FIG. 14, the structure and operation of which modification does not involve a P1 symbol detector 127. FIG. 29 depicts connection from the non-complementary parallel-output port of the SIPO shift register 161 for supplying the thirteen most recently received bits to the parallel-input port of a match filter 211 for the 13-chip Barker code sequence. The match filter 211 generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

Figure 30:
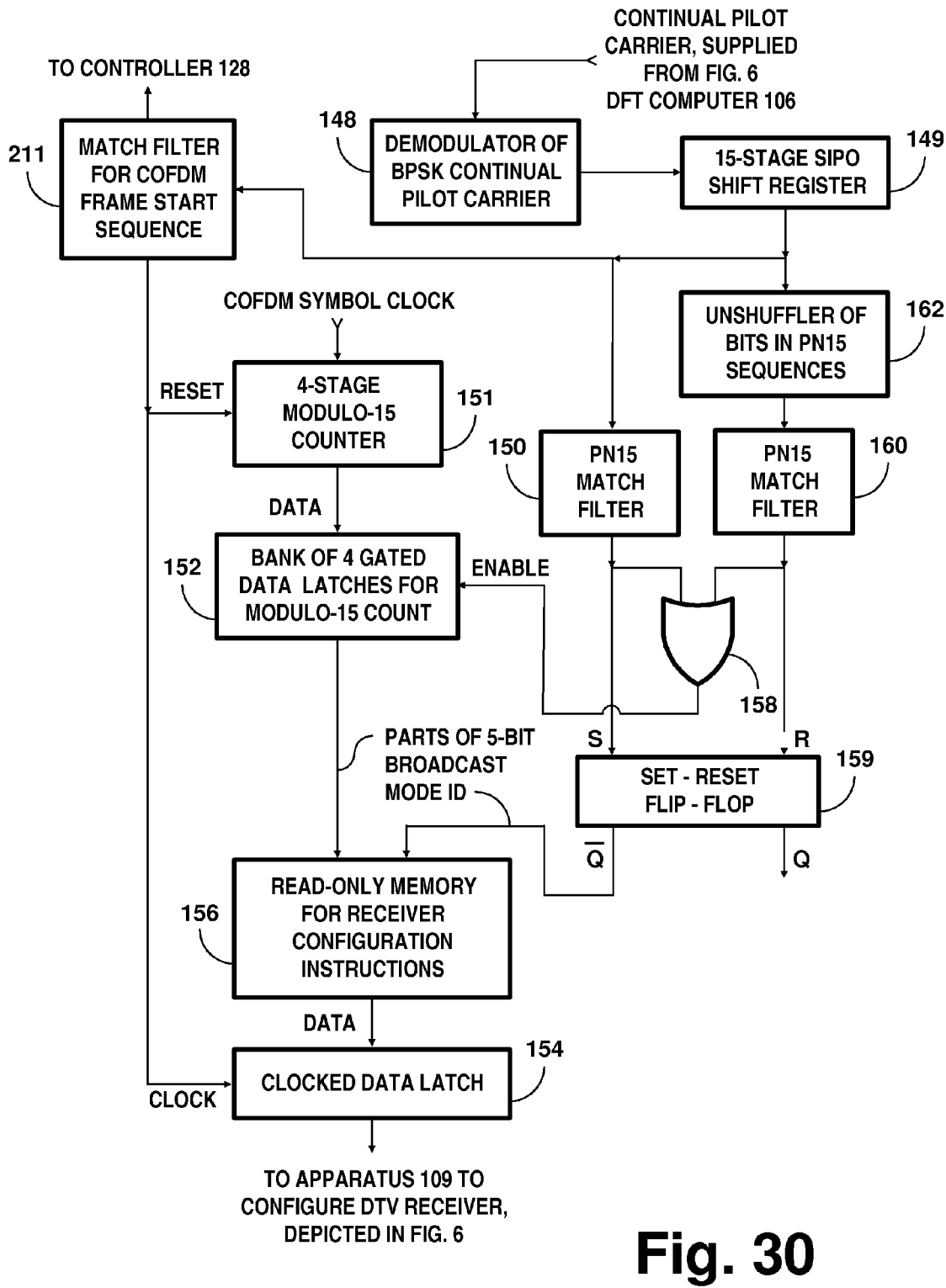

FIG. 30 shows a modification of the portion of the pilot carriers processor depicted in FIG. 15, the structure and operation of which modification does not involve a P1 symbol detector 127. FIG. 30 depicts connection from the parallel-output port of the SIPO shift register 149 for supplying the thirteen most recently received bits to the parallel-input port of a match filter 211 for the 13-chip Barker code sequence. The match filter 211 generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

Figure 31:
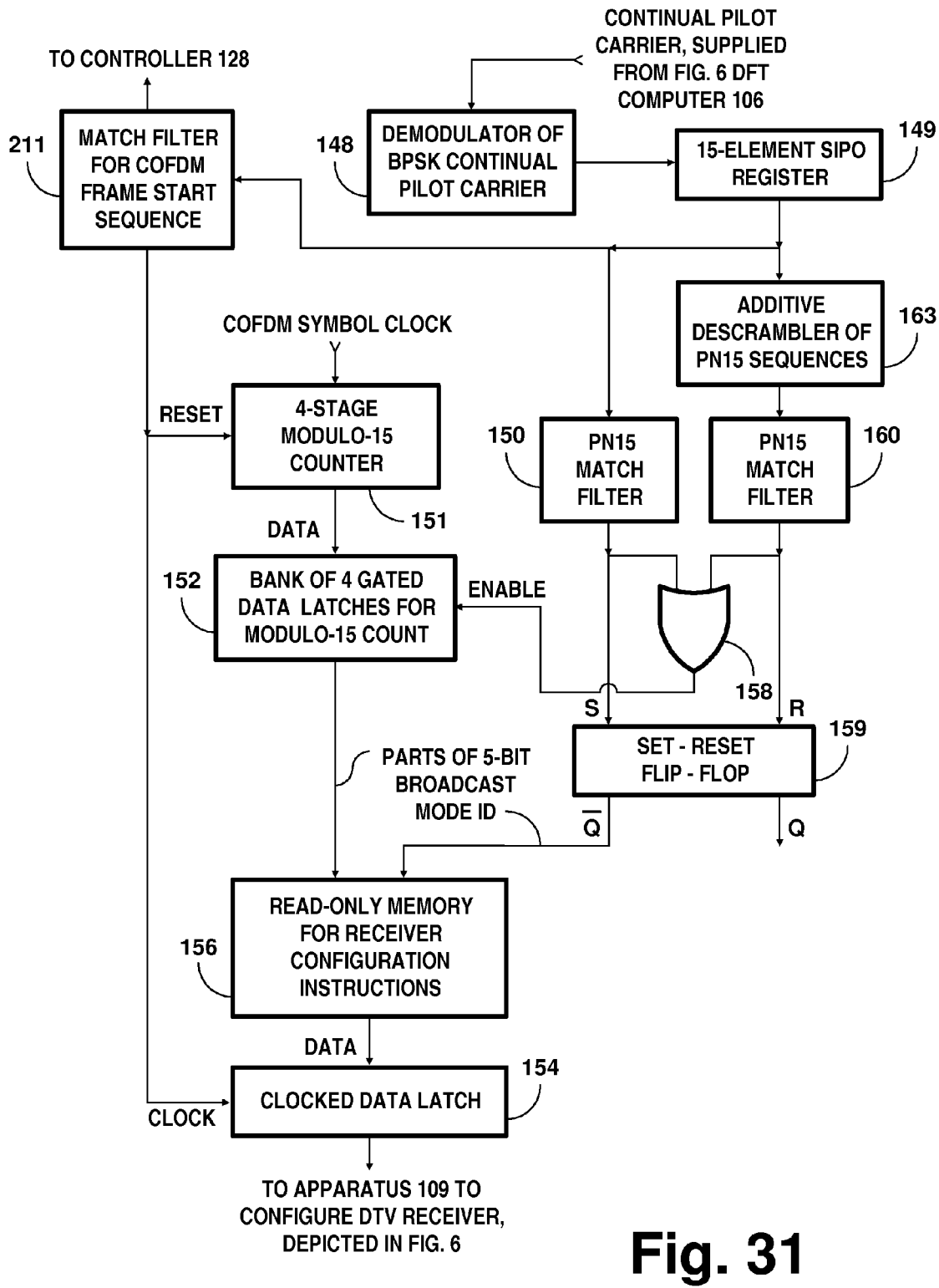

FIG. 31 shows a modification of the portion of the pilot carriers processor depicted in FIG. 16, the structure and operation of which modification does not involve a P1 symbol detector 127. FIG. 31 depicts connection from the parallel-output port of the SIPO shift register 149 for supplying the thirteen most recently received bits to the parallel-input port of a match filter 211 for the 13-chip Barker code sequence. The match filter 211 generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

Figure 32:
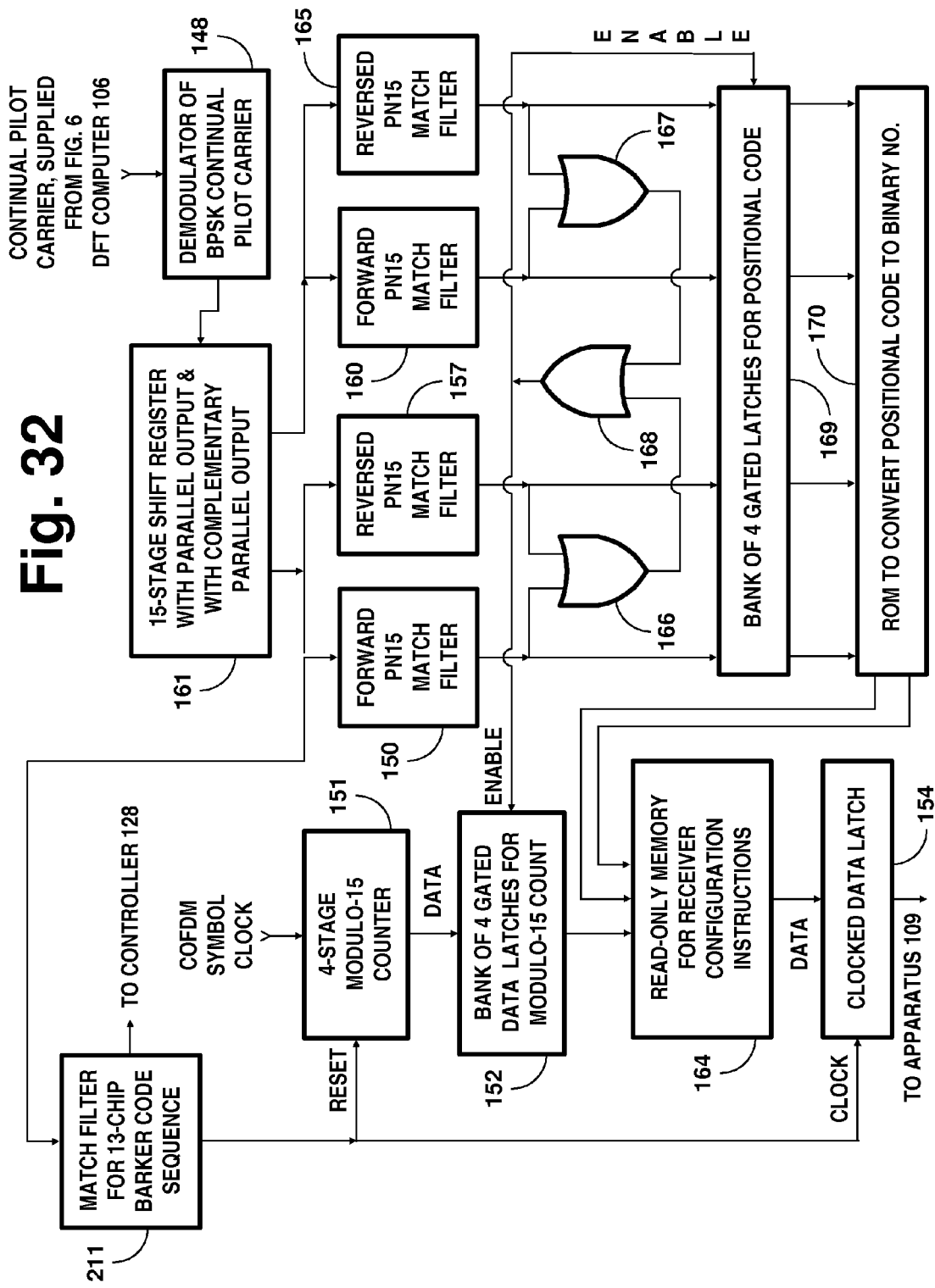

FIG. 32 shows a modification of the portion of the pilot carriers processor depicted in FIG. 17, the structure and operation of which modification does not involve a P1 symbol detector 127. FIG. 32 depicts connection from the non-complementary parallel-output port of the SIPO shift register 161 for supplying the thirteen most recently received bits to the parallel-input port of a match filter 211 for the 13-chip Barker code sequence. The match filter 211 generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

The portion of the pilot carriers processor depicted in FIG. 18 can be modified to replace the P1 symbol detector 127 with the match filter 211 for the 13-chip Barker code sequence. The portion of the pilot carriers processor depicted in FIG. 19 can also be modified to replace the P1 symbol detector 127 with the match filter 211 for the 13-chip Barker code sequence. In either modification the parallel-output port of the SIPO shift register 149 is connected for supplying the thirteen most recently received bits to the parallel-input port of the match filter 211, which generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

FIG. 33 shows a modification of the portion of the pilot carriers processor depicted in FIG. 20, the structure and operation of which modification does not involve a P1 symbol detector 127. FIG. 33 depicts connection from the parallel-output port of the SIPO shift register 149 for supplying the thirteen most recently received bits to the parallel-input port of a match filter 211 for the 13-chip Barker code sequence. The match filter 211 generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

FIG. 34 shows a modification of the portion of the pilot carriers processor depicted in FIG. 21, the structure and operation of which modification does not involve a P1 symbol detector 127. FIG. 34 depicts connection from the parallel-output port of the SIPO shift register 149 for supplying the thirteen most recently received bits to the parallel-input port of a match filter 211 for the 13-chip Barker code sequence. The match filter 211 generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

FIG. 35 shows a modification of the portion of the pilot carriers processor depicted in FIG. 22, the structure and operation of which modification does not involve a P1 symbol detector 127. FIG. 35 depicts connection from the parallel-output port of the SIPO shift register 149 for supplying the thirteen most recently received bits to the parallel-input port of a match filter 211 for the 13-chip Barker code sequence. The match filter 211 generates a ONE-going response at its output port when the 13-chip Barker code sequence is detected. This ONE-going response is supplied to the modulo-15 counter for resetting the count therefrom to initial count value at the beginning of the following COFDM frame. The ONE-going response from the output port of the match filter 211 also clocks forward the content from the clocked data latch 154.

Barker modulating the continual pilot carrier waves during the final thirteen COFDM symbol intervals provides a basis for COFDM receiver apparatus determining when each COFDM frame begins, so the P1 preamble or alternatives thereto are no longer needed for this purpose. The inventors' observation of this fact led them to consider whether the P1 preamble or a robust alternative thereto were required at all by COFDM receiver apparatus. If the P1 preamble or a robust alternative thereto were required, Barker modulation of the continual pilot carrier waves at the conclusions of COFDM frames could still back up the determinations of the beginnings of the COFDM frames provided by the P1 preamble or the robust alternative thereto.

If the P1 preamble or a robust alternative thereto were not required, all the L1 signaling functions might be transmitted using the same size I-FFT as used for transmitting coded DTV data. However, this would require that the receiver know what that size of I-FFT was. This is particularly a problem during the initial reception of a broadcasting channel, because once normal reception of the broadcasting channel is underway the size of the I-FFTused for transmitting a current COFDM frame can have been signaled in the previous COFDM frame interval and perhaps even earlier as well.

Another basic reason for using the P1 preamble or a robust alternative thereto has been to signal the size and nature of the I-FFT used by the transmitter apparatus in its generation of COFDM broadcasting signals in such way as to facilitate receiver apparatus readily to determine what FFT procedures to follow in receiving those COFDM broadcasting signals. There are alternative ways, however, that COFDM receiver apparatus could use to determine the size and nature of the I-FFT used to generate COFDM broadcasting signals. One way is to attempt decoding the BPSK modulation of continual pilot carriers using the smallest size FFT clocked at the COFDM symbol rate for that size FFT. Presumably those continual pilot carriers that are located in respective locations within the frequency spectrum that are the same as for selected ones of the continual pilot carriers for each of the larger I-FFT sizes. If the distance in carrier scanning clock between ones of these selected continual pilot carriers is not a multiple of the cycle of repetition of the PRBS, the pattern of FFT response to those continual pilot carriers will be different for the different sizes of I-FFT. This is because the number of chips of PRBS sequence between those selected continual pilot carriers as successively scanned is different for each size of I-FFT. There will be twice as many chips of PRBS sequence between those selected continual pilot carriers for 16K I-FFT size as for 8K I-FFT size. There will be four times as many chips of PRBS sequence between those selected continual pilot carriers for 32K I-FFT size as for 8K I-FFT size. The receiver waits until Barker modulation of the continual selected continual pilot carriers is detected to indicate when a new COFDM frame begins to be received, so the modulo-15 counter 151 can be reset to initial count. Then, the pattern of the BPSK decoding results in the initial COFDM symbol of the new COFDM frame is supplied as positional code read addressing to a read-only memory that responds to indicate the I-FFT size for the new COFDM frame. The receiver then begins decoding the new COFDM frame using the corresponding size FFT clocked at the appropriate COFDM symbol rate for that size FFT. The phasing of the 15-chip sequences in the continual pilot carriers is then detected to determine the COFDM transmission mode used in the next COFDM frame and possibly COFDM frames further beyond. Normal reception conditions obtain in that next COFDM frame.

The likelihood of identification of the broadcasting system governing currently received transmissions being erroneous is very low in any of the pilot carriers processing arrangements depicted in FIGS. 11-22 and in FIGS. 26-34. Such likelihood can be reduced even further, however, by not enabling the bank 152 to latch a modulo-15 count from the counter 151 when a match filter provides a first logic ONE response during a COFDM frame. Instead, the pilot carriers processing arrangements depicted in FIGS. 11-22 and in FIGS. 26-34 are modified to latch a modulo-15 count from the counter 151 when a match filter provides a second (or even a third) logic ONE response during a COFDM frame.

Consider the following specific example of an instance in which it might be desirable to signal a major change in the COFDM broadcast standard. The ATSC 3.0 standard as will be originally launched is apt not to provide for the single-time retransmission of the same systematic data. Subsequent modification of the ATSC 3.0 standard to provide for single-time retransmission of the same systematic data might be signaled by change in the repetitive PN15 sequence used to modify the continual pilot carrier waves. As a further example, the ATSC 3.0 standard may be modified later on to provide for layered modulation division (LDM) which would likely be signaled by another change in the repetitive PN15 sequence used to modify the continual pilot carrier waves.

Since the method of signaling described supra can signal a large number of different COFDM broadcasting modes, a number of different COFDM broadcasting modes can be specified for each successive COFDM broadcast standard. These different COFDM broadcasting modes can specify a profile as to the sort of service that each COFDM frame is intended to support as well as the type of DTV receiver that can usefully receive that service. These different COFDM broadcasting modes can specify the language of the audio content of COFDM frames. While the foregoing description has focused on signaling the receiver as to what type of COFDM frame is next to be transmitted, the signaling can further indicate the future pattern of transmission of the COFDM frames being currently transmitted. Such further indications facilitate DTV receivers being designed to provide sleeping of some receiver functions, thus to reduce average operating power.

The foregoing specification is primarily directed to changing the pattern of BPSK of the continual pilot carriers to conveying metadata that backs up metadata also conveyed in the preambles of OFDM frames or in bootstrap signaling. Alternatively, changing the pattern of BPSK of the continual pilot carriers can be used to convey metadata different from the metadata also conveyed in the preambles of OFDM frames or in bootstrap signaling. Metadata needs may be identified after adoption of the ATC 3.0 DTV standard, and changing the pattern of BPSK of the continual pilot carriers can offer a vehicle for conveying such metadata without disturbing either bootstrap signaling or the preambles of OFDM frames.

By way of example, American television broadcasters have expressed a desire for capability to intermix various types of DTV transmission having different I-FFT sizes and different QAM of the OFDM carrier waves freely, without the constraints of successions of consecutive OFDM frames having to be uniform in such respects. However, it is desirable to have metadata indicating the pattern of OFDM frames occurring that use transmission parameters similar to that of an OFDM frame being currently received. Such information will enable a DTV receiver better of overcome loss and error in the preamble of that OFDM frame being currently received. Phase shift of repetitive PN15 sequences governing BPSK of the continual pilot carriers can be used to convey such patterns.

FIG. 36 is a table illustrating a first set of possible patterns of transmitting a particular sort of COFDM frame identified as "A" that can be signaled by binary phase shift keying (BPSK) of pilot carrier waves. This particular "A" type of COFDM frame is identified by a 15-chip sequence that is cyclically repeated in the BPSK, and the pattern of transmitting A-type COFDM frames is specified by the phasing of the 15-chip sequences in their repetition. A blank square in the table indicates that the nature of the COFDM frame is indeterminate at the time of signaling and, although the COFDM frame might in some circumstances be of "A" type, is more likely to be a different type of COFDM frame. Regardless of the phasing of the 15-chip sequences as cyclically repeated in the "current" COFDM frame in which the signaling is provided, that "current" COFDM frame is immediately followed by an A-type COFDM frame. The subsequent later placement of any A-type COFDM frame or frames specified by each phasing of the repetition of 15-chip sequences is arbitrary, and FIG. 36 indicates only a representative example of such placements.

FIG. 36 illustrates how the following future patterns of A-type COFDM frames can be indicated. FIG. 36 indicates that a first phasing of the repetition of 15-chip sequences in the "current" COFDM frame predicts that any other A-type COFDM frame will occur more than six COFDM frames after the A-type next COFDM frame. FIG. 36 indicates that a second phasing of the repetition of 15-chip sequences in the "current" COFDM frame predicts that another A-type COFDM frame will occur six COFDM frames after the A-type next COFDM frame. FIG. 36 indicates that a third phasing of the repetition of 15-chip sequences in the "current" COFDM frame predicts that another A-type COFDM frame will occur five COFDM frames after the A-type next COFDM frame. FIG. 36 indicates that a fourth phasing of the repetition of 15-chip sequences in the "current" COFDM frame predicts that another A-type COFDM frame will occur four COFDM frames after the A-type next COFDM frame. FIG. 36 indicates that a fifth phasing of the repetition of 15-chip sequences in the "current" COFDM frame predicts that another A-type COFDM frame will occur three COFDM frames after the A-type next COFDM frame. FIG. 36 indicates that a sixth phasing of the repetition of 15-chip sequences in the "current" COFDM frame predicts that another A-type COFDM frame after the next COFDM frame will occur two COFDM frames after the A-type next COFDM frame. FIG. 36 indicates that a seventh phasing of the repetition of 15-chip sequences in the "current" COFDM frame predicts that another A-type COFDM frame will directly follow the A-type next COFDM frame.

FIG. 36 indicates that an eighth phasing of the repetition of 15-chip sequences in the "current" COFDM frame predicts that two A-type COFDM frames will directly follow the A-type next COFDM frame. Where applicable, this eighth phasing of the repetition of 15-chip sequences will preferably be transmitted, rather than the sixth or seventh phasing of the repetition of 15-chip sequences.

FIG. 36 indicates that a ninth phasing of the repetition of 15-chip sequences in the "current" COFDM frame predicts that another A-type COFDM frame will directly follow the A-type next COFDM frame and yet another A-type COFDM frame will occur three COFDM frames after the A-type next COFDM frame. Where applicable, this ninth phasing of the repetition of 15-chip sequences will preferably be transmitted, rather than the fifth or seventh phasing of the repetition of 15-chip sequences.

FIG. 36 indicates that a tenth phasing of the repetition of 15-chip sequences in the "current" COFDM frame predicts that another A-type COFDM frame will directly follow the A-type next COFDM frame and yet another A-type COFDM frame will occur four COFDM frames after the A-type next COFDM frame. Where applicable, this tenth phasing of the repetition of 15-chip sequences will preferably be transmitted, rather than the fourth or seventh phasing of the repetition of 15-chip sequences.

FIG. 36 indicates that an eleventh phasing of the repetition of 15-chip sequences in the "current" COFDM frame predicts that another A-type COFDM frame will directly follow the A-type next COFDM frame and yet another A-type COFDM frame will occur five COFDM frames after the A-type next COFDM frame. Where applicable, this eleventh phasing of the repetition of 15-chip sequences will preferably be transmitted, rather than the third or seventh phasing of the repetition of 15-chip sequences.

FIG. 36 indicates that a twelfth phasing of the repetition of 15-chip sequences in the "current" COFDM frame predicts that another A-type COFDM frame will directly follow the A-type next COFDM frame and yet another A-type COFDM frame will occur six COFDM frames after the A-type next COFDM frame. Where applicable, this twelfth phasing of the repetition of 15-chip sequences will preferably be transmitted, rather than the second or seventh phasing of the repetition of 15-chip sequences.

FIG. 36 indicates that a thirteenth phasing of the repetition of 15-chip sequences in the "current" COFDM frame predicts that other A-type COFDM frames will occur two COFDM frames after the A-type next COFDM frame and four COFDM frames after the A-type next COFDM frame. Where applicable, this thirteenth phasing of the repetition of 15-chip sequences will preferably be transmitted, rather than the fourth or sixth phasing of the repetition of 15-chip sequences.

FIG. 36 indicates that a fourteenth phasing of the repetition of 15-chip sequences in the "current" COFDM frame predicts that other A-type COFDM frames will occur two COFDM frames after the A-type next COFDM frame and three COFDM frames after the A-type next COFDM frame. Where applicable, this fourteenth phasing of the repetition of 15-chip sequences will preferably be transmitted, rather than the fourth or fifth phasing of the repetition of 15-chip sequences.

FIG. 36 indicates that a fifteenth phasing of the repetition of 15-chip sequences in the "current" COFDM frame predicts that other A-type COFDM frames will occur three COFDM frames after the A-type next COFDM frame and six COFDM frames after the A-type next COFDM frame. Where applicable, this fifteenth phasing of the repetition of 15-chip sequences will preferably be transmitted, rather than the second or fourth phasing of the repetition of 15-chip sequences.

FIG. 37 is a table illustrating a second set of fifteen possible patterns of transmitting a particular sort of COFDM frame identified as "A" that can be signaled by binary phase shift keying (BPSK) of pilot carrier waves. The fifteen different possible patterns of transmitting a particular sort of COFDM frame in this second set differ from the fifteen different possible patterns in the first set. This second set of fifteen different possible patterns are forward signaled in accordance with other cyclically repeating 15-chip sequences, wherein the 15-chip sequence per se differs from the 15-chip sequence per se cyclically repeated for forward signaling the first set of fifteen different possible patterns. Where there is a plurality of options for forward signaling, the general rule applies that the forward signaling preferably used in the "current" COFDM frame is that which specifies the most placements for A-type COFDM frames accurately.

Persons skilled in the art of designing DTV systems are apt to discern that various other modifications and variations can be made in the specifically described apparatuses without departing from the spirit or scope of the invention in some of its aspects. In particular while the descriptions of these apparatuses have been couched in terms descriptive of dedicated hardware, it is expected that the equivalents of such hardware are apt to be realized in software for a microprocessor by persons of ordinary skill in the design of DTV apparatus. Accordingly, it is intended that these modifications and variations of the specifically described apparatuses be considered to result in further embodiments of the invention, which are included within the scope of the appended claims and their equivalents.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American-English language.

What is claimed is:

1. A receiver apparatus for interleaved forward-error-correction coded digital signals as conveyed by their inverse fast Fourier transform (I-FFT) modulating respective coded-orthogonal-frequency-division-modulated (COFDM) carrier waves in most cells in each of successive orthogonal-frequency-division-modulation (OFDM) frames, a fraction of the cells in each of said successive OFDM frames constituting respective continual pilot carrier waves modulated in accordance with chips of one of cyclically repeated sequences of chips that is selected for identifying a respective one of a plurality of different COFDM transmission modes, said receiver comprising:
    a tuner for receiving and demodulating a selected radio-frequency signal to generate a baseband digitized COFDM signal;
    a unit for removing guard intervals from said baseband digitized COFDM signal;
    a computer for computing the fast Fourier transform (FFT) of said baseband digitized COFDM signal from which said guard intervals thereof have been removed, certain components of said FFT constituting respective continual ones of said pilot carrier waves modulated at least during initial portion of each successive COFDM frame in accordance with respective elements of said one of repetitive sequences selected for identifying a respective one of a plurality of different COFDM transmission modes;
    a frequency-domain channel equalizer connected for equalizing components of said FFT to counteract irregularities in the response of the transmission channel to these respective components, thus to generate complex coordinates of quadrature-amplitude-modulation (QAM) symbol constellations, said equalizing being performed responsive to the respective amplitudes of said continual pilot carrier waves;
    a demodulator of the modulation of one or more of said continual ones of said pilot carrier waves to generate a continual-pilot-carrier demodulation result;
    a first match filter configured to detect and identify each occurrence of a first sequence of cyclically repeated chips in said continual-pilot-carrier demodulation result, said first sequence of chips being cyclically repeated in such phasing as to specify at least in part a respective one of said plurality of different COFDM transmission modes that said receiver apparatus is capable of usefully receiving;
    apparatus for de-mapping said complex coordinates of said QAM symbol constellations to recover said interleaved forward-error-correction coded digital signals; and
    apparatus for decoding said forward-error-correction coded digital signals extracted from said interleaved forward-error-correction coded digital signals to recover said digital signals in systematic form.

2. The receiver apparatus as set forth in claim 1, further comprising:
    a detector for determining the beginning of each COFDM frame;
    a counter for counting the number of successive COFDM symbols in each consecutive COFDM frame; and
    apparatus for evaluating the count from said counter when said first match filter generates a peak response to determine at least in part which one of said plurality of different COFDM transmission modes the configuration of said receiver should be arranged to suit.

3. The receiver apparatus as set forth in claim 2, wherein said detector for determining the beginning of each COFDM frame is connected for responding to a preamble in the initial COFDM symbol of each COFDM frame.

4. The receiver apparatus as set forth in claim 2, wherein said detector for determining the beginning of each COFDM frame is configured for detecting modulation of one or more of said continual ones of said pilot carrier waves by Barker coding in the concluding COFDM symbols of each COFDM frame.

5. The receiver apparatus as set forth in claim 2, wherein said first match filter is configured to detect and identify each occurrence of a PN sequence arranged in a first particular temporal order and transmitted in a first of two opposite senses of polarity so as to procure said first sequence of cyclically repeated chips.

6. The receiver apparatus as set forth in claim 1, further comprising:
    a second match filter configured to detect and identify each occurrence of a second sequence of cyclically repeated chips in said continual-pilot-carrier demodulation result, the chips of said second sequence being cyclically repeated in such phasing as to specify at least in part a respective one of said plurality of different COFDM transmission modes that said receiver apparatus is capable of usefully receiving.

7. The receiver apparatus as set forth in claim 6, further comprising:
    a detector for determining the beginning of each COFDM frame;
    a counter for counting the number of successive COFDM symbols in each consecutive COFDM frame; and
    apparatus for evaluating the count from said counter when either said first match filter or said second match filter generates a peak response within a COFDM frame interval to determine in part which one of said plurality of different COFDM transmission modes the configuration of said receiver should be arranged to suit in a subsequent COFDM frame; and
    memory for storing an indication as to whether said first match filter or said second match filter generates a peak response within a COFDM frame interval to determine in further part which one of said plurality of different COFDM transmission modes the configuration of said receiver should be arranged to suit in a subsequent COFDM frame.

8. The receiver apparatus as set forth in claim 7, wherein:
said first match filter is configured to detect and identify each occurrence of a PN sequence arranged in a first particular temporal order and transmitted in a first of two opposite senses of polarity so as to procure said first sequence of cyclically repeated chips; and
said second match filter is configured to detect and identify each occurrence of said PN sequence arranged in a second particular temporal order and in said first of two opposite senses of polarity so as to procure said second sequence of cyclically repeated chips.

9. The receiver apparatus as set forth in claim 7, wherein:
said first match filter is configured to detect and identify each occurrence of a PN sequence arranged in a first particular temporal order and transmitted in a first of two opposite senses of polarity so as to procure said first sequence of cyclically repeated chips; and
said second match filter is configured to detect and identify each occurrence of said PN sequence arranged in said first particular temporal order and in a second of said two opposite senses of polarity so as to procure said second sequence of cyclically repeated chips.

10. The receiver apparatus as set forth in claim 7, wherein:
said first match filter is configured to detect and identify each occurrence of a PN sequence arranged in a first particular temporal order and transmitted in a first of two opposite senses of polarity so as to procure said first sequence of cyclically repeated chips; and
said second match filter is configured to detect and identify each occurrence of an additive scrambling of said PN sequence so as to procure said second sequence of cyclically repeated chips.

11. The receiver apparatus as set forth in claim 1, further comprising:
a plurality of further match filters configured to detect and identify each occurrence of a respective sequence of chips that are cyclically repeated in said continual-pilot-carrier demodulation result, the chips of each said respective sequence being cyclically repeated in such phasing as to specify at least in part a respective one of said plurality of different COFDM transmission modes that said receiver apparatus is capable of usefully receiving;
a detector for determining the beginning of each COFDM frame;
a counter for counting the number of successive COFDM symbols in each consecutive COFDM frame;
apparatus for evaluating the count from said counter when either said first match filter or any one of said plurality of further match filters generates a peak response within a COFDM frame interval to determine in part which one of said plurality of different COFDM transmission modes the configuration of said receiver should be arranged to suit in a subsequent COFDM frame; and
a bank of gated latches connected for storing an indication as to whether said first match filter or a particular one of one of said plurality of further match filters generates a peak response within a COFDM frame interval to determine in further part which one of said plurality of different COFDM transmission modes the configuration of said receiver should be arranged to suit in a subsequent COFDM frame.

12. The receiver apparatus as set forth in claim 1, further comprising:
apparatus configured to alter the configuration of said receiver to suit each of at least two of said plurality of different COFDM transmission modes, as detected and identified at least in part by the response of said first match filter.

13. A receiver apparatus for interleaved forward-error-correction coded digital signals as conveyed by their inverse fast Fourier transform (I-FFT) modulating respective coded-orthogonal-frequency-division-modulated (COFDM) carrier waves in most cells in each of successive orthogonal-frequency-division-modulation (OFDM) frames, a fraction of the cells in each of said successive OFDM frames constituting respective continual pilot carrier waves modulated in accordance with chips of one of cyclically repeated sequences of chips that is selected for identifying a respective one of a plurality of different COFDM transmission modes, said receiver comprising:
a tuner for receiving and demodulating a selected radio-frequency signal to generate a baseband digitized COFDM signal;
a unit for removing guard intervals from said baseband digitized COFDM signal;
a computer for computing the fast Fourier transform (FFT) of said baseband digitized COFDM signal from which said guard intervals thereof have been removed, certain components of said FFT constituting respective continual ones of said pilot carrier waves modulated at least during initial portion of each successive COFDM frame in accordance with respective elements of said one of repetitive sequences selected for identifying a respective one of a plurality of different COFDM transmission modes;
a frequency-domain channel equalizer connected for equalizing components of said FFT to counteract irregularities in the response of the transmission channel to these respective components, thus to generate complex coordinates of quadrature-amplitude-modulation (QAM) symbol constellations, said equalizing being performed responsive to the respective amplitudes of said continual pilot carrier waves;
a demodulator of the modulation of one or more of said continual ones of said pilot carrier waves to generate a continual-pilot-carrier demodulation result;
a first descrambler configured for descrambling cyclically repeated sequences of chips in said continual-pilot-carrier demodulation result to generate a first match filtering input signal, said descrambling being done by said first descrambler in accordance with successive ones of a first list of descrambling algorithms until a match condition obtains in subsequent match filtering;
a first match filter configured to detect and identify each occurrence of a first sequence of cyclically repeated chips in said first match filtering input signal, said first sequence of chips being cyclically repeated in such phasing as to specify at least in part a respective one of said plurality of different COFDM transmission modes that said receiver apparatus is capable of usefully receiving;
apparatus for de-mapping said complex coordinates of said QAM symbol constellations to recover said interleaved forward-error-correction coded digital signals; and
apparatus for decoding said forward-error-correction coded digital signals extracted from said interleaved forward-error-correction coded digital signals to recover said digital signals in systematic form.

14. The receiver apparatus as set forth in claim 13, further comprising:

a detector for determining the beginning of each COFDM frame;

a counter for counting the number of successive COFDM symbols in each consecutive COFDM frame; and apparatus for evaluating the count from said counter when said first match filter generates a peak response to determine in part which one of said plurality of different COFDM transmission modes the configuration of said receiver should be arranged to suit, the position on said first list of descrambling algorithms of the descrambling algorithm used to procure the most recent said peak response from said first match filter determining in remaining part which one of said plurality of different COFDM transmission modes the configuration of said receiver should be arranged to suit.

15. The receiver apparatus as set forth in claim 13, further comprising:

a second descrambler configured for descrambling cyclically repeated sequences of chips in said continual-pilot-carrier demodulation result to generate a second match filtering input signal, said descrambling being done by said second descrambler in accordance with successive ones of a list of descrambling algorithms until a match condition obtains in subsequent match filtering;

a second match filter configured to detect and identify each occurrence of a second sequence of cyclically repeated chips in said in said second match filtering input signal, the chips of said second sequence being cyclically repeated in such phasing as to specify at least in part a respective one of said plurality of different COFDM transmission modes that said receiver apparatus is capable of usefully receiving;

a detector for determining the beginning of each COFDM frame;

a counter for counting the number of successive COFDM symbols in each consecutive COFDM frame;

apparatus for evaluating the count from said counter when either said first match filter or said second match filter generates a peak response to determine in part which one of said plurality of different COFDM transmission modes the configuration of said receiver should be arranged to suit; and memory for storing an indication as to whether said first match filter or said second match filter generates a peak response within a COFDM frame interval to determine in further part which one of said plurality of different COFDM transmission modes the configuration of said receiver should be arranged to suit in a subsequent COFDM frame, the position on one of said first and second lists of descrambling algorithms used to procure the most recent said peak response from said first match filter or said second match filter determining in remaining part which one of said plurality of different COFDM transmission modes the configuration of said receiver should be arranged to suit.

16. The receiver apparatus as set forth in claim 13, further comprising:

a second match filter configured to detect and identify each occurrence of a second sequence of cyclically repeated chips in said in said first match filtering input signal, the chips of said second sequence being cyclically repeated in such phasing as to specify at least in part a respective one of said plurality of different COFDM transmission modes that said receiver apparatus is capable of usefully receiving;

a detector for determining the beginning of each COFDM frame;

a counter for counting the number of successive COFDM symbols in each consecutive COFDM frame;

apparatus for evaluating the count from said counter when either said first match filter or said second match filter generates a peak response to determine in part which one of said plurality of different COFDM transmission modes the configuration of said receiver should be arranged to suit; and memory for storing an indication as to whether said first match filter or said second match filter generates a peak response within a COFDM frame interval to determine in further part which one of said plurality of different COFDM transmission modes the configuration of said receiver should be arranged to suit in a subsequent COFDM frame, the position on said list of descrambling algorithms used to procure the most recent said peak response from said first match filter or said second match filter determining in remaining part which one of said plurality of different COFDM transmission modes the configuration of said receiver should be arranged to suit.

17. The receiver apparatus as set forth in claim 13, further comprising:

apparatus configured to alter the configuration of said receiver to suit each of at least two of said plurality of different COFDM transmission modes, as detected and identified at least in part by the response of said first match filter.

* * * * *